United States Patent
Hyde et al.

(10) Patent No.: US 9,892,807 B2
(45) Date of Patent: Feb. 13, 2018

(54) METHOD, SYSTEM, AND APPARATUS FOR SELECTIVELY TRANSFERRING THERMOELECTRICALLY GENERATED ELECTRIC POWER TO NUCLEAR REACTOR OPERATION SYSTEMS

(75) Inventors: Roderick A. Hyde, Redmond, WA (US); Muriel Y. Ishikawa, Livermore, CA (US); Nathan P. Myhrvold, Bellevue, WA (US); Joshua C. Walter, Kirkland, WA (US); Thomas Allan Weaver, San Mateo, CA (US); Lowell L. Wood, Jr., Bellevue, WA (US); Victoria Y. H. Wood, Livermore, CA (US)

(73) Assignee: TerraPower, LLC, Bellevue, WA (US)

( * ) Notice: Subject to any disclaimer, the term of this patent is extended or adjusted under 35 U.S.C. 154(b) by 2414 days.

(21) Appl. No.: 12/586,924

(22) Filed: Sep. 29, 2009

(65) Prior Publication Data

US 2010/0260309 A1    Oct. 14, 2010

Related U.S. Application Data

(63) Continuation-in-part of application No. 12/386,052, filed on Apr. 13, 2009, and a continuation-in-part of application No. 12/460,979, filed on Jul. 27, 2009, and a continuation-in-part of application No. 12/462,054, filed on Jul. 28, 2009, and a continuation-in-part of application No. 12/462,203, filed on Jul. 30, 2009, and a continuation-in-part of application No. 12/462,332, filed on Jul. 31, 2009, (Continued)

(51) Int. Cl.
*G21D 1/02* (2006.01)
*G21C 1/02* (2006.01)
*G21D 7/04* (2006.01)

(52) U.S. Cl.
CPC ............ *G21D 1/02* (2013.01); *G21C 1/026* (2013.01); *G21D 7/04* (2013.01); *Y02E 30/34* (2013.01)

(58) Field of Classification Search
USPC ............... 376/207, 215, 241, 317, 320–322
See application file for complete search history.

(56) References Cited

U.S. PATENT DOCUMENTS

| 2,748,710 A | 6/1956 | Vandenberg |
| 2,902,423 A | 9/1959 | Luebke et al. |
| 3,093,569 A | 6/1963 | Post |

(Continued)

FOREIGN PATENT DOCUMENTS

| CN | 1086038 A | 4/1994 |
| CN | 1890821 A | 1/2007 |

(Continued)

OTHER PUBLICATIONS

McGraw-Hill Encyclopedia of Science & Technology, 9th Edition, "Nuclear Reactor"; pp. 177-185; published 2002.

(Continued)

*Primary Examiner* — Marshall P O'Connor

(57) ABSTRACT

A method, system, and apparatus for the selective transfer of thermoelectrically generated electric power to operation systems of a nuclear reactor system including thermoelectrically converting nuclear reactor generated heat to electrical energy and selectively transferring the electrical energy to at least one operation system of the nuclear reactor system.

44 Claims, 52 Drawing Sheets

Related U.S. Application Data and a continuation-in-part of application No. 12/586,805, filed on Sep. 28, 2009.

(56) References Cited

U.S. PATENT DOCUMENTS

| | | | |
|---|---|---|---|
| 3,276,914 A | | 10/1966 | Shoupp |
| 3,277,321 A | | 10/1966 | Klein et al. |
| 3,430,079 A | | 2/1969 | Danko et al. |
| 3,537,910 A | | 11/1970 | Zogran et al. |
| 3,547,778 A | | 12/1970 | Flaherty et al. |
| 3,598,652 A | * | 8/1971 | Magladry ............... G21D 7/04 136/202 |
| 3,601,887 A | * | 8/1971 | Mitchell et al. ............... 438/55 |
| 3,793,144 A | | 2/1974 | Magladry |
| 3,801,284 A | | 4/1974 | Meckler |
| 4,042,757 A | | 8/1977 | Jones |
| 4,459,428 A | | 7/1984 | Nola |
| 4,508,677 A | | 4/1985 | Craig et al. |
| 4,689,194 A | | 8/1987 | Wachholz et al. |
| 4,699,754 A | * | 10/1987 | French ............... G21C 15/18 376/281 |
| 4,784,824 A | | 11/1988 | Gandrille et al. |
| 4,818,475 A | | 4/1989 | Gluntz et al. |
| 4,851,183 A | | 7/1989 | Hampel |
| 5,039,457 A | | 8/1991 | Terada et al. |
| 5,124,115 A | | 6/1992 | Dillmann |
| 5,202,083 A | | 4/1993 | Spinks et al. |
| 5,255,296 A | | 10/1993 | Schultz |
| 5,268,942 A | | 12/1993 | Newton et al. |
| 5,621,776 A | | 4/1997 | Gaubatz |
| 5,623,109 A | | 4/1997 | Uchida et al. |
| 5,650,904 A | * | 7/1997 | Gilley ............... H02H 9/041 361/56 |
| 5,817,958 A | | 10/1998 | Uchida et al. |
| 7,493,974 B1 | * | 2/2009 | Boncodin ............... B60K 16/00 180/2.2 |
| 2003/0072403 A1 | | 4/2003 | Dagard |
| 2005/0012204 A1 | | 1/2005 | Strnad |
| 2006/0018420 A1 | | 1/2006 | Tessien |
| 2006/0117782 A1 | | 6/2006 | Rini et al. |
| 2006/0251204 A1 | | 11/2006 | Tsang et al. |
| 2007/0137684 A1 | | 6/2007 | Gruen |
| 2007/0253520 A1 | | 11/2007 | Sim et al. |
| 2007/0280400 A1 | | 12/2007 | Keller |
| 2008/0300660 A1 | * | 12/2008 | John ............... A61N 1/3785 607/61 |
| 2010/0260306 A1 | | 10/2010 | Hyde et al. |
| 2010/0260307 A1 | | 10/2010 | Hyde et al. |

FOREIGN PATENT DOCUMENTS

| | | |
|---|---|---|
| CN | 1940254 A | 4/2007 |
| GB | 894207 | 4/1962 |

OTHER PUBLICATIONS

PCT International Search Report; International App. No. PCT/US10/01076; dated Oct. 14, 2010; pp. 1-3.

PCT International Search Report; International App. No. PCT/US10/01075; dated Nov. 23, 2010; pp. 1-2.

PCT International Search Report; International App. No. PCT/US10/01073; dated Nov. 23, 2010; pp. 1-2.

PCT International Search Report; International App. No. PCT/US10/01074; dated Nov. 22, 2010; pp. 1-2.

Chinese State Intellectual property Office First Office Action; App. No. 201080026277.1; dated Mar. 4, 2014; 11 pages (no translation).

Chinese State Intellectual Property Office, Decision of Non-Final Rejection; App. No. 201080026282.2 (Based on PCT Patent Application No. PCT/US2010/001074; dated Mar. 4, 2014; 14 pages.

Definition from Oxford Dictionary Online; "Mechanical"; Oxford English Dictionary; printed on Apr. 2, 2014; total of 16 pages; located at: http://www.oed.com/view/Entry/115544?redirectedFrom=mechanical&print.

Definition from Dictionary.com; "Thermoelectric" p. 3, retrieved from dictionary.com Nov. 7, 2016.

* cited by examiner

METHOD, SYSTEM, AND APPARATUS FOR SELECTIVELY TRANSFERRING THERMOELECTRICALLY GENERATED ELECTRIC POWER TO NUCLEAR REACTOR OPERATION SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States Patent Application entitled METHOD AND SYSTEM FOR THE THERMOELECTRIC CONVERSION OF NUCLEAR REACTOR GENERATED HEAT, naming RODERICK A. HYDE, MURIEL Y. ISHIKAWA, NATHAN P. MYHRVOLD JOSHUA C. WALTER, THOMAS WEAVER, LOWELL L. WOOD, JR. AND VICTORIA Y. H. WOOD as inventors, filed Apr. 13, 2009, application Ser. No. 12/386,052, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD, SYSTEM, AND APPARATUS FOR THE THERMOELECTRIC CONVERSION OF GAS COOLED NUCLEAR REACTOR GENERATED HEAT, naming RODERICK A. HYDE, MURIEL Y. ISHIKAWA, NATHAN P. MYHRVOLD, JOSHUA C. WALTER, THOMAS WEAVER, LOWELL L. WOOD, Jr., AND VICTORIA Y. H. WOOD as inventors, filed Jul. 27, 2009, application Ser. No. 12/460,979, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD, SYSTEM, AND APPARATUS FOR THE THERMOELECTRIC CONVERSION OF GAS COOLED NUCLEAR REACTOR GENERATED HEAT, naming RODERICK A. HYDE, MURIEL Y. ISHIKAWA, NATHAN P. MYHRVOLD, JOSHUA C. WALTER, THOMAS WEAVER, LOWELL L. WOOD, Jr., AND VICTORIA Y. H. WOOD as inventors, filed Jul. 28, 2009, application Ser. No. 12/462,054, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD AND SYSTEM FOR THE THERMOELECTRIC CONVERSION OF NUCLEAR REACTOR GENERATED HEAT, naming RODERICK A. HYDE, MURIEL Y. ISHIKAWA, NATHAN P. MYHRVOLD, JOSHUA C. WALTER, THOMAS WEAVER, LOWELL L. WOOD, Jr. AND VICTORIA Y. H. WOOD as inventors, filed Jul. 30, 2009, application Ser. No. 12/462,203, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD AND SYSTEM FOR THE THERMOELECTRIC CONVERSION OF NUCLEAR REACTOR GENERATED HEAT, naming RODERICK A. HYDE, MURIEL Y. ISHIKAWA, NATHAN P. MYHRVOLD, JOSHUA C. WALTER, THOMAS WEAVER, LOWELL L. WOOD, Jr. AND VICTORIA Y. H. WOOD as inventors, filed Jul. 31, 2009, application Ser. No. 12/462,332, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD, SYSTEM, AND APPARATUS FOR SELECTIVELY TRANSFERRING THERMOELECTRICALLY GENERATED ELECTRIC POWER TO NUCLEAR REACTOR OPERATION SYSTEMS, naming RODERICK A. HYDE, MURIEL Y. ISHIKAWA, NATHAN P. MYHRVOLD, JOSHUA C. WALTER, THOMAS WEAVER, LOWELL L. WOOD, Jr., AND VICTORIA Y. H. WOOD as inventors, filed Sep. 28, 2009, application Ser. No. 12/586,805, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL HELD

The present disclosure generally relates to the field of thermoelectric conversion of nuclear reactor generated heat to electric energy, and more particularly to the selective transfer of electrical energy produced by thermoelectric conversion of nuclear reactor generated heat to one or more operation systems of a nuclear reactor system.

BACKGROUND

Thermoelectric devices and materials can be utilized to convert thermal energy to electric power. Thermoelectric devices are further known to be implemented within a nuclear fission reactor system, so as to convert nuclear fission reactor generated heat to electric power during nuclear reactor operation.

SUMMARY

In one aspect, a method includes, but is not limited to, thermoelectrically converting nuclear reactor generated heat to electrical energy and selectively transferring the electrical energy to at least one operation system of the nuclear reactor system. In addition to the foregoing, other method aspects are described in the claims, drawings, and text forming a part of the present disclosure.

In one or more various aspects, related systems include, but are not limited to, circuitry and/or programming for effecting the herein-referenced method aspects; the circuitry and/or programming can be virtually any combination of hardware, software, and/or firmware configured to effect the herein—referenced method aspects depending upon the design choices of the system designer.

In one aspect, a system includes, but is not limited to, a means for thermoelectrically converting nuclear reactor generated heat to electrical energy and a means for selectively transferring the electrical energy to at least one operation system of the nuclear reactor system. In addition to the foregoing, other system aspects are described in the claims, drawings, and text forming a part of the present disclosure.

In one aspect, an apparatus includes, but is not limited to, at least one thermoelectric device for thermoelectrically converting nuclear reactor generated heat to electrical energy and activation circuitry for selectively transferring the electrical energy from at least one electrical output of the at least one thermoelectric device to at least one operation system of the nuclear reactor system. In addition to the foregoing, other apparatus aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1A:
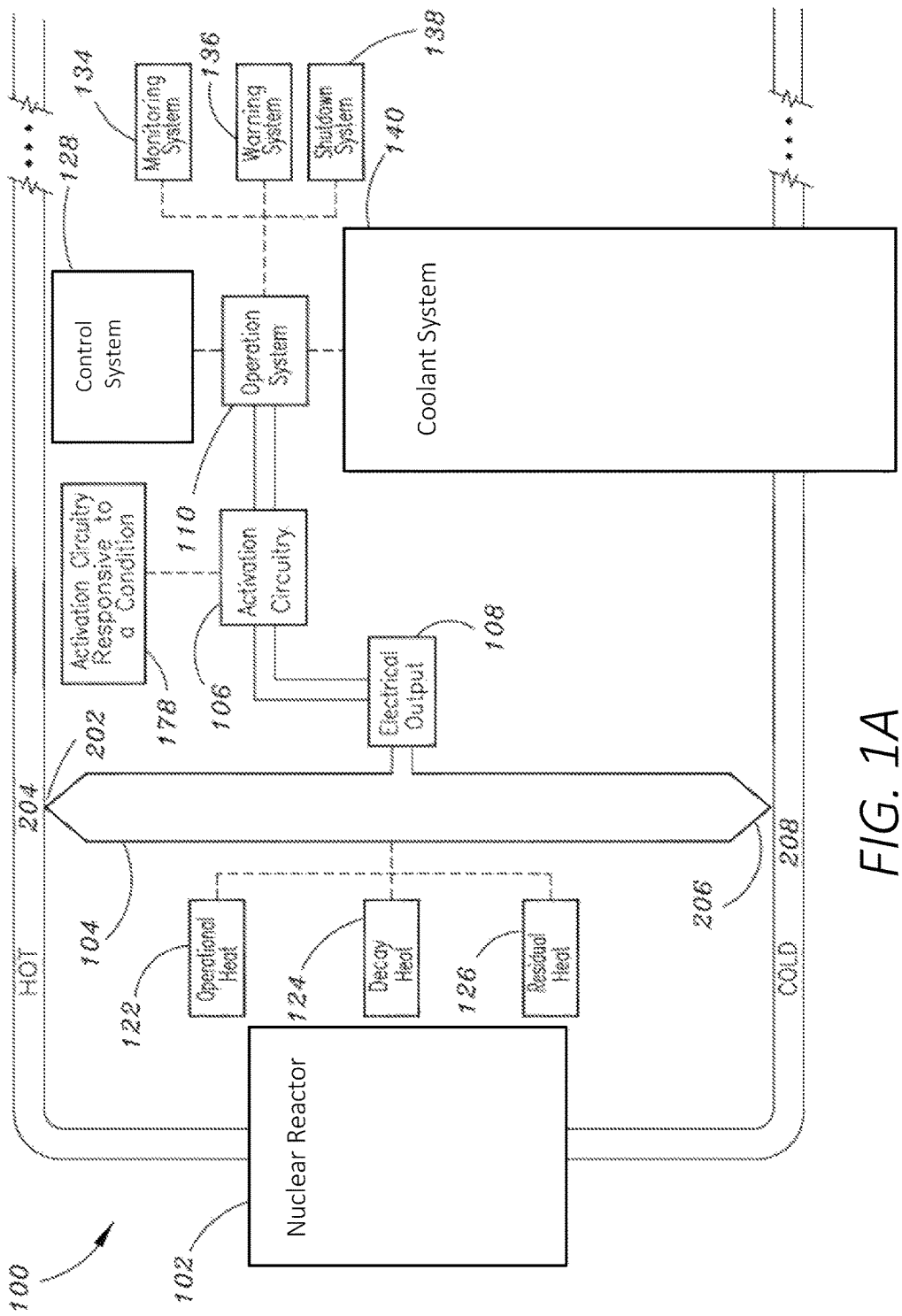
FIG. 1A is a schematic illustrating a system for the thermoelectric conversion of nuclear reactor generated heat to electrical energy and the selective transfer of the electrical energy to an operation system of the nuclear reactor system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 6, a system 100 for the selective transfer of thermoelectrically generated electrical energy to operation systems of a nuclear reactor system is described in accordance with the present disclosure. One or more thermoelectric devices 104 (e.g., a junction of two materials with different Seebeck coefficients) may convert heat produced by a nuclear reactor 102 of a nuclear reactor system 100 to electrical energy. Then, the activation circuitry 106 (e.g., coupling circuitry responsive to a condition) may selectively transfer the electrical energy from at least one electrical output 108 of the thermoelectric device 104 to an operation system 110 of the nuclear reactor system 100.

In embodiments illustrated in FIG. 1A, the nuclear reactor 102 of the nuclear reactor system 100 may include, but is not limited to, a thermal spectrum nuclear reactor, a fast spectrum nuclear reactor, a multi-spectrum nuclear reactor, a breeder nuclear reactor, or a traveling wave reactor. For example, the heat produced by a thermal spectrum nuclear reactor may be thermoelectrically converted to electrical energy via one or more thermoelectric devices 104. Then, the activation circuitry 106 may selectively transfer the electrical energy from at least one electrical output 108 of the thermoelectric device 104 to an operation system 110 of the nuclear reactor system 100. By way of further example, the heat produced by a traveling wave nuclear reactor may be thermoelectrically converted to electrical energy via one or more thermoelectric devices 104. Then, the activation circuitry 106 may selectively transfer the electrical energy from at least one electrical output 108 of the thermoelectric device 104 to an operation system 110 of the nuclear reactor system 100.

In additional embodiments, the heat produced by the nuclear reactor 102 of the nuclear reactor system 100 may include, but is not limited to, operational heat 122, decay heat 124 or residual heat 126. For example, the thermoelectric device 104 may thermoelectrically convert operational heat 122 produced by the nuclear reactor 102 of the nuclear reactor system 100 to electrical energy. Then, the activation circuitry 106 may selectively transfer the electrical energy from the electrical output 108 of the thermoelectric device 104 to an operation system 110 of the nuclear reactor system 100. By way of an additional example, after a shutdown of the nuclear reactor 102 of the nuclear reactor system 100, the thermoelectric device 104 may thermoelectrically convert radioactive decay heat 124 (i.e., heat produced by the radioactive decay of remnant fission materials in the nuclear reactor 102 after shutdown of the nuclear reactor 102) to electrical energy. Then, the activation circuitry 106 may selectively transfer the electrical energy from the electrical output 108 of the thermoelectric device 104 to an operation system 110 of the nuclear reactor system 100. By way of further example, after a shutdown of the nuclear reactor 102 of the nuclear reactor system 100, the thermoelectric device 104 may thermoelectrically convert residual heat 126 (i.e., heat remaining in the nuclear reactor 102 after shutdown of the nuclear reactor 102) to electrical energy. Then, the activation circuitry 106 may selectively transfer the electrical energy from the electrical output 108 of the thermoelectric device 104 to an operation system 110 of the nuclear reactor system 100.

In additional embodiments, the activation circuitry 106 may selectively transfer the electrical energy from the electrical output 108 of the thermoelectric device 104 to a control system 128 of the nuclear reactor system 100. For example, the activation circuitry 106 may selectively transfer the electrical energy from the electrical output 108 of the thermoelectric device 104 to a rod control system of the nuclear reactor system 100. By way of further example, the activation circuitry 106 may selectively transfer the electrical energy from the electrical output 108 of the thermoelectric device 104 to a valve control system of the nuclear reactor system 100.

In another embodiment, the activation circuitry 106 may selectively transfer the electrical energy from the electrical output 108 of the thermoelectric device 104 to a monitoring system 134 of the nuclear reactor system 100. For example, the monitoring system 134 of the nuclear reactor system 100 may include, but is not limited to, a thermal monitoring system, a pressure monitoring system, or a radiation monitoring system. For instance, the activation circuitry 106 may selectively transfer the electrical energy from the electrical output 108 of the thermoelectric device 104 to a thermal monitoring system of the nuclear reactor system 100. In another instance, the activation circuitry 106 may selectively transfer a first portion of the electrical energy from the electrical output 108 of the thermoelectric device 104 to a thermal monitoring system and a second portion of the electrical energy from the electrical output 108 of the thermoelectric device 104 to a pressure monitoring system of the nuclear reactor system 100.

In another embodiment, the activation circuitry 106 may selectively transfer the electrical energy from the electrical output 108 of the thermoelectric device 104 to a warning system 136 of the nuclear reactor system 100. For example, the warning system 136, may include, but is not limited to, a visual warning system (e.g., a computer monitor signal, an LED, an incandescent light) or an audio warning system (e.g., auditory signal transmitted via alarm or digital signal sent to CPU and interpreted as audio signal). Further, the warning system 136 may transmit a warning signal to an observer (e.g., on-site operator/user or off-site authorities). Even further, the warning system may transmit the warning signal wirelessly (e.g., radio wave or sound wave) or by wireline, such as a data transmission line (e.g., copper line or fiber optic cable).

In another embodiment, the activation circuitry 106 may selectively transfer the electrical energy from the electrical output 108 of the thermoelectric device 104 to a shutdown system 138 of the nuclear reactor system 100. For example, the activation circuitry 106 may selectively transfer the electrical energy from the electrical output 108 of the thermoelectric device 104 to a shutdown system 138 employed during scheduled shutdown of the nuclear reactor system 100. By way of further example, the activation circuitry 106 may selectively transfer the electrical energy from the electrical output 108 of the thermoelectric device 104 to a shutdown system 138 employed during an emergency shutdown (e.g., SCRAM) of the nuclear reactor system 100. Further, the activation circuitry 106 may selectively transfer the electrical energy from the electrical output 108 of the thermoelectric device 104 to a shutdown system 138 while the shutdown system 138 is in a stand-by mode of operation.

In another embodiment, the activation circuitry 106 may selectively transfer the electrical energy from the electrical output 108 of the thermoelectric device 104 to a coolant system 140 (e.g., primary coolant system or secondary coolant system) of the nuclear reactor system 100. For example, the activation circuitry 106 may selectively transfer the electrical energy from the electrical output 108 of the thermoelectric device 104 to a coolant pump of a coolant system 140 of the nuclear reactor system 100. The coolant pump may include, but is not limited to, a mechanical pump or a magnetohydrodynamic (MHD) pump. For instance, the activation circuitry 106 may selectively transfer the electrical energy from the electrical output 108 of the thermoelectric device 104 to a mechanical pump of a coolant system 140 of the nuclear reactor system 100, wherein the mechanical pump circulates a coolant fluid (e.g., liquid or pressurized gas) of the coolant system 140 of the nuclear reactor system 100. In another instance, the activation circuitry 106 may selectively transfer the electrical energy from the electrical output 108 of the thermoelectric device 104 to a MHD pump of the coolant system 140 of the nuclear reactor system 100, wherein in the MHD pump circulates a magnetohydrodynamic coolant fluid (e.g., liquid metal or liquid metal salt) of the coolant system 140 of the nuclear reactor system 100.

In a further embodiment, the activation circuitry 106 may selectively transfer the electrical energy from the electrical output 108 of the thermoelectric device 104 to a coolant pump of a pool type reactor. For instance, the activation circuitry 106 may selectively transfer the electrical energy from the electrical output 108 of the thermoelectric device 104 to a coolant pump circulating a liquid sodium coolant of a liquid sodium pool type reactor.

In an additional embodiment, the activation circuitry 106 may selectively transfer the electrical energy from the electrical output 108 of the thermoelectric device 104 to a coolant pump coupled to a coolant loop of the nuclear reactor system. For example, the activation circuitry 106 may selectively transfer electrical energy from the electrical output 108 of the thermoelectric device 104 to a coolant pump coupled to a primary coolant loop of the nuclear reactor system 100. By way of further example, the activation circuitry 106 may selectively transfer electrical energy from the electrical output 108 of the thermoelectric device 104 to a coolant pump coupled to the secondary coolant loop of the nuclear reactor system 100.

In an additional embodiment, the activation circuitry 106 may selectively transfer the electrical energy from the electrical output 108 of the thermoelectric device 104 to a coolant system 140 having at least one liquid coolant. For example, the liquid coolant may include, but is not limited to, a liquid metal coolant (e.g., liquid sodium, liquid lead, or liquid lead bismuth), a liquid salt coolant (e.g., lithium fluoride or other fluoride salts), or a liquid water coolant. For instance, the activation circuitry 106 may selectively transfer the electrical energy from the electrical output 108 of the thermoelectric device 104 to a coolant system 140 having a liquid sodium coolant. In another instance, the activation circuitry 106 may selectively transfer the electrical energy from the electrical output 108 of the thermoelectric device 104 to a coolant system 140 having a liquid lithium fluoride coolant.

In an additional embodiment, the activation circuitry 106 may selectively transfer the electrical energy from the electrical output 108 of the thermoelectric device 104 to a coolant system 140 having at least one pressurized gas coolant 160. For example, the pressurized gas coolant may include, but is not limited to, helium, nitrogen, supercritical carbon dioxide, or steam. For instance, the activation circuitry 106 may selectively transfer the electrical energy from the electrical output 108 of the thermoelectric device 104 to a coolant system 140 having a pressurized helium coolant. In another instance, the activation circuitry 106 may selectively transfer the electrical energy from the electrical output 108 of the thermoelectric device 104 to a coolant system 140 having a supercritical carbon dioxide coolant.

In an additional embodiment, the activation circuitry 106 may selectively transfer the electrical energy from the electrical output 108 of the thermoelectric device 104 to a coolant system 140 having at least one mixed phase coolant. For example, the mixed phase coolant may include a liquid-gas coolant (e.g., liquid water-steam). For instance, the activation circuitry 106 may selectively transfer the electrical energy from the electrical output 108 of the thermoelectric device 104 to a coolant system 140 having a liquid water-steam coolant.

In an additional embodiment, the electrical energy selectively transferred by the activation circuitry 106 from the electrical output 108 of the thermoelectric device 104 to an operation system 110 of the nuclear reactor system 100 may be used to drive or partially drive the operation system 110. For example, the operation system 110 driven or partially driven by the selectively transferred electrical energy may include, but is not limited to, a control system 128, a monitoring system 134, a warning system 136, a shutdown system 138, or a coolant system 140 (e.g., primary coolant system or secondary coolant system). By way of further example, the electrical energy selectively transferred to a coolant pump of a coolant system 140 of the nuclear reactor system 100 may drive or partially drive the coolant pump 142. For instance, the electrical energy selectively transferred to a coolant pump coupled to the primary coolant loop 148 of the nuclear reactor system 100 may drive or partially drive the coolant pump coupled to the primary coolant loop 148. In another instance, the electrical energy supplied to a coolant pump coupled to the secondary coolant loop 150 of the nuclear reactor system 100 may drive or partially drive the coolant pump coupled to the secondary coolant loop 150.

Figure 1B:
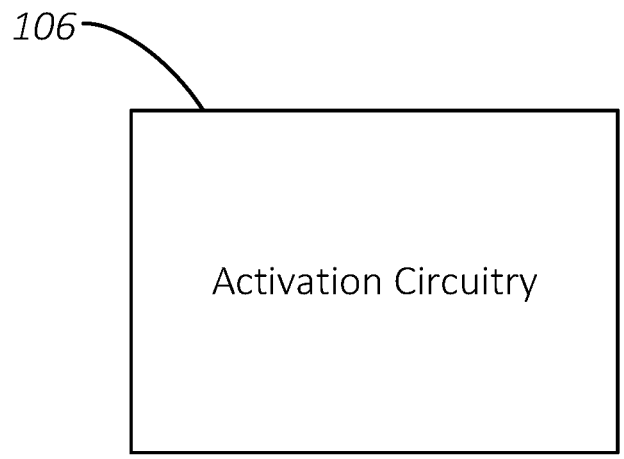
FIG. 1B is a schematic illustrating the activation circuitry used to selectively transfer electrical energy from the thermoelectric device to an operation system of the nuclear reactor system.

In an additional embodiment, illustrated in FIG. 1B, the activation circuitry 106 used to selectively transfer the electrical energy from the electrical output 108 of the thermoelectric device 104 to an operation system 110 of the nuclear reactor system 100 may include, but is not limited to, coupling circuitry, wherein the coupling circuitry is suitable for selectively electrically coupling the electrical output 108 of the thermoelectric device 104 to an operation system 110 of the nuclear reactor system 100. For example, the coupling circuitry may include, but is not limited to, one or more transistors (e.g., NPN transistor or PNP transistor) or one or more relay systems. By way of further example, the relay system may include, but is not limited to, an electromagnetic relay system (e.g., a solenoid based relay system), a solid state relay system, a transistor switched electromagnetic relay system, or a microprocessor controlled relay system. By way of an additional example, the microprocessor controlled relay system, may include, but is not limited to a microprocessor controlled relay system programmed to respond to one or more external conditions (e.g., state of security or loss of heat sink) of the nuclear reactor system 100 or a microprocessor controlled relay system programmed to respond to one or more internal conditions (e.g., temperature, pressure, radiation levels, or functionality of one or more operations systems) of the nuclear reactor system 100.

In a further embodiment, the coupling circuitry may include coupling circuitry suitable for coupling the electrical output 108 of a first thermoelectric device 100 to a first operation system 110 of the nuclear reactor system 100 and the electrical output 108 of an additional thermoelectric device 104 to an additional operation system 110 of the nuclear reactor system 100. For example, the coupling circuitry suitable for coupling the electrical outputs 108 of multiple thermoelectric devices 104 to multiple operation systems 110 of the nuclear reactor system 100 may couple a first thermoelectric device 104 to a coolant system 140 of the nuclear reactor system 100 and a second thermoelectric device 104 to a monitoring system 134 of the nuclear reactor system 100. By way of further example, the coupling circuitry suitable for coupling the electrical output 108 of the multiple thermoelectric devices 104 to multiple operation systems 110 of the nuclear reactor system 100 may couple a first thermoelectric device 104 to a coolant system 140 of the nuclear reactor system 100, a second thermoelectric device 104 to a monitoring system 134 of the nuclear reactor system 100, and a third thermoelectric device 104 to a warning system 136 of the nuclear reactor system 100. It will be appreciated in light of the present disclosure that any number of thermoelectric devices 104 may be coupled to any number of operation systems 110 of the nuclear reactor system 100. Further, the number of thermoelectric devices 104 selectively coupled to an individual operation system 110 by the coupling circuitry may be in proportion to the relative power demand of the respective operation system 110.

Figure 1C:
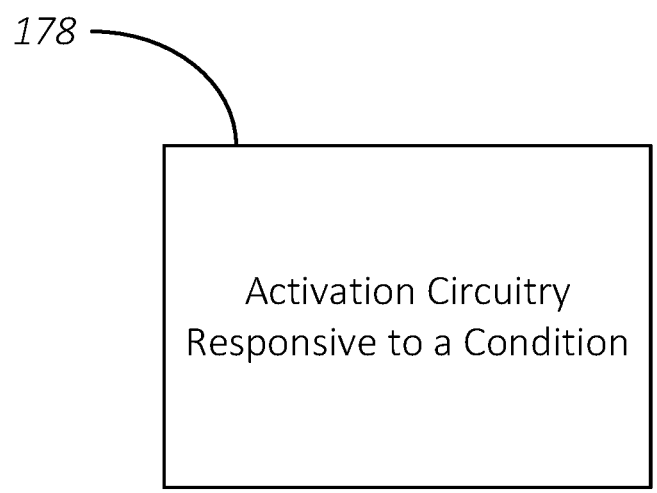
FIG. 1C is a schematic illustrating the activation circuitry responsive to at least one condition used to selectively transfer in response to a condition electrical energy from the thermoelectric device to an operation system of the nuclear reactor system.

In an additional embodiment, illustrated in FIG. 1C, activation circuitry 178, in response to a condition, may selectively transfer the electrical energy from the electrical output 108 of the thermoelectric device 104 to an operation system 110 of the nuclear reactor system 100. For example, at or near a critical temperature of a portion (e.g., the nuclear reactor coolant fluid or the nuclear reactor core) of the nuclear reactor system 100, the activation circuitry 106 may initiate transfer of the electrical energy from the electrical output 108 of the thermoelectric device 104 to an operation system 110 of the nuclear reactor system 100.

In an additional embodiment, the activation circuitry 178, in response to a signal from an operator of the nuclear system 100, may selectively transfer the electrical energy from the electrical output 108 of the thermoelectric device 104 to an operation system 110 of the nuclear reactor system 100. For example, in response to a signal from an operator (e.g., human user or human controlled system, such as a programmed computer system) of the nuclear reactor system 100, the activation circuitry 106 may initiate transfer of the electrical energy from the electrical output 108 of the thermoelectric device 104 to an operation system 110 of the nuclear reactor system 100. For instance, the activation circuitry 106, in response to a remote signal, such as a wireline signal (e.g., copper wire signal or fiber optic cable signal) or a wireless signal (e.g., radio frequency signal), sent from an operator of the nuclear reactor system 100, may initiate transfer of the electrical energy from the electrical output 108 of the thermoelectric device 104 to an operation system 110 of the nuclear reactor system 100.

In another embodiment, the activation circuitry 178, in response to a signal from an operation system of the nuclear system 100, may selectively transfer the electrical energy from the electrical output 108 of the thermoelectric device 104 to an operation system 110 of the nuclear reactor system 100. For example, in response to a signal, such as a remote wireless signal or remote wireline signal, from an operation system (e.g., signal from monitoring system 134, signal from safety system, signal from security system, signal from control system 128, signal from warning system 136, or a signal from shutdown system 138) of the nuclear reactor system 100, the activation circuitry 106 may initiate transfer of the electrical energy from the electrical output 108 of the thermoelectric device 104 to an operation system 110 of the nuclear reactor system 100. For instance, in response to a remote signal from a monitoring system (e.g., signal from thermal monitoring system, signal from radiation monitoring system, or signal from pressure monitoring system) of the nuclear reactor system 100, the activation circuitry 106 may initiate transfer of the electrical energy from the electrical output 108 of the thermoelectric device 104 to an operation system 110 of the nuclear reactor system 100. In another instance, in response to a remote signal from a control system 128 of the nuclear reactor system 100, the activation circuitry 106 may initiate transfer of the electrical energy from the electrical output 108 of the thermoelectric device 104 to an operation system 110 of the nuclear reactor system 100. By way of further example, in response to a remote signal from a control system responsive to an additional operation system (e.g., monitoring system 134, warning system 136, shutdown system 138, safety system or security system), the activation circuitry 106 may initiate transfer of the electrical energy from the electrical output 108 of the thermoelectric device 104 to an operation system 110 of the nuclear reactor system 100. By way of another example, the additional operation system 110 may be responsive to an internal condition (e.g., temperature or core radiation levels) or an external condition (e.g., loss of heat sink, security breach, or loss of external power supply to support systems) of the nuclear reactor system 100. For instance, the safety system of the nuclear reactor system 100, upon sensing a loss of heat sink, may send a signal to the control system responsive to an additional operation system. In turn, the control system responsive to an additional operation system, in response to the signal from the safety system, may send a signal to the activation circuitry 106. Then, in response to the signal received from the control system responsive to an additional operation system, the activation circuitry 106 may initiate transfer of the electrical energy from the electrical output 108 of the thermoelectric device 104 to an operation system 110 of the nuclear reactor system 100.

In an additional embodiment, the activation circuitry 106, in response to a shutdown event of the nuclear system 100, may selectively transfer the electrical energy from the electrical output 108 of the thermoelectric device 104 to an operation system 110 of the nuclear reactor system 100. For example, the activation circuitry 106, in response to an emergency shutdown event (e.g., SCRAM) of the nuclear reactor system 100, may selectively transfer the electrical energy from the electrical output 108 of the thermoelectric device 104 to an operation system 110 of the nuclear reactor system 100. By way of further example, the activation circuitry 106, in response to a scheduled shutdown event of the nuclear reactor system 100, may selectively transfer the electrical energy from the electrical output 108 of the thermoelectric device 104 to an operation system 110 of the nuclear reactor system 100.

In an additional embodiment, the activation circuitry 106, in response to a pre-selected transfer start time, may selectively transfer the electrical energy from the electrical output 108 of the thermoelectric device 104 to an operation system 110 of the nuclear reactor system 100. For example, an operator of the nuclear reactor system 100 may program a computer controller of the activation circuitry 106 to begin transfer of the electrical from the electrical output 108 of the thermoelectric device 104 to an operation system 110 at a selected time. Then, at or near the occurrence of the selected time, the activation circuitry 106 may initiate transfer of the electrical energy from the electrical output 108 of the thermoelectric device 104 to an operation system 110 of the nuclear reactor system 100. By way of further example, the pre-selected start time may include, but is not limited to, a scheduled time of shutdown of the nuclear reactor system 100 or a scheduled time of maintenance of one or more than one sub-systems of the nuclear reactor system 100. For instance, the activation circuitry 106, at a scheduled time of shutdown of the nuclear reactor system 100, may initiate transfer of the electrical energy from the electrical output 108 of the thermoelectric device 104 to an operation system 110 of the nuclear reactor system 100.

Figure 2:
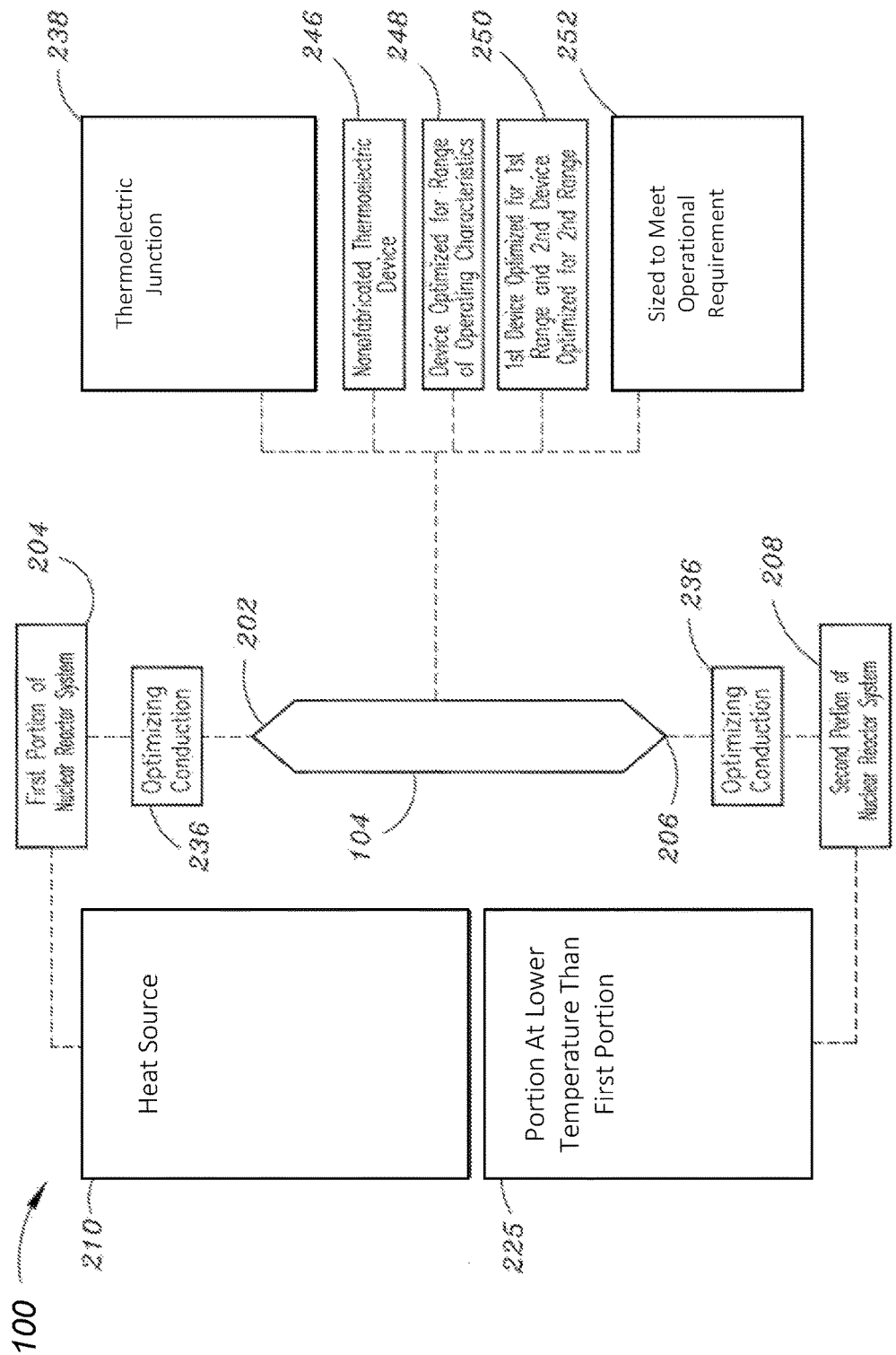
FIG. 2 is a schematic illustrating the types of devices used for the thermoelectric conversion of the nuclear reactor generated heat and different portions of the nuclear reactor suitable for thermal communication with the thermoelectric conversion devices.

In an additional embodiment, illustrated in FIG. 2, nuclear reactor generated heat may be converted to electrical energy via a thermoelectric device 104 placed in thermal communication (e.g., placed in thermal communication ex-situ or in-situ) with a portion of the nuclear reactor system 100. For example, the thermoelectric device 104 may be placed in thermal communication with a portion of the nuclear reactor system 100 during the construction of the nuclear reactor system 100. By way of further example, the nuclear reactor system 100 may be retrofitted such that a thermoelectric device 104 may be placed in thermal communication with a portion of the nuclear reactor system 100. Further, the thermoelectric device 104 may be placed in thermal communication with a portion of the nuclear reactor system 100 during operation of the nuclear reactor system 100 via a means of actuation (e.g., thermal expansion, electromechanical actuation, piezoelectric actuation, mechanical actuation). Then, a thermoelectric device 104, having been placed in thermal communication with a portion of the nuclear reactor system 100, may convert nuclear reactor generated heat to electrical energy.

In another embodiment, illustrated in FIG. 2, nuclear reactor generated heat may be converted to electrical energy via a thermoelectric device 104 having a first portion 202 in thermal communication with a first portion 204 of the nuclear reactor system 100 and a second portion 206 in thermal communication with a second portion 208 of the nuclear reactor system 100. For example, the first portion 202 of the thermoelectric device 104 may be in thermal communication with a heat source 210 of the nuclear reactor system 100. By way of further example, the heat source 210 may include, but is not limited to, a nuclear reactor core, a pressure vessel, a containment vessel, a coolant loop, a coolant pipe, a heat exchanger, or a coolant (e.g., coolant fluid of the primary coolant loop of the nuclear reactor system 100).

In an additional embodiment, the second portion 208 of the nuclear reactor system 100 may be at a lower temperature 225 than the first portion 204 of the nuclear reactor system 100. For example, the first portion 204 of the nuclear reactor system 100 may comprise a portion of the primary coolant system (e.g., at a temperature above 300° C.) of the nuclear reactor system 100 and the second portion 208 of the nuclear reactor system 100 may comprise a portion of a condensing loop (e.g., at a temperature below 75° C.) of the nuclear reactor system 100. By way of further example, the second portion 208 of the nuclear reactor system 100 may include, but is not limited to, a coolant loop, a coolant pipe, a heat exchanger, a coolant (e.g., coolant fluid of the secondary coolant loop of the nuclear reactor 100), or an environmental reservoir (e.g., a lake, a river, or a subterranean structure). For instance, a first portion 202 of the thermoelectric device 104 may be in thermal communication with a first portion of a heat exchanger of the nuclear reactor system 100 and the second portion 206 of the thermoelectric device 104 may be in thermal communication with an environmental reservoir (e.g., a lake, a river, a subterranean structure, or the atmosphere). In another instance, a first portion 202 of the thermoelectric device 104 may be in thermal communication with a first portion of a heat exchanger of the nuclear reactor system 100 and the second portion 206 of the thermoelectric device 104 may be in thermal communication with a second portion of the heat exchanger, wherein the second portion of the heat exchanger is at a lower temperature than the first portion of the heat exchanger. In another instance, a first portion 202 of a thermoelectric device 104 may be in thermal communication with the coolant of the primary coolant loop of the nuclear reactor system 100 and the second portion 206 of the thermoelectric device 104 may be in thermal communication with the coolant of the secondary coolant loop of the nuclear reactor system 100.

In another embodiment, the thermoelectric device 104 and a portion of the nuclear reactor system 100 may both be in thermal communication with a means for optimizing thermal conduction 236 (e.g., thermal paste, thermal glue, thermal cement, or other highly thermally conductive materials) placed between the thermoelectric device 104 and the portion of the nuclear reactor system 100. For example, the first portion 202 of the thermoelectric device 104 may be contacted to the first portion 204 of the nuclear reactor system 100 using thermal cement. Further, the second portion 206 of the thermoelectric device 104 may be contacted to the second portion 208 of the nuclear reactor system 100 using thermal cement.

In an embodiment, the thermoelectric device 104 used to convert nuclear reactor 102 generated heat to electrical energy may comprise at least one thermoelectric junction 238 (e.g., a thermocouple or other device formed from a junction of more than one material, wherein each material has different Seebeck coefficients). For example, the thermoelectric junction 238 may include, but is not limited to, a semiconductor-semiconductor junction (e.g., p-type/p-type junction or n-type/n-type junction) or a metal-metal junction (e.g., copper-constantan). By further example, the semiconductor-semiconductor junction may include a p-type/n-type semiconductor junction (e.g., p-doped bismuth telluride/n-doped bismuth telluride junction, p-doped lead telluride/n-doped lead telluride junction, or p-doped silicon germanium/n-doped silicon germanium junction).

In another embodiment, the thermoelectric device 104 used to convert nuclear reactor 102 generated heat to electrical energy may comprise at least one nanofabricated thermoelectric device 246 (i.e., a device wherein the thermoelectric effect is enhanced due to nanoscale manipulation of its constituent materials). For example, the nanofabricated device 246 may include, but is not limited to, a device constructed in part from a quantum dot material (e.g., PbSeTe), a nanowire material (e.g., Si), or a superlattice material (e.g., $Bi_2Te_3/Sb_2Te_3$).

In another embodiment, the thermoelectric device 104 used to convert nuclear reactor 102 generated heat to electrical energy may comprise a thermoelectric device optimized for a specified range of operating characteristics 248. For example, the thermoelectric device optimized for a specified range of operating characteristics 248 may include, but is not limited to, a thermoelectric device having an output efficiency optimized for a specified range of temperature. For instance, the thermoelectric device 104 may include a thermoelectric device with a maximum efficiency between approximately 200° and 500° C., such as a thermoelectric device comprised of thallium doped lead telluride. It will be appreciated in light of the description provided herein that a nuclear reactor system 100 incorporating a thermoelectric device 104 may incorporate a thermoelectric device having maximum output efficiency within the operating temperature range of the nuclear reactor system 100.

In another embodiment, the heat generated by the nuclear reactor 102 may be converted to electrical energy using a first thermoelectric device optimized for a first range of operating characteristics and a second thermoelectric device optimized for a second range of operating characteristics 250. For example, the output efficiency of a first thermoelectric device may be optimized for a first range in temperature and the output efficiency of a second thermoelectric device may be optimized for a second range in temperature. For instance, the nuclear reactor generated heat may be converted to electrical energy using a first thermoelectric device having a maximum efficiency between approximately 500° and 600° C. and a second thermoelectric device having a maximum efficiency between approximately 400° and 500° C. In a further embodiment, the heat generated by the nuclear reactor 102 may be converted to electrical energy using a first thermoelectric device optimized for a first range of operating characteristics, a second thermoelectric device optimized for a second range of operating characteristics, and up to and including a Nth device optimized for a Nth range of operating characteristics. For instance, the nuclear reactor generated heat may be converted to electrical energy using a first thermoelectric device with a maximum efficiency between approximately 200° and 300° C., a second thermoelectric device with a maximum efficiency between approximately 400° and 500° C., and a third thermoelectric device with a maximum efficiency between approximately 500° and 600° C.

In an embodiment, the heat generated by the nuclear reactor 102 may be converted to electrical energy using one or more thermoelectric devices sized to meet a selected operational requirement 252 of the nuclear reactor system 100. For example, the thermoelectric device may be sized to partially match the heat rejection of the thermoelectric device with a portion of the heat produced by the nuclear reactor system 100. For instance, the thermoelectric device may be sized by adding or subtracting the number of thermoelectric junctions 238 used in the thermoelectric device 104. By way of further example, the thermoelectric device may be sized to match the power requirements of a selected operation system 110. For instance, the thermoelectric device may be sized to match in full or in part the power requirements of one or more than one of the following nuclear reactor 100 operation systems 106: a control system 128, a monitoring system 134, a warning system 136, a shutdown system 138 or a coolant system 140.

Figure 3:
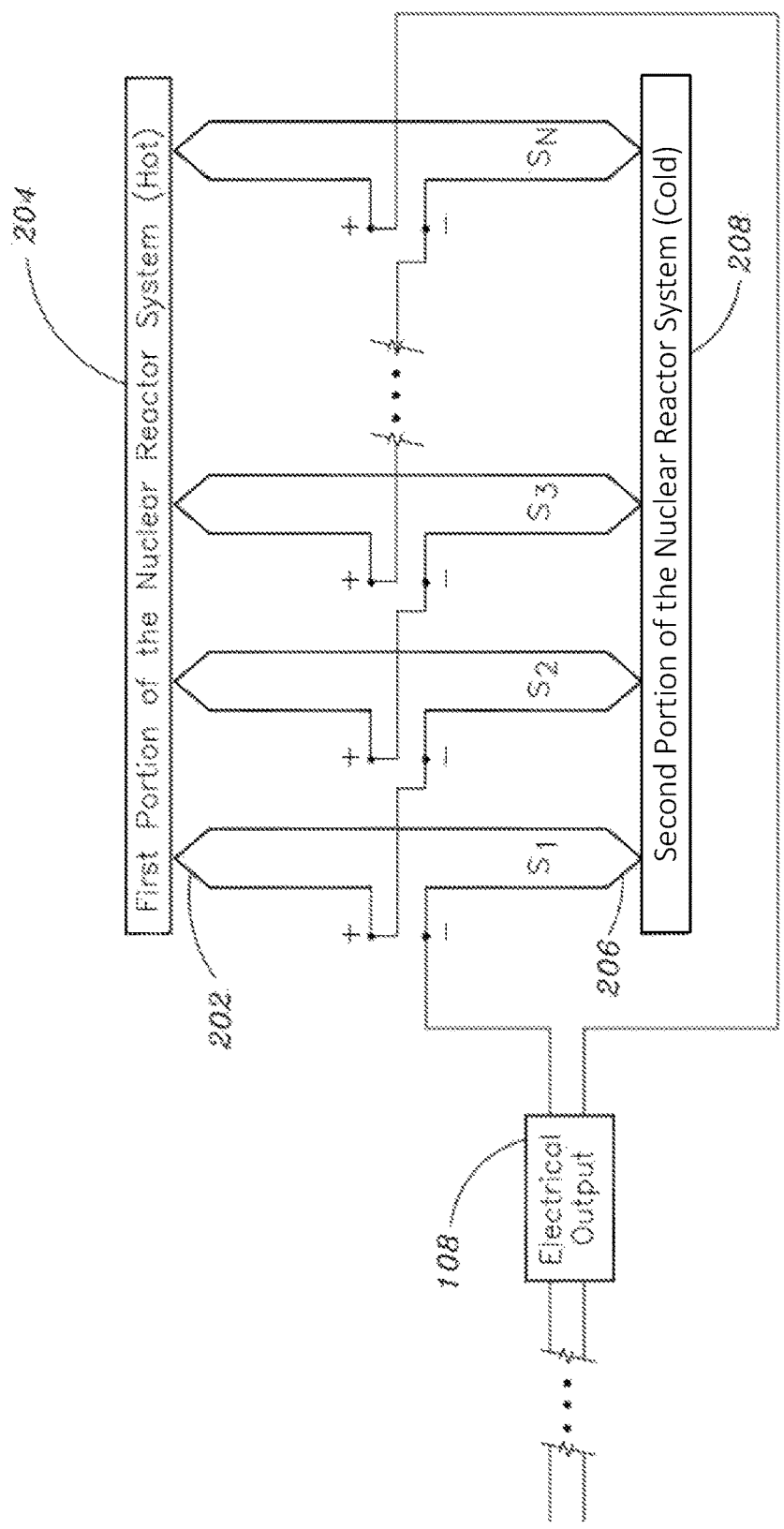
FIG. 3 is a schematic illustrating the series coupling of two or more devices suitable for the thermoelectric conversion of nuclear reactor generated heat to electrical energy.

In another embodiment, illustrated in FIG. 3, the heat generated by the nuclear reactor 102 may be converted to electrical energy using two or more series coupled thermoelectric devices 104. For example, the heat generated by the nuclear reactor 102 may be converted to electrical energy using a first thermoelectric device $S_1$ and a second thermoelectric device $S_2$, wherein the first thermoelectric device $S_1$ and the second thermoelectric device $S_2$ are electrically coupled in series. By way of further example, the heat generated by the nuclear reactor 102 may be converted to electrical energy using a first thermoelectric device $S_1$, a second thermoelectric device $S_2$, a third thermoelectric device $S_3$, and up to and including an Nth thermoelectric device $S_N$, where the first thermoelectric device $S_1$, the second thermoelectric device $S_2$, the third thermoelectric device $S_3$, and the Nth thermoelectric device $S_N$ are electrically coupled in series. Then, the activation circuitry 106 may selectively transfer the electrical energy from the electrical output 108 of the series coupled thermoelectric devices $S_1$-$S_N$ to an operation system 110 of the nuclear reactor system 100.

Figure 4:
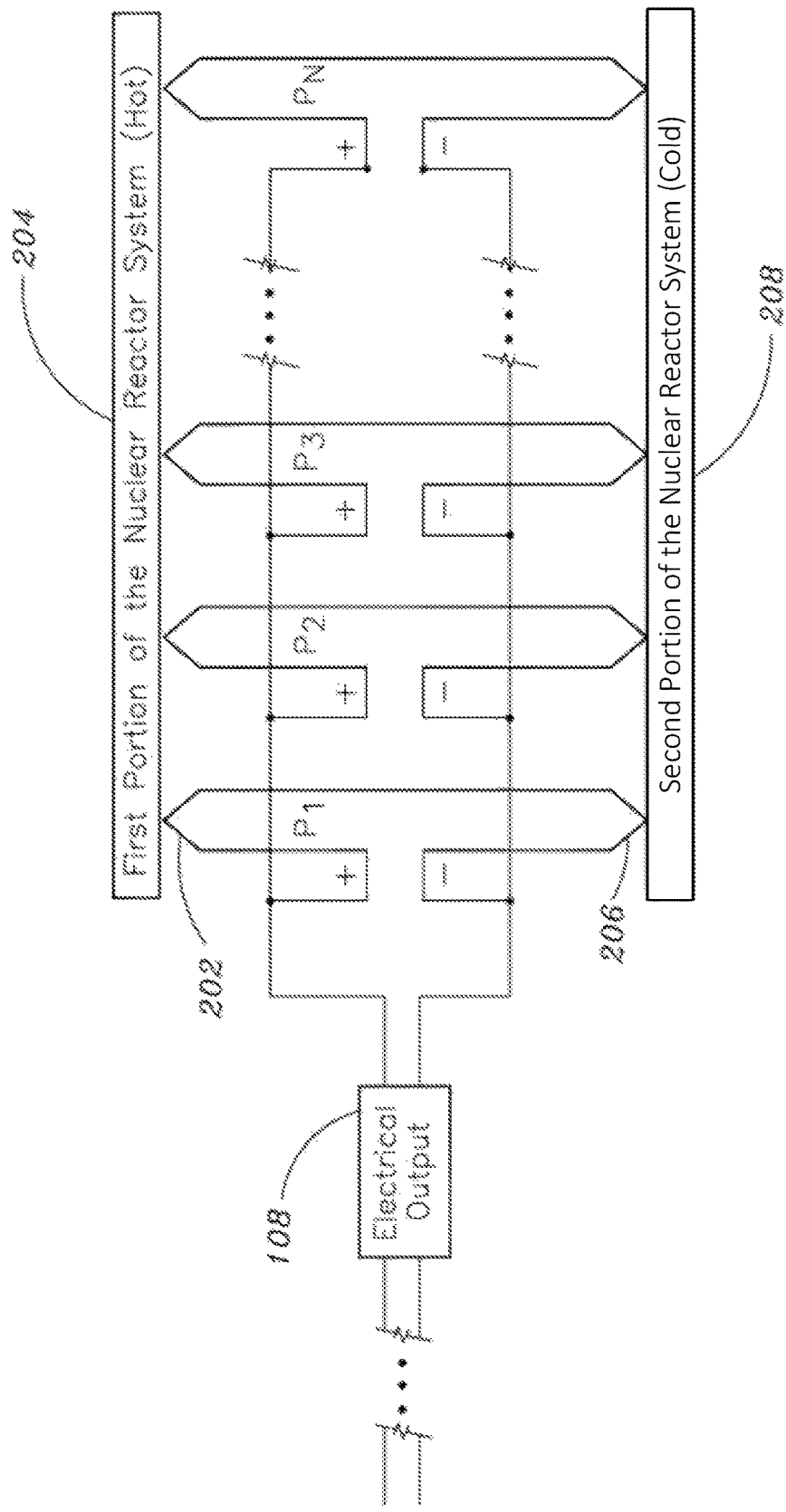
FIG. 4 is a schematic illustrating the parallel coupling of two or more devices suitable for the thermoelectric conversion of nuclear reactor generated heat to electrical energy.

In another embodiment, illustrated in FIG. 4, the heat generated by the nuclear reactor 102 may be converted to electrical energy using two or more parallel coupled thermoelectric devices 104. For example, the heat generated by the nuclear reactor 102 may be converted to electrical energy using a first thermoelectric device $P_1$ and a second thermoelectric device $P_2$, where the first thermoelectric device $P_1$ and the second thermoelectric device $P_2$ are electrically coupled in parallel. By way of further example, the heat generated by the nuclear reactor 102 may be converted to electrical energy using a first thermoelectric device $P_1$, a second thermoelectric device $P_2$, a third thermoelectric device $P_3$, and up to and including an Nth thermoelectric device $P_N$, where the first thermoelectric device $P_1$, the second thermoelectric device $P_2$, the third thermoelectric device $P_3$, and the Nth thermoelectric device $P_N$ are electrically coupled in parallel. Then, the activation circuitry 106 may selectively transfer the electrical energy from the electrical output 108 of the parallel coupled thermoelectric devices $P_1$-$P_N$ to an operation system 110 of the nuclear reactor system 100.

Figure 5:
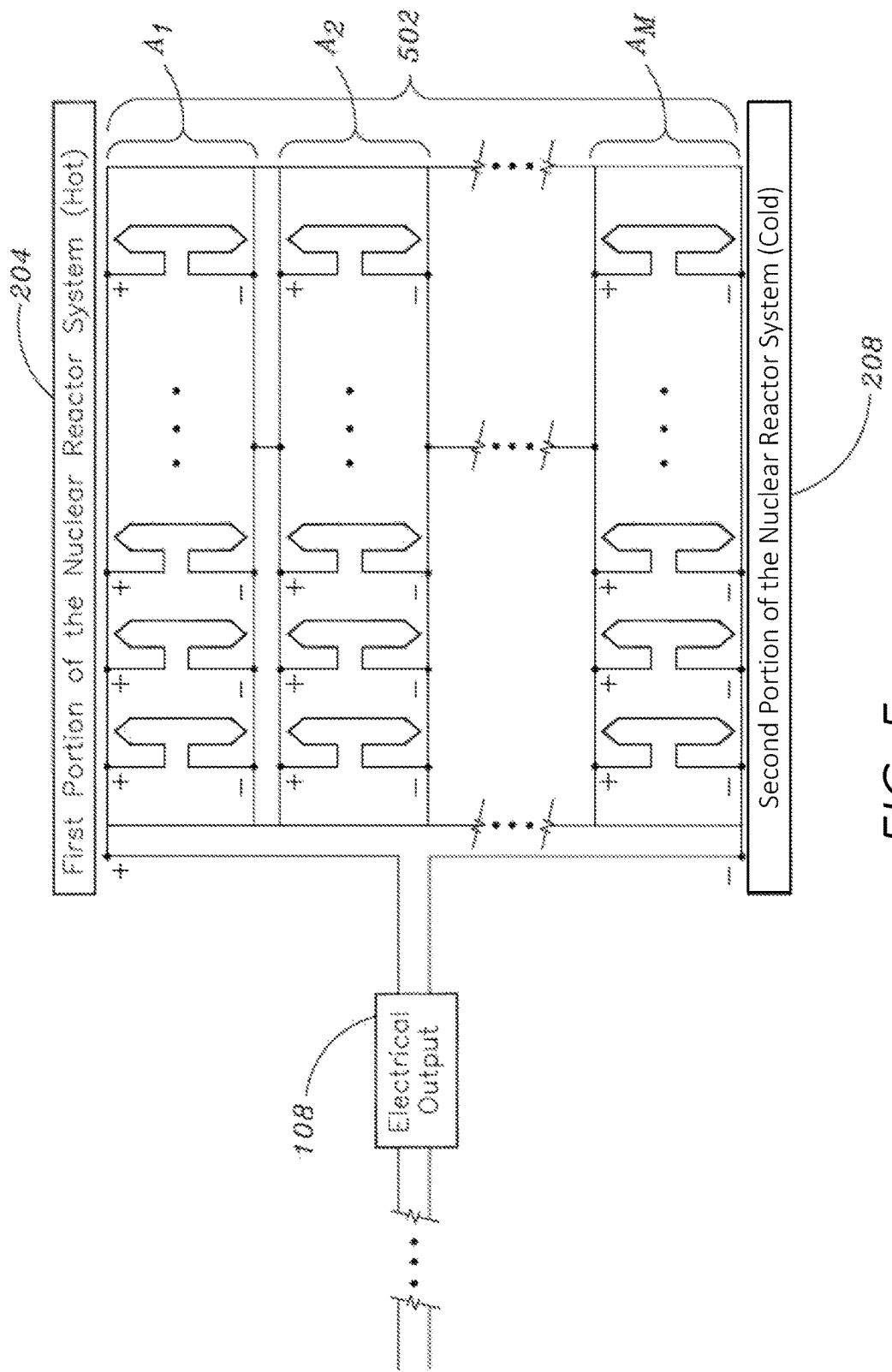
FIG. 5 is a schematic illustrating a thermoelectric module suitable for the thermoelectric conversion of nuclear reactor generated heat to electrical energy.

In another embodiment, illustrated in FIG. 5, the heat generated by the nuclear reactor 102 may be converted to electrical energy using one or more thermoelectric modules 502. For example, a thermoelectric module 502 in thermal communication with the nuclear reactor system 100 (e.g., the first portion of a thermoelectric module in thermal communication with a heat source 210 and the second portion of a thermoelectric module in thermal communication with an environmental reservoir 234) may convert nuclear reactor 102 generated heat to electrical energy. For example, the thermoelectric module 502 may comprise a prefabricated network of parallel coupled thermoelectric devices, series coupled thermoelectric devices, and combinations of parallel coupled and series coupled thermoelectric devices. By way of further example, a thermoelectric module 502 may include a first set of parallel coupled thermoelectric devices $A_1$, a second set of parallel coupled thermoelectric devices $A_2$, and up to and including a Mth set of parallel coupled thermoelectric devices $A_M$, wherein the first set of devices $A_1$, the second set of devices $A_2$, and the Mth set of devices $A_M$ are electrically coupled in series. By way of further example, a thermoelectric module 502 may include a first set of series coupled thermoelectric devices, a second set of series coupled thermoelectric devices, and up to and including a Mth set of series coupled thermoelectric devices, wherein the first set of devices, the second set of devices, and the Mth set of devices are electrically coupled in parallel.

Figure 6:
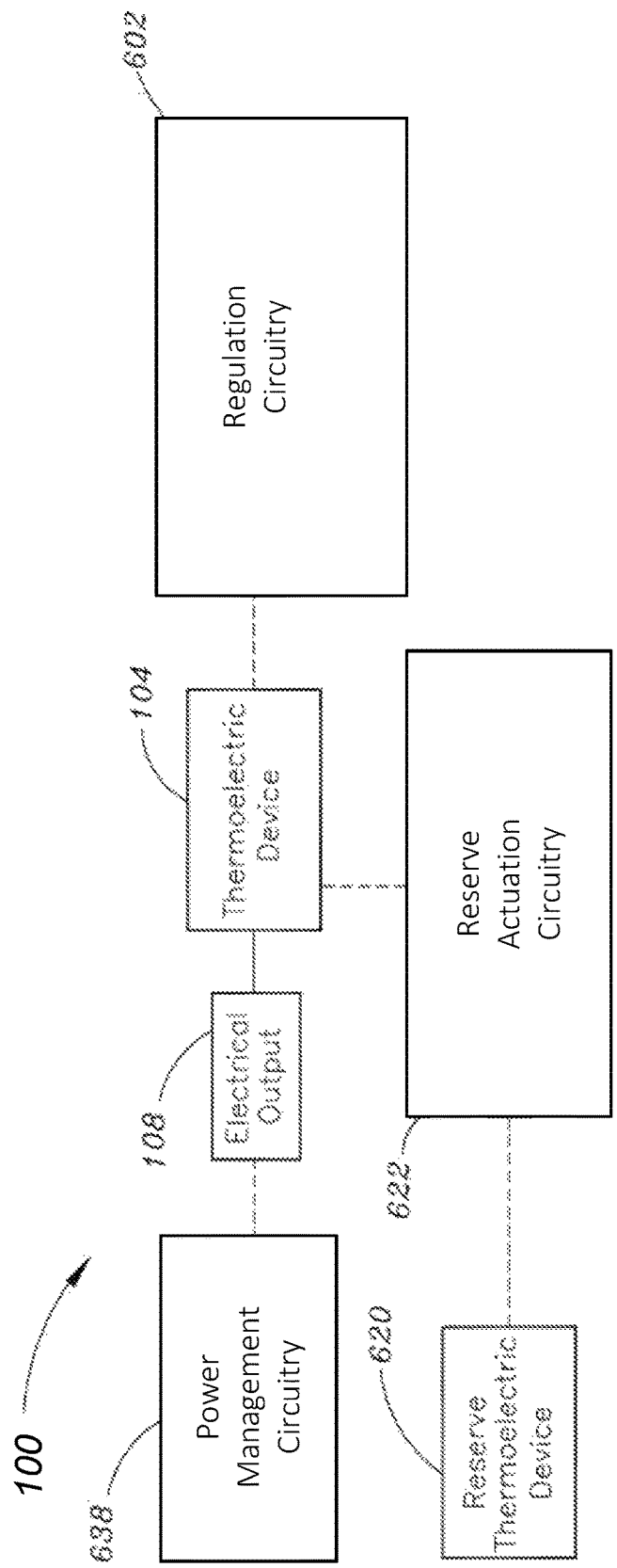
FIG. 6 is a schematic illustrating regulation circuitry coupled to a thermoelectric device for protecting the thermoelectric device, power management circuitry coupled to the output the thermoelectric device for modifying the electrical output the thermoelectric device, and a reserve thermoelectric device, activated by reserve actuation circuitry, for augmenting the thermoelectric device.

In certain embodiments, as illustrated in FIG. 6, the thermoelectric device 104 used to convert heat produced by the nuclear reactor system 100 to electrical energy may be protected with regulation circuitry 602, such as voltage regulation circuitry (e.g., voltage regulator), current limiting circuitry (e.g., blocking diode or fuse), or bypass circuitry (e.g., bypass diode or active bypass circuitry). For example, the regulation circuitry 602 used to protect the thermoelectric device 104 may include a fuse, wherein the fuse is used to limit current from passing through a short-circuited portion of a set of two or more thermoelectric devices 104. In a further embodiment, bypass circuitry configured to actively electrically bypass one or more than one thermoelectric devices 104 may be used to protect one or more thermoelectric devices 104. For example, the bypass circuitry configured to actively electrically bypass a thermoelectric device 104 may include, but is not limited to, an electromagnetic relay system, a solid state relay system, a transistor, or a microprocessor controlled relay system. By way of further example, the microprocessor controlled relay system used to electrically bypass a thermoelectric device 104 may be responsive to an external condition (e.g., signal from an operator) or an internal condition (e.g., amount of current flowing through a specified thermoelectric device).

In another embodiment, one or more thermoelectric devices 104 used to convert heat produced by the nuclear reactor system 100 to electrical energy may be augmented by one or more reserve thermoelectric devices 620 (e.g., a thermoelectric junction or a thermoelectric module) and reserve actuation circuitry 622. For example, the electrical output 108 of one or more thermoelectric devices 104 may be augmented using the output of one or more reserve thermoelectric devices 620, wherein the one or more reserve thermoelectric devices may be selectively coupled to one or more thermoelectric devices 104 using reserve actuation circuitry 622. By way of further example, in the event a first thermoelectric device 104 of a set of thermoelectric devices 104 fails, a reserve thermoelectric device 620 may be coupled to the set of thermoelectric devices 104 in order to augment the output of the set of thermoelectric devices. By way of further example, the reserve actuation circuitry 622 used to selectively couple the one or more reserve thermoelectric devices 620 with the one or more thermoelectric devices 104 may include, but is not limited to, a relay system, an electromagnetic relay system, a solid state relay system, a transistor, a microprocessor controlled relay system, a microprocessor controlled relay system programmed to respond to an external condition (e.g., required electrical power output of nuclear reactor system 100 or availability of external electric grid power), or a microprocessor controlled relay system programmed to respond to an internal condition (e.g., output of one or more thermoelectric devices 104).

In another embodiment, the electrical output 108 of one or more than one thermoelectric device 104 used to convert heat produced by the nuclear reactor system 100 to electrical energy may be modified using power management circuitry 638. For example, the power management circuitry 638 used to modify the electrical output 108 of a thermoelectric device 104 may include, but is not limited to, a power converter, voltage converter (e.g., a DC-DC converter or a DC-AC inverter), or voltage regulation circuitry. By way of further example, the voltage regulation circuitry used to modify the electrical output 108 of a thermoelectric device 104 may include, but is not limited to, a Zener diode, a series voltage regulator, a shunt regulator, a fixed voltage regulator or an adjustable voltage regulator.

While the primary systems of the present disclosure have been described in accordance with the selective transfer of thermoelectrically generated electrical energy to various operation systems of a nuclear reactor system, this approach may also be used to continuously supply thermoelectrically generated electrical energy to a security system of the nuclear reactor system 100.

Figure 1D:
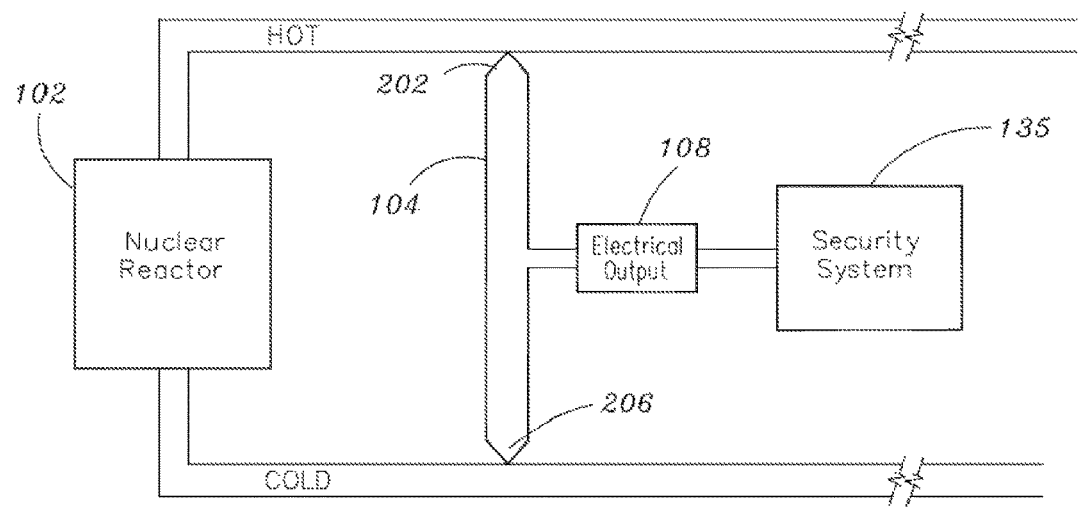
FIG. 1D is a schematic illustrating a system for the thermoelectric conversion of nuclear reactor generated heat to electrical energy and the continuous transfer of the electrical energy to a security system of the nuclear reactor system.

For example, as illustrated in FIG. 1D, the thermoelectric device 104 may convert heat produced by the nuclear reactor 102 of a nuclear reactor system 100 to electrical energy. Then, the electrical output 108 may continuously transfer the electrical energy to a security system 135 of the nuclear reactor system 100. Further, the thermoelectric device 104 may be connected in parallel with a primary power source of the security system of the nuclear reactor system 100. For instance, the electrical output 108 of the thermoelectric device 104 may provide power to the security system 135 of the nuclear reactor system 100 independent of the primary power source of the security system 135 of the nuclear reactor system 100. The electrical energy supplied from the electrical output 108 of the thermoelectric device 104 to the security system 135 of the nuclear reactor system may be used to augment the electrical energy supplied to the security system 135 by the primary power source of the security system 135 or may act as a redundant electrical power backup to the primary power source of the security system 135 of the nuclear reactor system.

Further, in response to the electrical energy continuously transferred from the thermoelectric device 104, the security system 135 may transmit a signal (e.g., wireline signal or wireless signal) to an additional operation system (e.g., control system 128, warning system 136 or shutdown system 138) of the nuclear reactor system 100. Additionally, in response to the electrical energy transferred from the thermoelectric device 104, the security system 135 may transmit a signal to a subsystem (e.g., alarm system, perimeter controls, locks, or fences) of the security system 135 of the nuclear reactor system 100.

While the primary systems of the present disclosure have been described in accordance with the selective transfer of thermoelectrically generated electrical energy to various operation systems of a nuclear reactor system, systems for the continuous or selective transfer of thermoelectrically generated electrical energy to operation systems 110 of the nuclear reactor system 100 may be configured such that the thermoelectric electric device 104 is thermally coupled in parallel with a heat exchanger 105 of the nuclear reactor system 100.

Figure 1E:
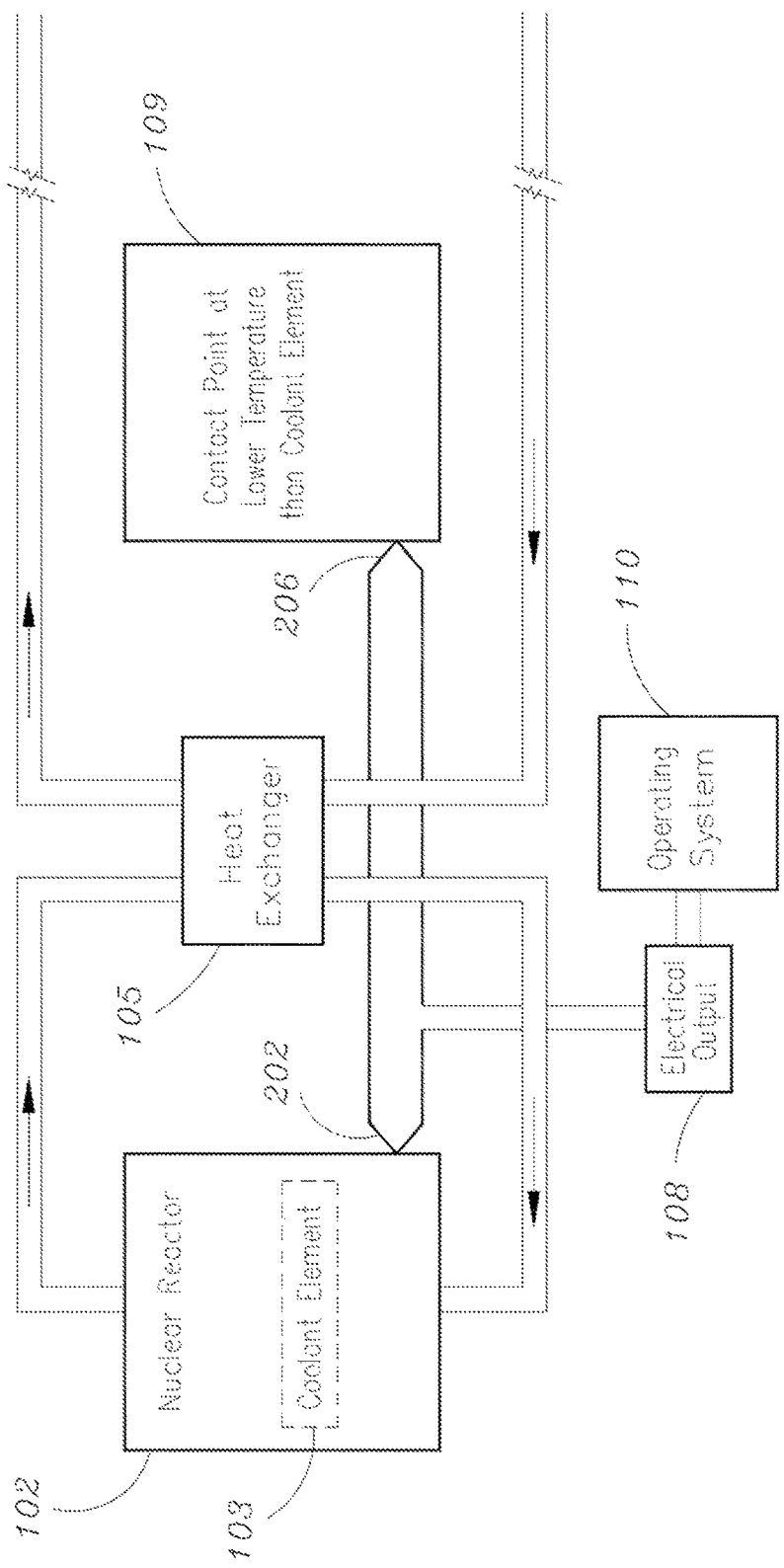
FIG. 1E is a schematic illustrating a system for the thermoelectric conversion of nuclear reactor generated heat to electrical energy utilizing a heat exchanger.

For example, as illustrated in FIG. 1E, a first portion 202 of the thermoelectric device 104 may be placed in thermal communication with a first coolant element 103 (e.g., coolant element of primary coolant system 103, coolant pipe, or hot side of a heat exchanger of the nuclear reactor) of the nuclear reactor system 100 and a second portion 206 of the thermoelectric device 104 may be placed in thermal communication with a portion 109 (e.g., cold side of the heat exchanger, coolant element, or portion in thermal communication with cold reservoir) of the nuclear reactor system 100 at a lower temperature than the first coolant element 103, wherein a heat exchanger 105 is thermally coupled in parallel with the thermoelectric device 104. For instance, a first portion 202 of the thermoelectric device may be placed in thermal communication with a first portion of a heat exchanger 105 and a second portion 206 of the thermoelectric device 104 may be placed in thermal communication with a portion of the heat exchanger 105 at a lower temperature than the first portion of the heat exchanger 105. Then, the electrical energy may be continuously or selectively transferred from at least one electrical output 108 of the thermoelectric device 104 to an operation system 110 of the nuclear reactor system 100.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 7:
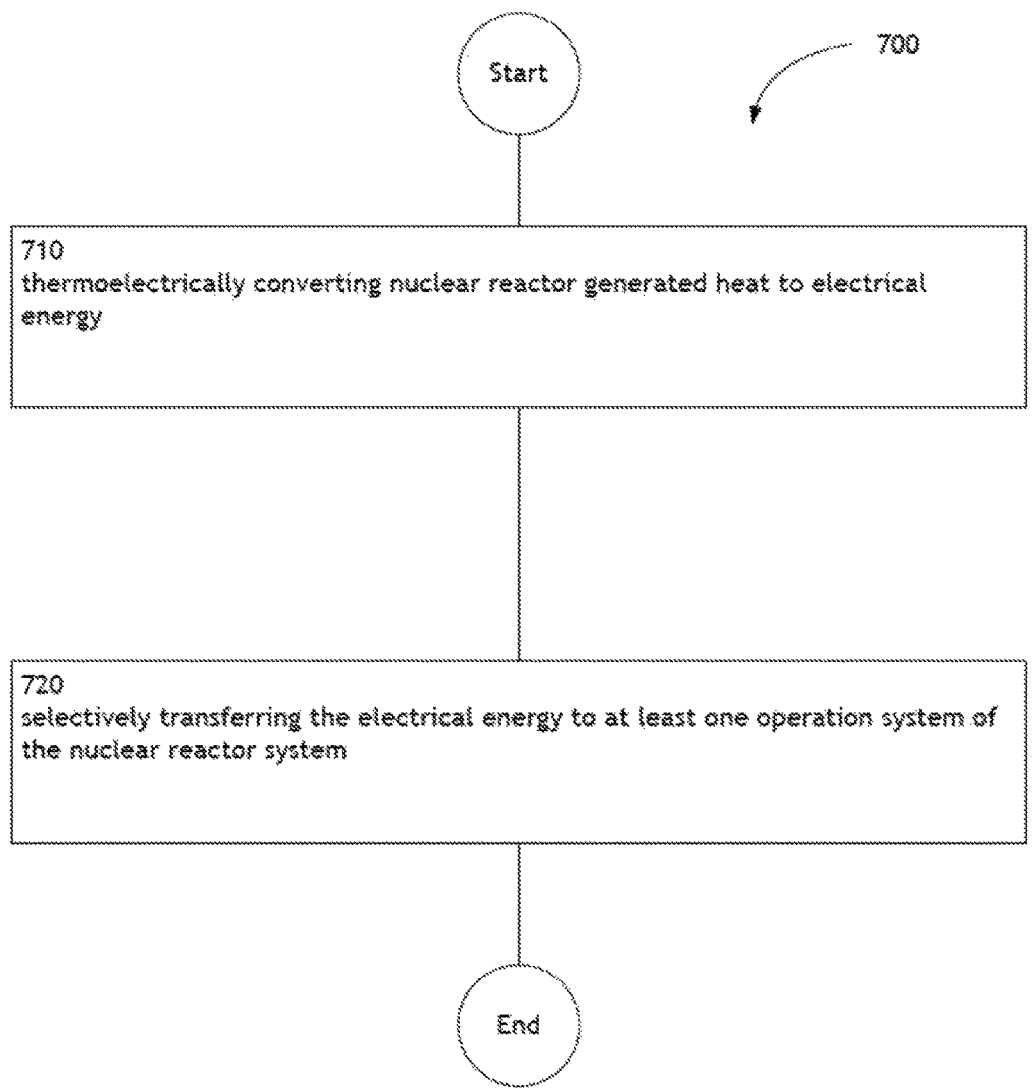
FIG. 7 is a high-level flowchart of a method for thermoelectrically converting nuclear reactor generated heat to electrical energy.

FIG. 7 illustrates an operational flow 700 representing example operations related to the selective transfer of thermoelectrically generated electrical energy to operation systems of a nuclear reactor system. In FIG. 7 and in following figures that include various examples of operational flows, discussion and explanation may be provided with respect to the above-described examples of FIGS. 1A through 6, and/or with respect to other examples and contexts. However, it should be understood that the operational flows may be executed in a number of other environments and contexts, and/or in modified versions of FIGS. 1A through 6. Also, although the various operational flows are presented in the sequence(s) illustrated, it should be understood that the various operations may be performed in other orders than those which are illustrated, or may be performed concurrently.

After a start operation, the operational flow 700 moves to a converting operation 710. Operation 710 depicts thermoelectrically converting nuclear reactor generated heat to electrical energy. For example, as shown in FIG. 1A, a thermoelectric device 104 may convert heat produced by a nuclear reactor 100 to electrical energy.

Then, the transfer operation 720 depicts selectively transferring the electrical energy to at least one operation system of the nuclear reactor system. For example, as shown in FIG. 1A, the activation circuitry 106 (e.g., coupling circuitry responsive to a condition) may selectively transfer the electrical energy from an electrical output 108 of the thermoelectric device 104 to an operation system 110 of the nuclear reactor system 100.

Figure 8:
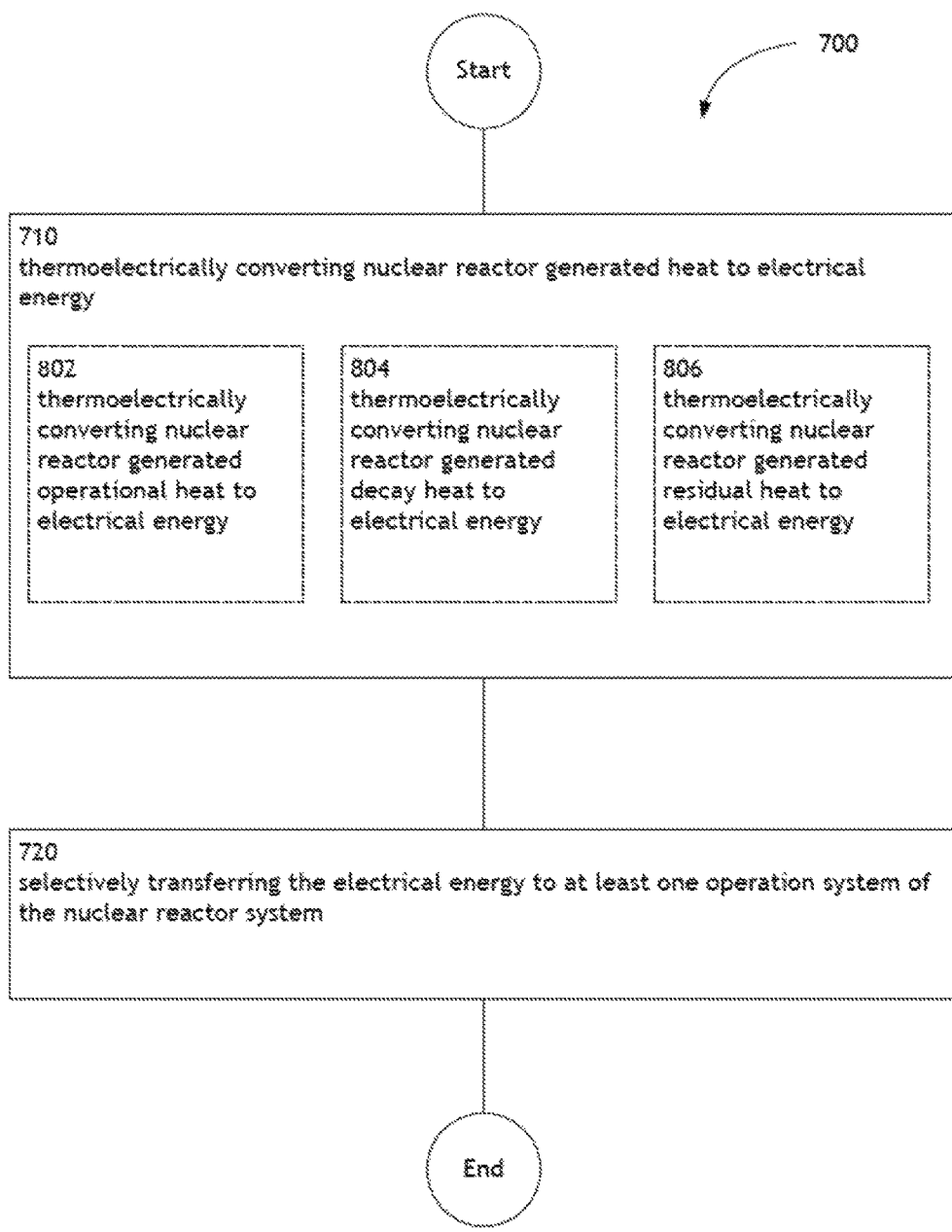
FIGS. 8 through 49 are high-level flowcharts depicting alternate implementations of FIG. 7.

FIG. 8 illustrates alternative embodiments of the example operational flow 700 of FIG. 7. FIG. 8 illustrates example embodiments where the converting operation 710 may include at least one additional operation. Additional operations may include an operation 802, an operation 804, and/or an operation 806.

At operation 802, operational heat generated by a nuclear reactor may be thermoelectrically converted to electrical energy. For example, as shown in FIG. 1A, the thermoelectric device 104 may thermoelectrically convert operational heat 122 produced by the nuclear reactor 102 of the nuclear reactor system 100 to electrical energy.

At operation 804, decay heat generated by a nuclear reactor may be thermoelectrically converted to electrical energy. For example, as shown in FIG. 1A, the thermoelectric device 104 may thermoelectrically convert radioactive decay heat 124 produced in the remnant nuclear fission products of the nuclear reactor 102 after shutdown of the nuclear reactor 102 to electrical energy.

At operation 806, residual heat generated by a nuclear reactor may be thermoelectrically converted to electrical energy. For example, as shown in FIG. 1A, the thermoelectric device 104 may thermoelectrically convert residual heat 126 remaining in the nuclear reactor 102 after shutdown of the nuclear reactor 102 to electrical energy.

Figure 9:
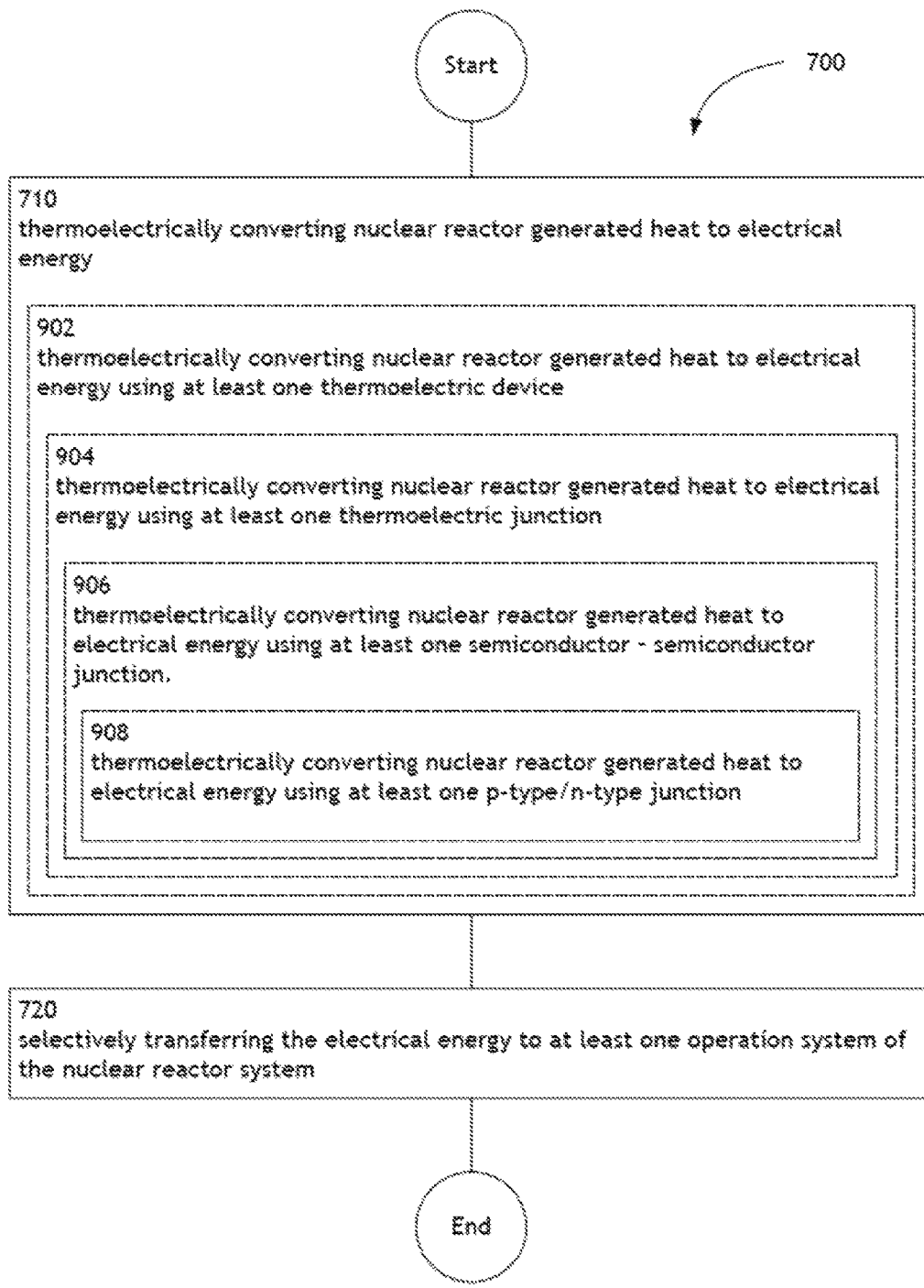

FIG. 9 illustrates alternative embodiments of the example operational flow 700 of FIG. 7. FIG. 9 illustrates example embodiments where the converting operation 710 may include at least one additional operation. Additional operations may include an operation 902, an operation 904, an operation 906, and/or an operation 908.

At operation 902, nuclear reactor generated heat may be converted to electrical energy using at least one thermoelectric device. For example, as shown in FIGS. 1A through 6, a thermoelectric device 104 placed in thermal communication with the nuclear reactor system 100 may convert heat produced by the nuclear reactor system 100 to electrical energy.

Further, the operation 904 illustrates thermoelectrically converting nuclear reactor generated heat to electrical energy using at least one thermoelectric junction. For example, as shown in FIG. 2, the thermoelectric device may comprise a thermoelectric junction 238 (e.g., thermocouple). For instance, a thermoelectric junction 238 placed in thermal communication with the nuclear reactor system 100 may convert heat produced by the nuclear reactor system 100 to electrical energy.

Further, the operation 906 illustrates thermoelectrically converting nuclear reactor generated heat to electrical energy using at least one semiconductor—semiconductor junction. For example, as shown in FIG. 2, the thermoelectric device 104 may comprise a semiconductor-semiconductor thermoelectric junction 240 (e.g., p-type/p-type junction of different semiconductor materials). For instance, a semiconductor-semiconductor thermoelectric junction 238 placed in thermal communication with the nuclear reactor system 100 may convert heat produced by the nuclear reactor system 100 to electrical energy.

Further, the operation 908 illustrates thermoelectrically converting nuclear reactor generated heat to electrical energy using at least one p-type/n-type junction. For example, as shown in FIG. 2, the thermoelectric device 104 may comprise a p-type/n-type semiconductor junction 242 (e.g., p-doped bismuth telluride/n-doped bismuth telluride junction). For instance, a p-type/n-type semiconductor junction 242 placed in thermal communication with the nuclear reactor system 100 may convert heat produced by the nuclear reactor system 100 to electrical energy.

Figure 10:
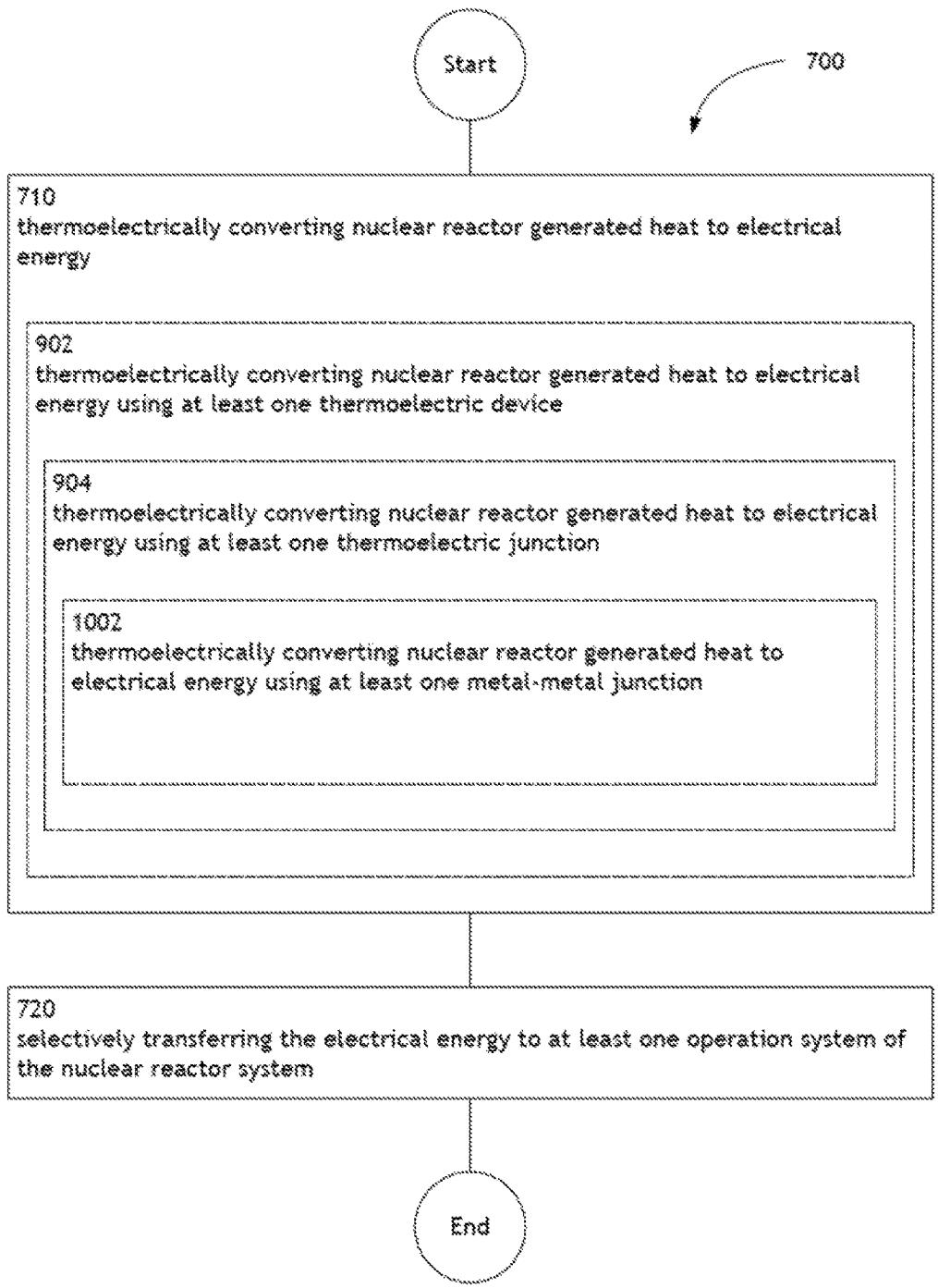

FIG. 10 illustrates alternative embodiments of the example operational flow 700 of FIG. 7. FIG. 10 illustrates example embodiments where the converting operation 710 may include at least one additional operation. Additional operations may include an operation 1002.

Further, the operation 1002 illustrates thermoelectrically converting nuclear reactor generated heat to electrical energy using at least one metal-metal junction. For example, as shown in FIG. 2, the thermoelectric device 104 may comprise a metal-metal thermoelectric junction 244 (e.g., copper-constantan junction). For instance, a metal-metal thermoelectric junction 244 placed in thermal communication with the nuclear reactor system 100 may convert heat produced by the nuclear reactor system 100 to electrical energy.

Figure 11:
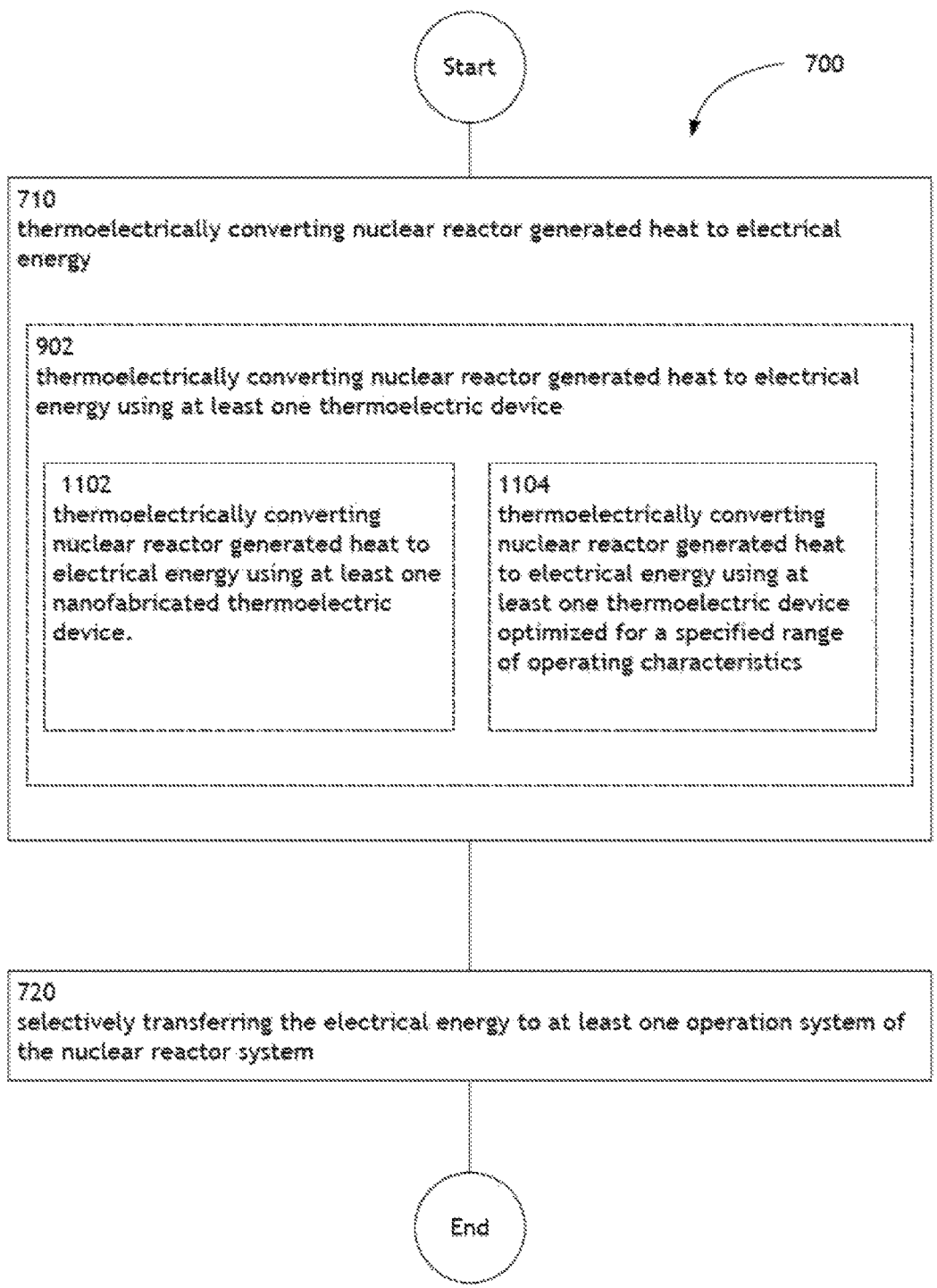

FIG. 11 illustrates alternative embodiments of the example operational flow 700 of FIG. 7. FIG. 11 illustrates example embodiments where the converting operation 710 may include at least one additional operation. Additional operations may include an operation 1102, and/or an operation 1104.

Further, the operation 1102 illustrates thermoelectrically converting nuclear reactor generated heat to electrical energy using at least one nanofabricated thermoelectric device. For example, as shown in FIG. 2, the thermoelectric device 104 may comprise a nanofabricated thermoelectric device 246 (e.g., thermoelectric device constructed partially from a nanowire material, a super lattice material, or a quantum dot material). For instance, a nanofabricated thermoelectric device 246 placed in thermal communication with the gas cooled nuclear reactor system 100 may convert heat produced by the nuclear reactor system 100 to electrical energy.

Further, the operation 1104 illustrates thermoelectrically converting nuclear reactor generated heat to electrical energy using at least one thermoelectric device optimized for a specified range of operating characteristics. For example, as shown in FIG. 2, the thermoelectric device 104 may comprise a thermoelectric device optimized for a specified range of operating characteristics 248 (e.g., range of temperature or range of pressure). For instance, a thermoelectric device optimized for a specified range of operating characteristics 248 placed in thermal communication with the nuclear reactor system 100 may convert heat produced by the nuclear reactor system 100 to electrical energy.

Figure 12:
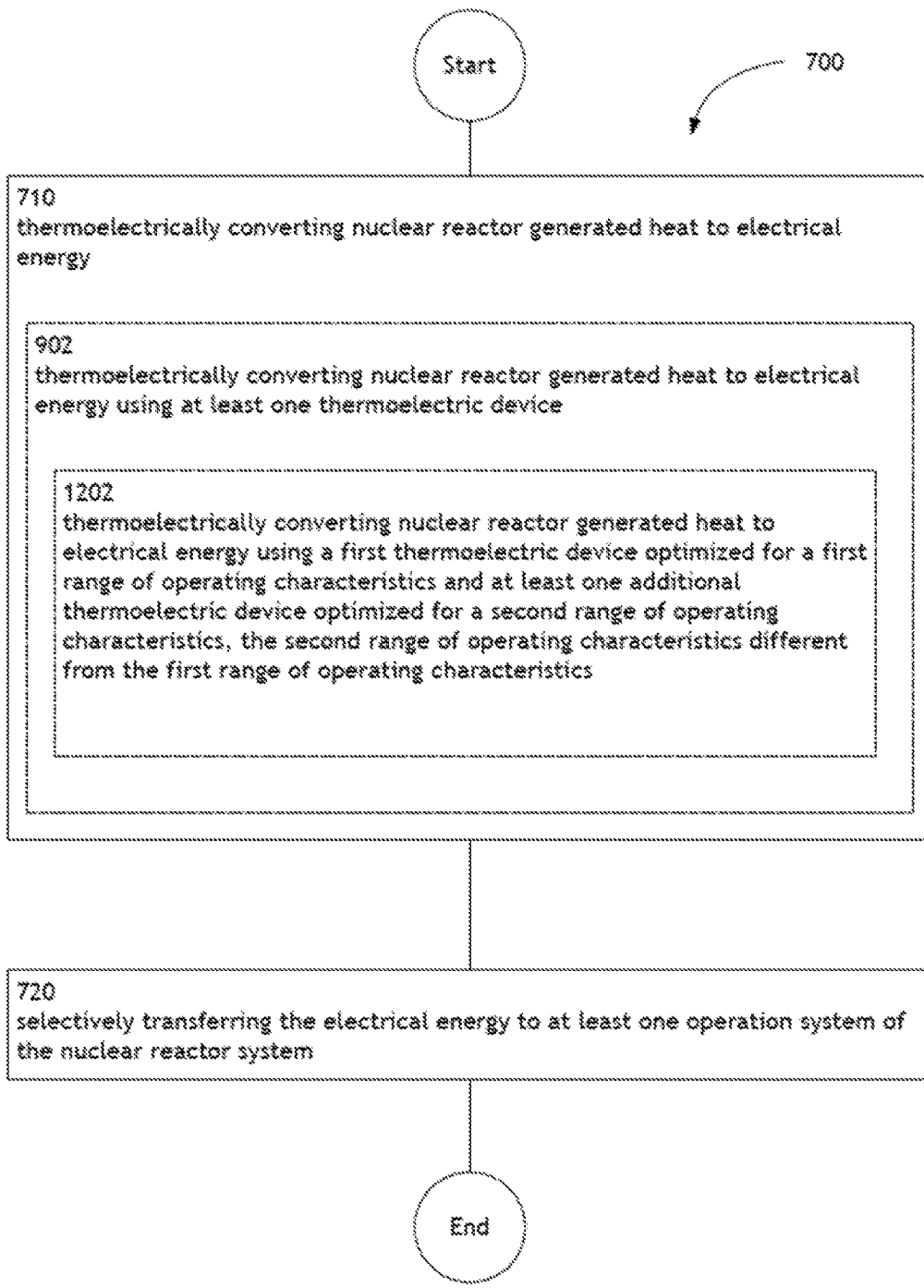

FIG. 12 illustrates alternative embodiments of the example operational flow 700 of FIG. 7. FIG. 12 illustrates example embodiments where the converting operation 710 may include at least one additional operation. Additional operations may include an operation 1202.

Further, the operation 1202 illustrates thermoelectrically converting nuclear reactor generated heat to electrical energy using a first thermoelectric device optimized for a first range of operating characteristics and at least one additional thermoelectric device optimized for a second range of operating characteristics, the second range of operating characteristics different from the first range of operating characteristics. For example, as shown in FIG. 2, a first thermoelectric device optimized for a first range of operating characteristics and a second thermoelectric device optimized for a second range of operating characteristics 250, wherein the first range of operating characteristics is different from the second range of operating characteristics, may both be placed in thermal communication with the nuclear reactor system 100. Then, the first thermoelectric device and the second thermoelectric device 250 may convert heat produced by the nuclear reactor system 100 to electrical energy.

Figure 13:
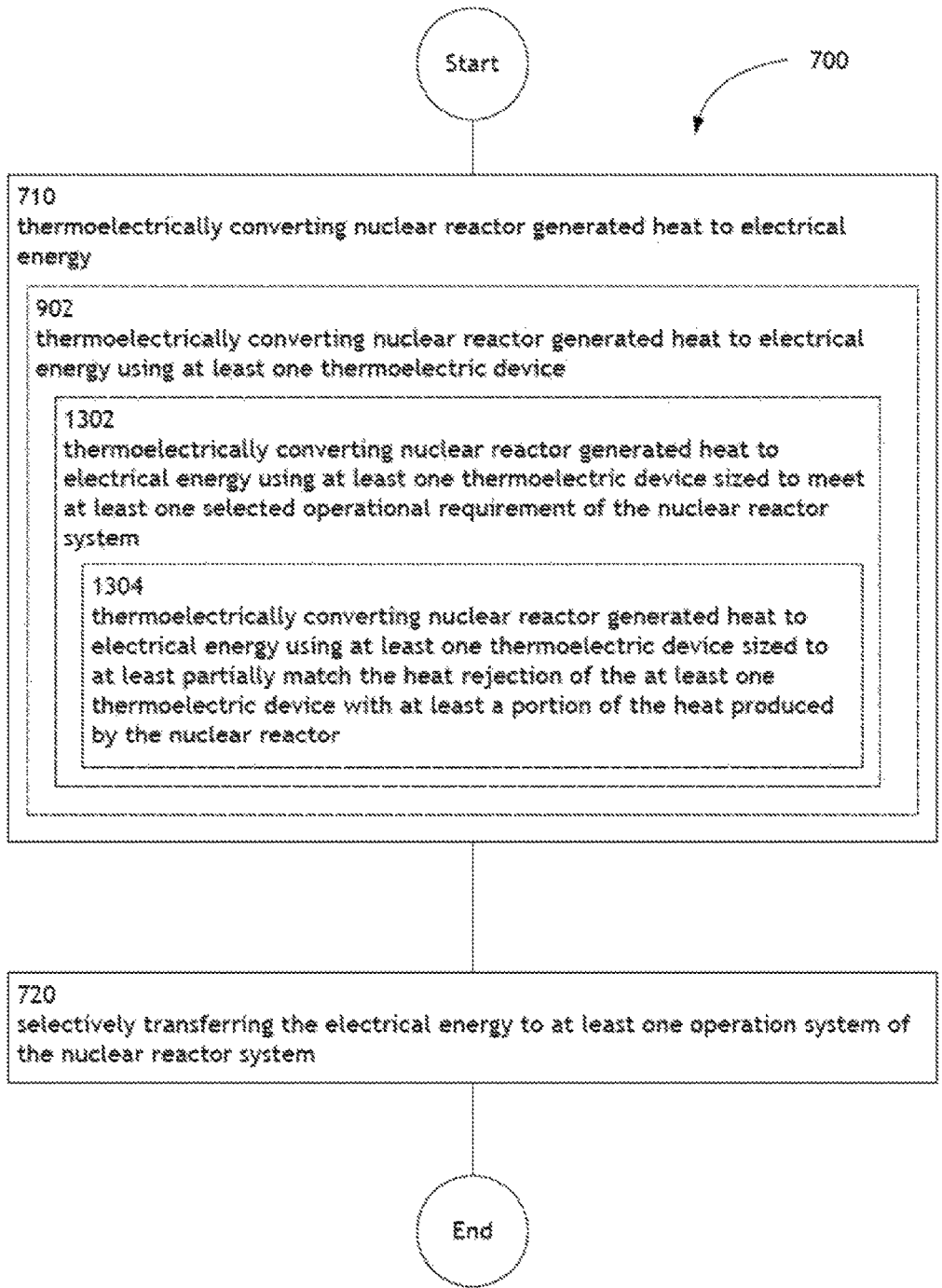

FIG. 13 illustrates alternative embodiments of the example operational flow 700 of FIG. 7. FIG. 13 illustrates example embodiments where the converting operation 710 may include at least one additional operation. Additional operations may include an operation 1302, and/or an operation 1304.

Further, the operation 1302 illustrates thermoelectrically converting nuclear reactor generated heat to electrical energy using at least one thermoelectric device sized to meet at least one selected operational requirement of the nuclear reactor system. For example, as shown in FIG. 2, a thermoelectric device 104 sized to meet an operational requirement 252 (e.g., electric power demand) of the nuclear reactor system 100 may convert heat produced by the nuclear reactor system 100 to electrical energy.

Further, the operation 1304 illustrates thermoelectrically converting nuclear reactor generated heat to electrical energy using at least one thermoelectric device sized to at least partially match the heat rejection of the at least one thermoelectric device with at least a portion of the heat produced by the nuclear reactor. For example, as shown in FIG. 2, a thermoelectric device 104 sized to match the heat rejection 254 of the thermoelectric device with the heat produced by the nuclear reactor 102 of the nuclear reactor system 100 may convert heat produced by the nuclear reactor system 100 to electrical energy.

Figure 14:
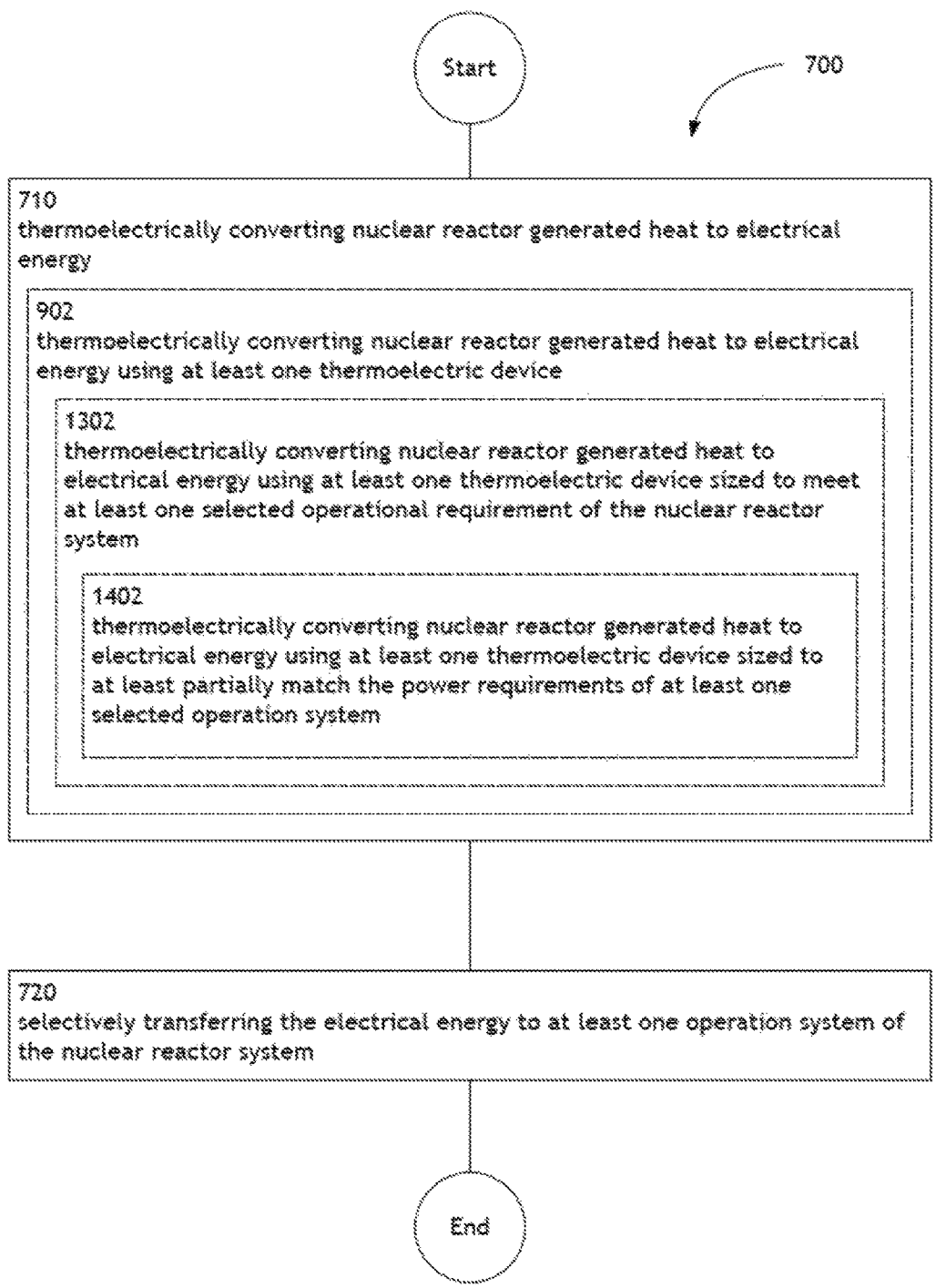

FIG. 14 illustrates alternative embodiments of the example operational flow 700 of FIG. 7. FIG. 14 illustrates example embodiments where the converting operation 710 may include at least one additional operation. Additional operations may include an operation 1402.

Further, the operation 1402 illustrates thermoelectrically converting nuclear reactor generated heat to electrical energy using at least one thermoelectric device sized to at least partially match the power requirements of at least one selected operation system. For example, as shown in FIG. 2, a thermoelectric device 104 sized to match the power requirements of a selected operation system 256 (e.g., match the power requirements of a coolant system, a control system, a shutdown system, a monitoring system, a warning system or a security system) of the nuclear reactor system 100 may convert heat produced by the nuclear reactor system 100 to electrical energy.

Figure 15:
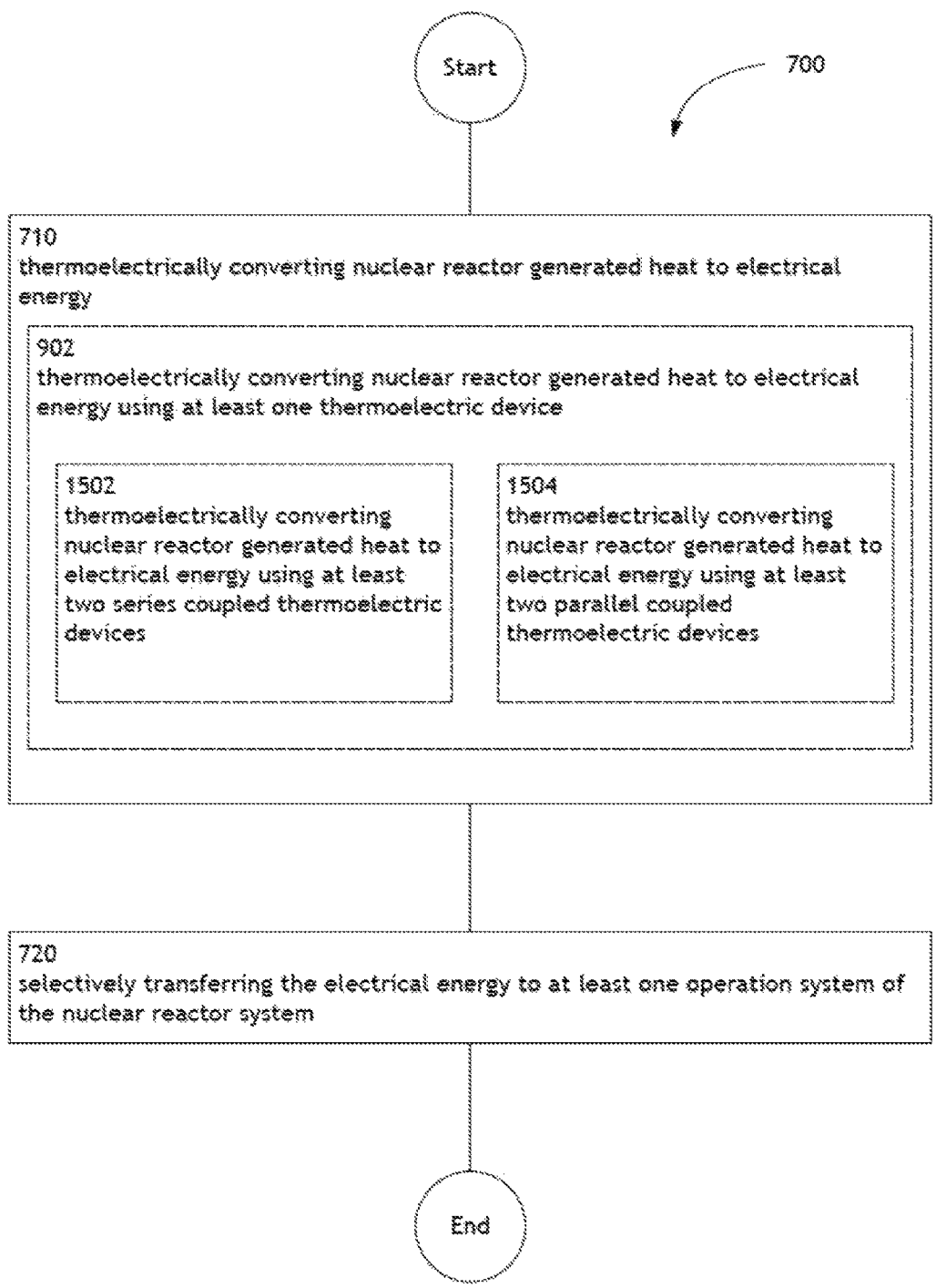

FIG. 15 illustrates alternative embodiments of the example operational flow 700 of FIG. 7. FIG. 15 illustrates example embodiments where the converting operation 710 may include at least one additional operation. Additional operations may include an operation 1502, and/or an operation 1504.

At operation 1502, nuclear reactor generated heat may be converted to electrical energy using at least two series coupled thermoelectric devices. For example, as shown in FIG. 3, a first thermoelectric device $S_1$ electrically coupled in series to a second thermoelectric device $S_2$ may convert heat produced by the nuclear reactor system 100 to electrical energy. Further, a first thermoelectric device $S_1$, a second thermoelectric device $S_2$, a third thermoelectric device $S_3$, and up to and including a Nth thermoelectric device $S_N$ may be used to convert gas cooled nuclear reactor generated heat to electric energy, wherein the first thermoelectric device $S_1$, the second thermoelectric device $S_2$, the third thermoelectric device $S_3$, and up to and including the Nth thermoelectric device $S_N$ are series coupled.

At operation 1504, nuclear reactor generated heat may be converted to electrical energy using at least two parallel coupled thermoelectric devices. For example, as shown in FIG. 4, a first thermoelectric device $P_1$ electrically coupled in parallel to a second thermoelectric device $P_2$ may convert heat produced by the nuclear reactor system 100 to electrical energy. Further, a first thermoelectric device $P_1$, a second thermoelectric device $P_2$, a third thermoelectric device $P_3$, and up to and including a Nth thermoelectric device $P_N$ may be used to convert nuclear reactor generated heat to electric energy, where the first thermoelectric device $P_1$, the second thermoelectric device $P_2$, the third thermoelectric device $P_3$, and up to and including the Nth thermoelectric device $P_N$ are parallel coupled.

Figure 16:
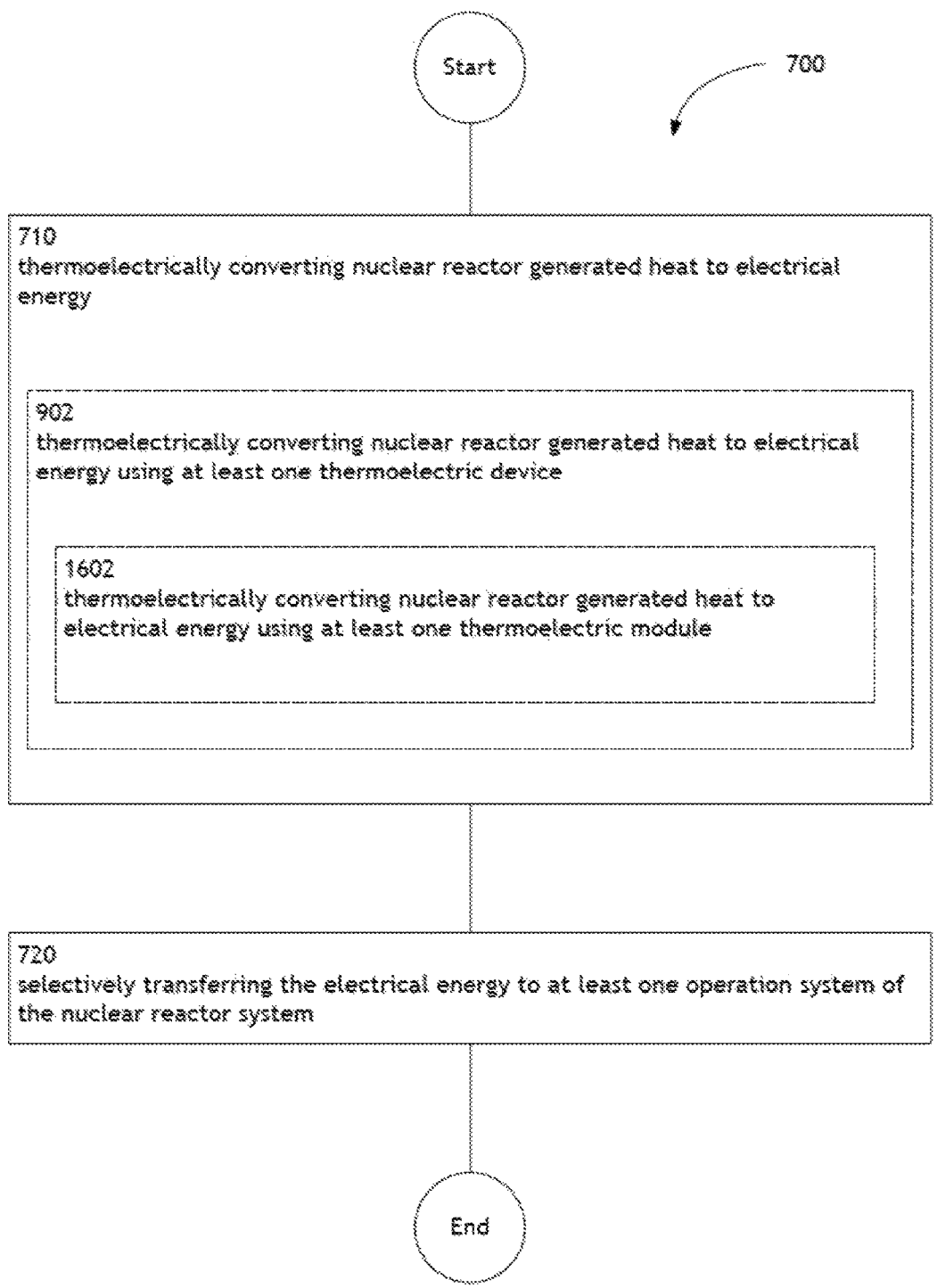

FIG. 16 illustrates alternative embodiments of the example operational flow 700 of FIG. 7. FIG. 16 illustrates example embodiments where the converting operation 710 may include at least one additional operation. Additional operations may include an operation 1602.

At operation 1602, nuclear reactor generated heat may be converted to electrical energy using at least one thermoelectric module. For example, as shown in FIG. 5, a thermoelectric module 502 (e.g., a thermopile or multiple thermopiles) placed in thermal communication with the nuclear reactor system 100 may convert heat produced by the nuclear reactor system 100 to electrical energy. For example, a thermoelectric module 502 may comprise a prefabricated network of a number of series coupled thermoelectric devices, a number of parallel coupled thermoelectric devices, or combinations of parallel coupled thermoelectric devices and series coupled thermoelectric devices.

Figure 17:
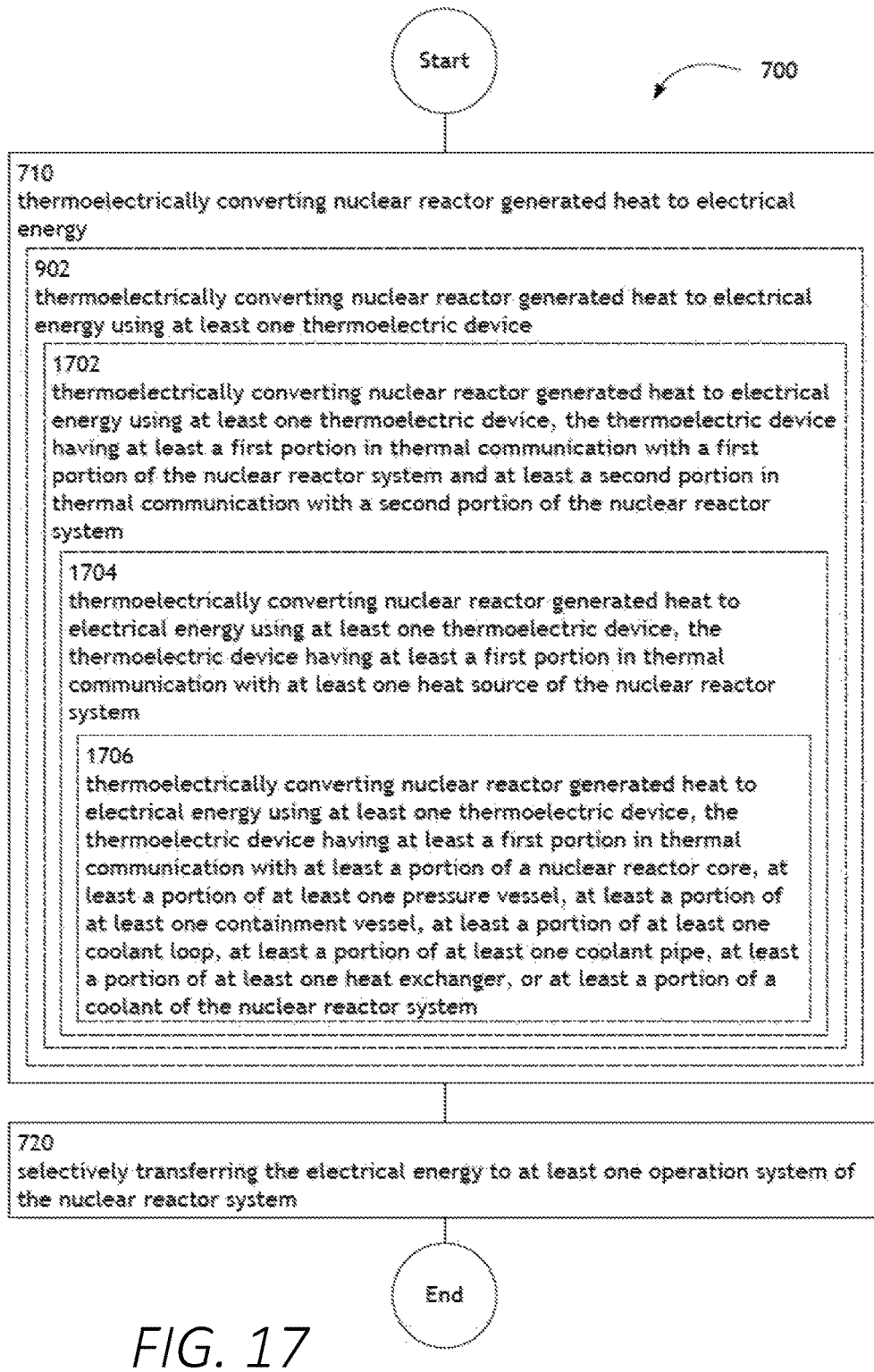

FIG. 17 illustrates alternative embodiments of the example operational flow 700 of FIG. 7. FIG. 17 illustrates example embodiments where the converting operation 710 may include at least one additional operation. Additional operations may include an operation 1702, an operation 1704, and/or an operation 1706.

Operation 1702 illustrates thermoelectrically converting nuclear reactor generated heat to electrical energy using at least one thermoelectric device, the thermoelectric device having at least a first portion in thermal communication with a first portion of the nuclear reactor system and at least a second portion in thermal communication with a second portion of the nuclear reactor system. For example, as shown in FIG. 2, a first portion 202 of a thermoelectric device 104 may be in thermal communication with a first portion 204 of a nuclear reactor system 100, while a second portion 206 of the thermoelectric device 104 may be in thermal communication with a second portion 208 of the nuclear reactor system. Then, the thermoelectric device 104 may convert heat produced by the nuclear reactor system 100 to electrical energy.

Further, operation 1704 illustrates thermoelectrically converting nuclear reactor generated heat to electrical energy using at least one thermoelectric device, the thermoelectric device having at least a first portion in thermal communication with at least one heat source of the nuclear reactor system. For example, as shown in FIG. 2, the first portion 204 of the nuclear reactor system may comprise a heat source 210 of the nuclear reactor system 100. Therefore, a first portion of a thermoelectric device 202 may be in thermal communication with a heat source 210 of the nuclear reactor system 100. Then, the thermoelectric device 104 may convert heat produced by the nuclear reactor system 100 to electrical energy.

Further, operation 1706 illustrates thermoelectrically converting nuclear reactor generated heat to electrical energy using at least one thermoelectric device, the thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of a coolant of the nuclear reactor system. For example, as shown in FIG. 2, the first portion 204 of the nuclear reactor system 100 may include, but is not limited to, a nuclear reactor core 212, a pressure vessel 214 of the nuclear reactor system 100, a containment vessel 216 of the nuclear reactor system 100, a coolant loop 218 of the nuclear reactor system 100, a coolant pipe 220 of the nuclear reactor system, a heat exchanger 222 of the nuclear reactor system 100 or the coolant 224 of the nuclear reactor system 100. By way of further example, a first portion of a thermoelectric device 202 may be in thermal communication with a coolant loop 218 of the nuclear reactor system 100. Then, the thermoelectric device 104 may convert heat produced by the nuclear reactor system 100 to electrical energy.

Figure 18:
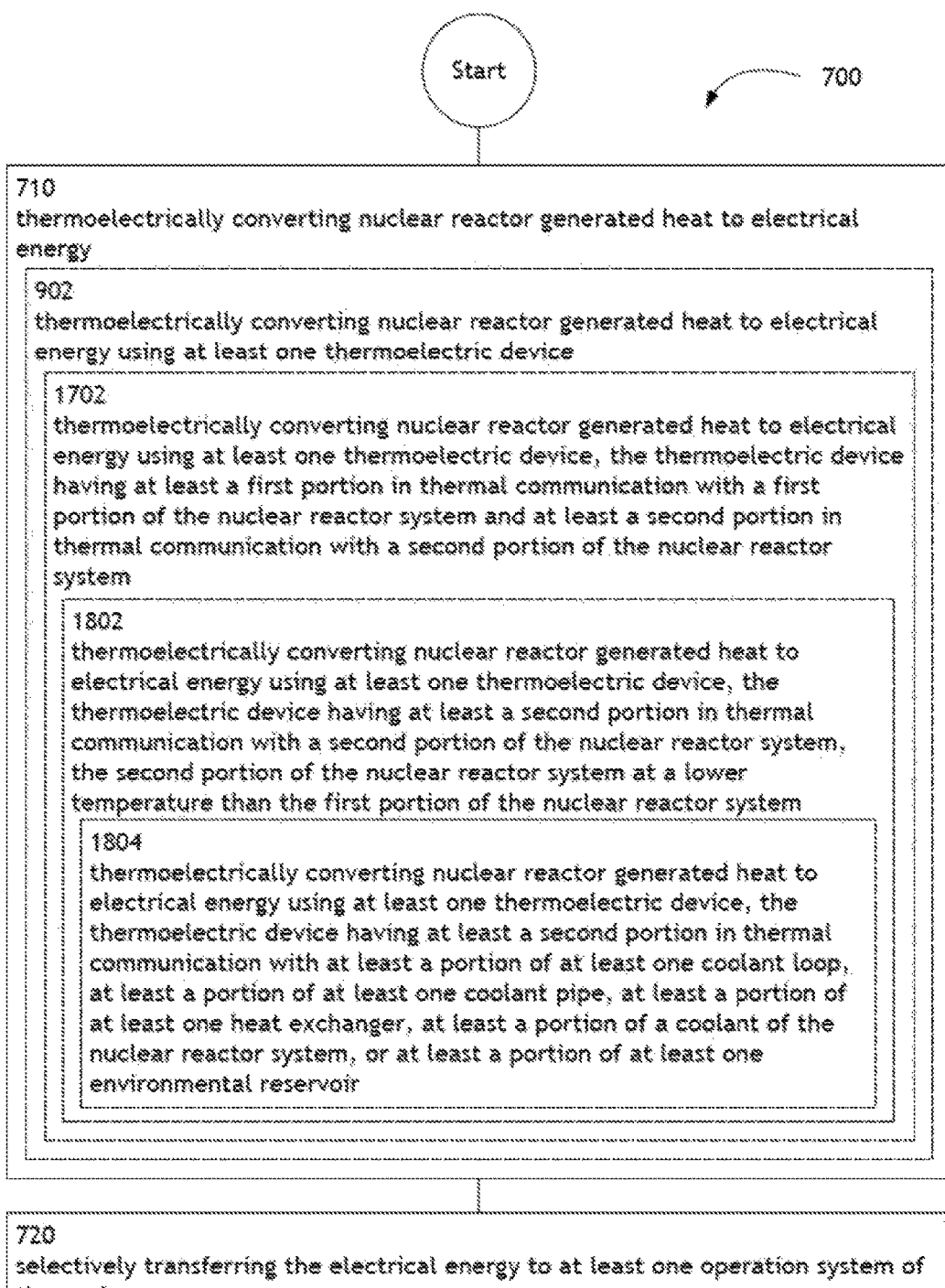

FIG. 18 illustrates alternative embodiments of the example operational flow 700 of FIG. 7. FIG. 18 illustrates example embodiments where the converting operation 710 may include at least one additional operation. Additional operations may include an operation 1802, and/or an operation 1804.

Further, operation 1802 illustrates thermoelectrically converting nuclear reactor generated heat to electrical energy using at least one thermoelectric device, the thermoelectric device having at least a second portion in thermal communication with a second portion of the nuclear reactor system, the second portion of the nuclear reactor system at a lower temperature than the first portion of the nuclear reactor system. For example, as shown in FIG. 2, a second portion 206 of a thermoelectric device 104 may be in thermal communication with a second portion 208 of a nuclear reactor system 100, where the second portion 208 of the nuclear reactor system 100 is at a lower temperature than the first portion 204 of the nuclear reactor system 100. Then, the thermoelectric device 104 may convert heat produced by the nuclear reactor system 100 to electrical energy.

Further, operation 1804 illustrates thermoelectrically converting nuclear reactor generated heat to electrical energy using at least one thermoelectric device, the thermoelectric device having at least a second portion in thermal communication with at least a portion of at least one coolant loop, at least a portion of at least one coolant pipe, at least a portion of at least one heat exchanger, at least a portion of a coolant of the nuclear reactor system, or at least a portion of at least one environmental reservoir. For example, as shown in FIG. 2, the second portion 208 of the nuclear reactor system 100, which is at a temperature lower than the first portion 204 of the nuclear reactor system, may include, but is not limited to, a coolant loop 226 of the nuclear reactor system 100, a coolant pipe 228 of the nuclear reactor system 100, a heat exchanger 230 of the nuclear reactor system 100, coolant 232 of the nuclear reactor system 100, or an environmental reservoir 234 (e.g., body of water, subterranean structure, or the atmosphere). By way of further example, the second portion 206 of a thermoelectric device 104 may be in thermal communication with a coolant pipe 228 of the nuclear reactor system 100, where the coolant pipe 228 is at a temperature lower than the first portion of the nuclear reactor system 204. Then, the thermoelectric device 104 may convert heat produced by the nuclear reactor system 100 to electrical energy.

Figure 19:
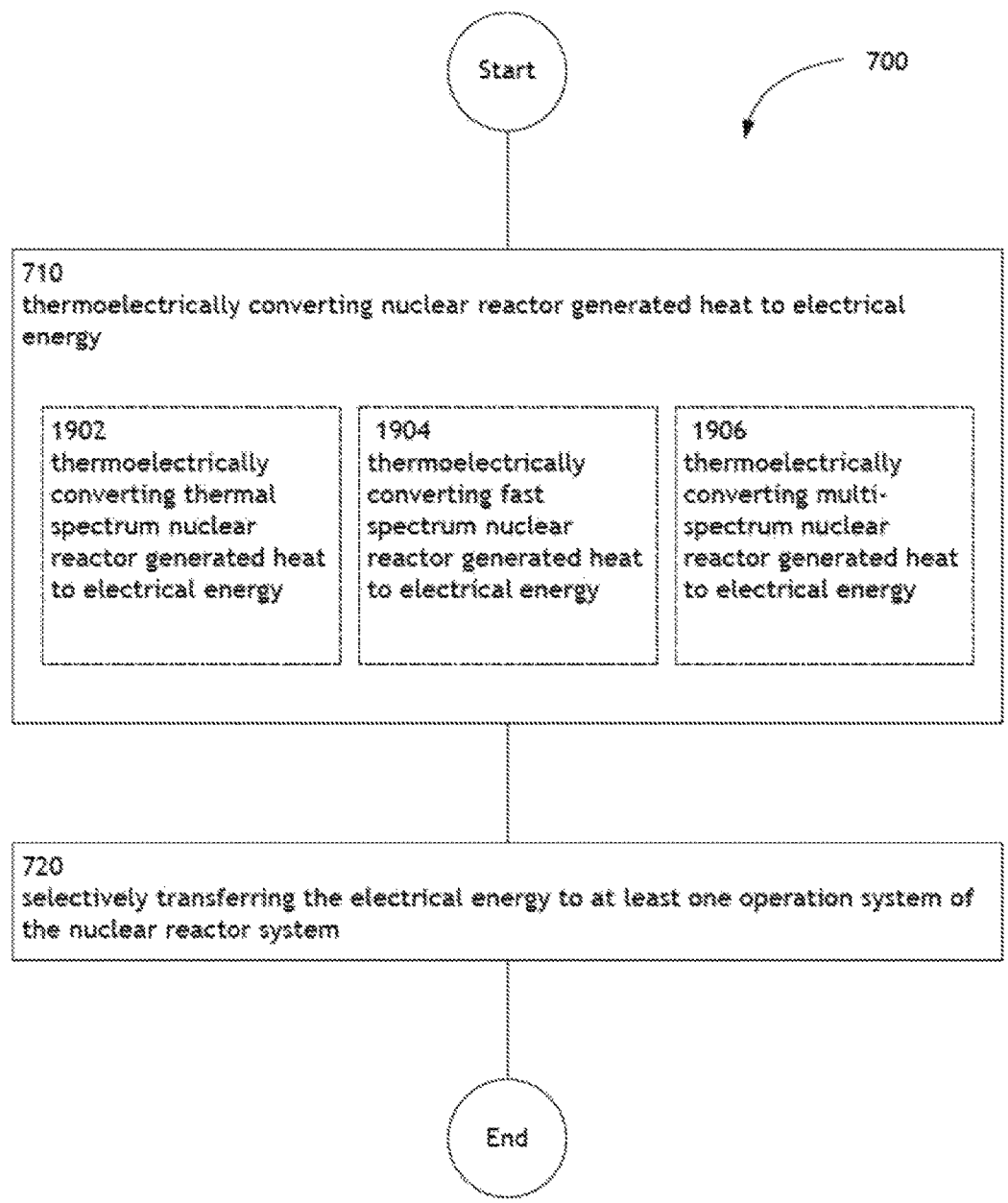

FIG. 19 illustrates alternative embodiments of the example operational flow 700 of FIG. 7. FIG. 19 illustrates example embodiments where the converting operation 710 may include at least one additional operation. Additional operations may include an operation 1902, an operation 1904, and/or an operation 1906.

At operation 1902, thermal spectrum nuclear reactor generated heat may be thermoelectrically converted to electrical energy. For example, as shown in FIG. 1A, a thermoelectric device 104 may convert heat generated by a thermal spectrum nuclear reactor 112 of a nuclear reactor system 100 to electrical energy.

At operation 1904, fast spectrum nuclear reactor generated heat may be thermoelectrically converted to electrical energy. For example, as shown in FIG. 1A, a thermoelectric device 104 may convert heat generated by a fast spectrum nuclear reactor 114 of a nuclear reactor system 100 to electrical energy.

At operation 1906, multi-spectrum nuclear reactor generated heat may be thermoelectrically converted to electrical energy. For example, as shown in FIG. 1A, a thermoelectric device 104 may convert heat generated by a multi-spectrum nuclear reactor 116 of a nuclear reactor system 100 to electrical energy.

Figure 20:
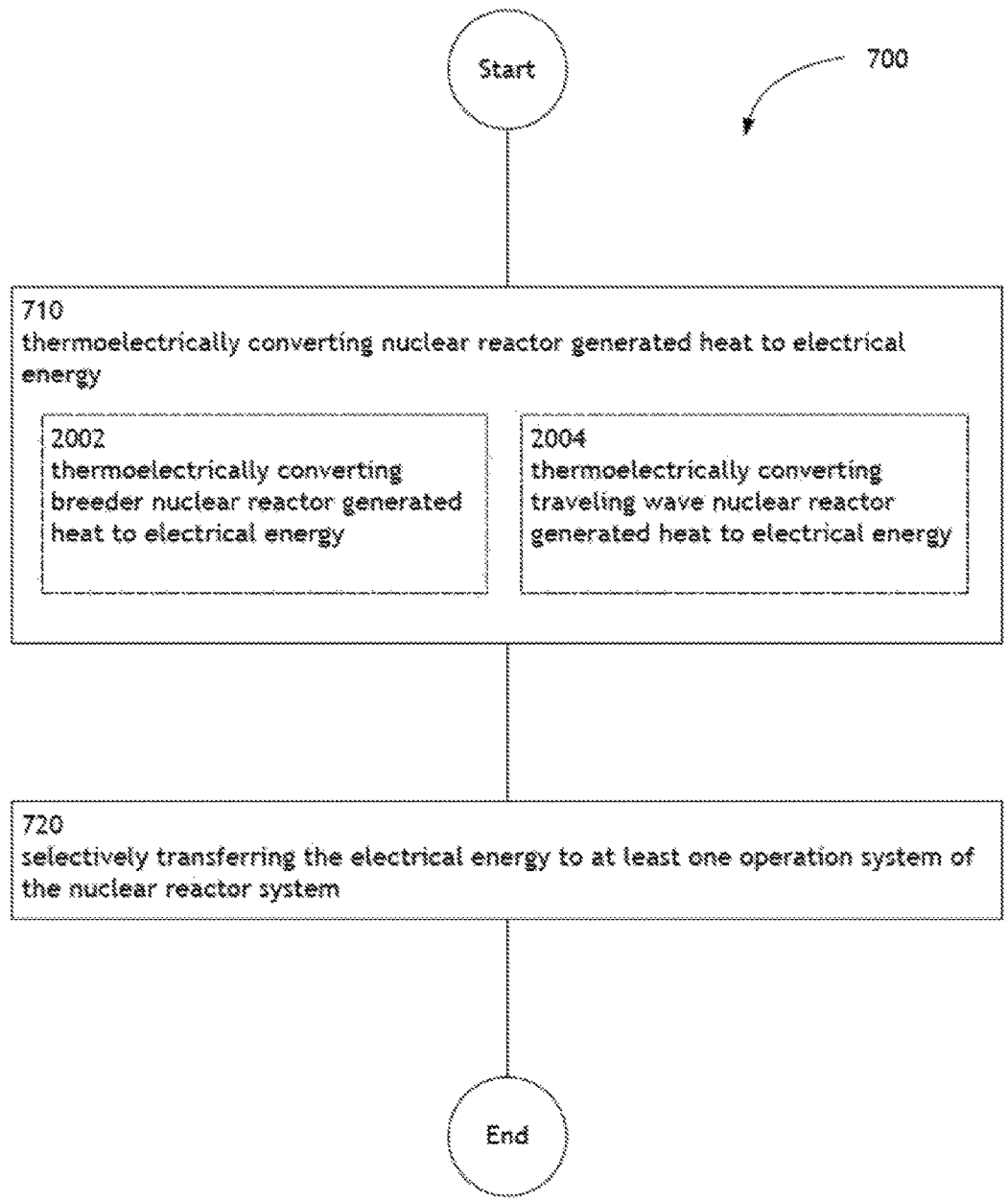

FIG. 20 illustrates alternative embodiments of the example operational flow 700 of FIG. 7. FIG. 20 illustrates example embodiments where the operation 710 may include at least one additional operation. Additional operations may include an operation 2002, and/or an operation 2004.

At operation 2002, breeder nuclear reactor generated heat may be thermoelectrically converted to electrical energy. For example, as shown in FIG. 1A, a thermoelectric device 104 may convert heat generated by a breeder nuclear reactor 118 of a nuclear reactor system 100 to electrical energy.

At operation 2004, traveling wave nuclear reactor generated heat may be thermoelectrically converted to electrical energy. For example, as shown in FIG. 1A, a thermoelectric device 104 may convert heat generated by a traveling wave nuclear reactor 120 of a nuclear reactor system 100 to electrical energy.

Figure 21:
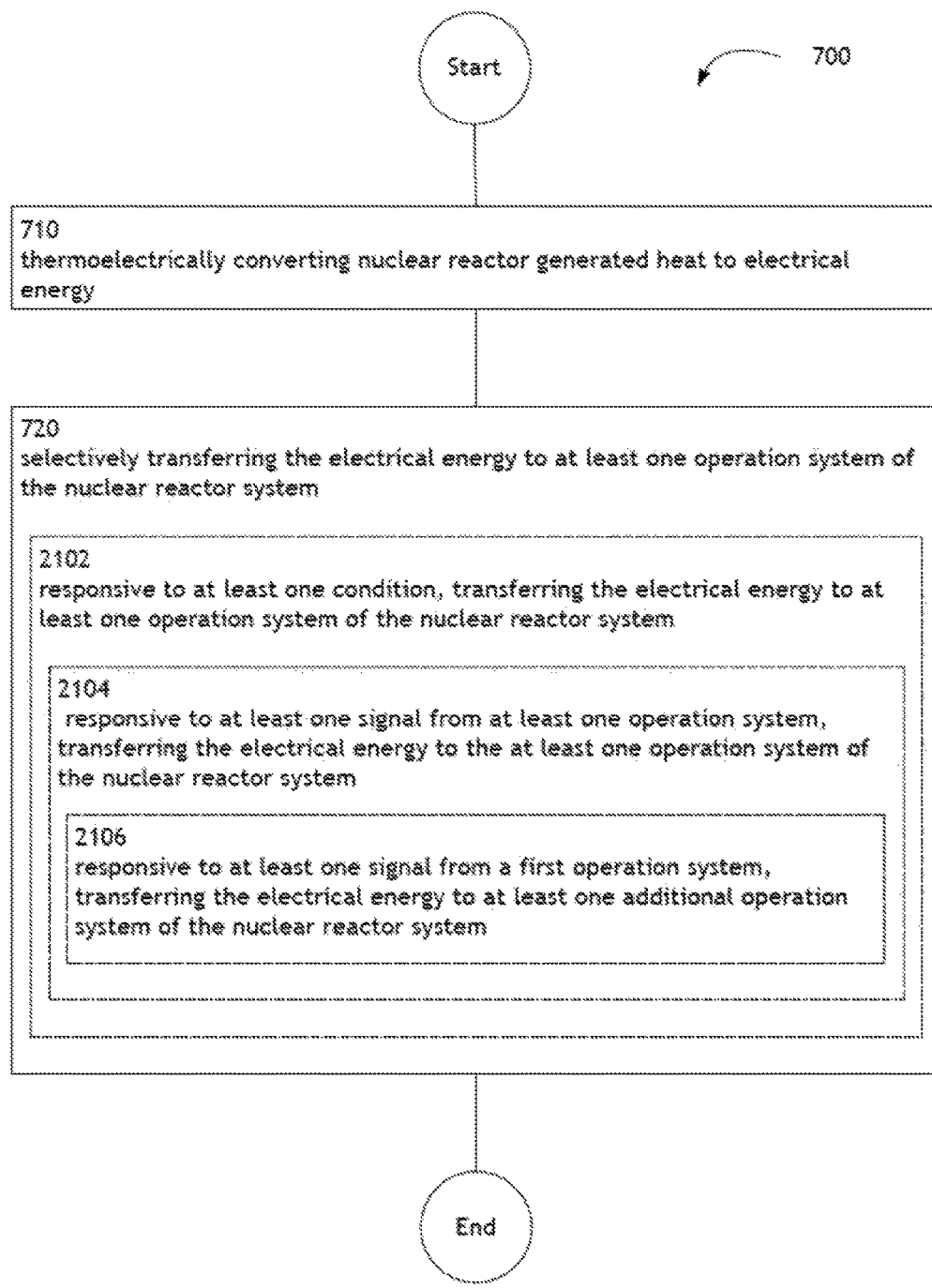

FIG. 21 illustrates alternative embodiments of the example operational flow 700 of FIG. 7. FIG. 21 illustrates example embodiments where the transfer operation 720 may include at least one additional operation. Additional operations may include an operation 2102, an operation 2104, and/or an operation 2106.

Operation 2102 illustrates, responsive to at least one condition, transferring the electrical energy to at least one operation system of the nuclear reactor system. For example, as shown in FIGS. 1A through 1C, in response to a condition 178 (e.g., state of readiness, state of security, temperature, or change in temperature), the activation circuitry 106 may initiate the transfer of the electrical energy from the electrical output 108 of a thermoelectric device 104 to an operation system 110 of the nuclear reactor system 100.

Further, operation 2104 illustrates, responsive to at least one signal from at least one operation system, transferring the electrical energy to the at least one operation system of the nuclear reactor system. For example, as shown in FIGS. 1A through 1C, in response to a signal (e.g., a digital wireline signal, an analog wireline signal, a digital wireless signal, or an analog wireless signal) from an operation system 179, the activation circuitry 106 may initiate the transfer of the electrical energy from the electrical output 108 of a thermoelectric device 104 to an operation system 110 of the nuclear reactor system 100.

Further, operation 2106 illustrates, responsive to at least one signal from a first operation system, transferring the electrical energy to at least one additional operation system of the nuclear reactor system. For example, as shown in FIGS. 1A through 1C, in response to a signal from a first operation system, the activation circuitry 106 may initiate the transfer of the electrical energy from the electrical output 108 of a thermoelectric device 104 to a second operation system 110 of the nuclear reactor system 100. For instance, in response to a signal from the control system 128 of the nuclear reactor system 100, the activation circuitry 106 may initiate the transfer of the electrical energy from the electrical output 108 of a thermoelectric device 104 to a coolant system 140 of the nuclear reactor system 100. In another instance, in response to a signal from the control system 128 of the nuclear reactor system 100, the activation circuitry 106 may initiate the transfer of the electrical energy from the electrical output 108 of a thermoelectric device 104 to an emergency shutdown system of the nuclear reactor system 100.

Figure 22:
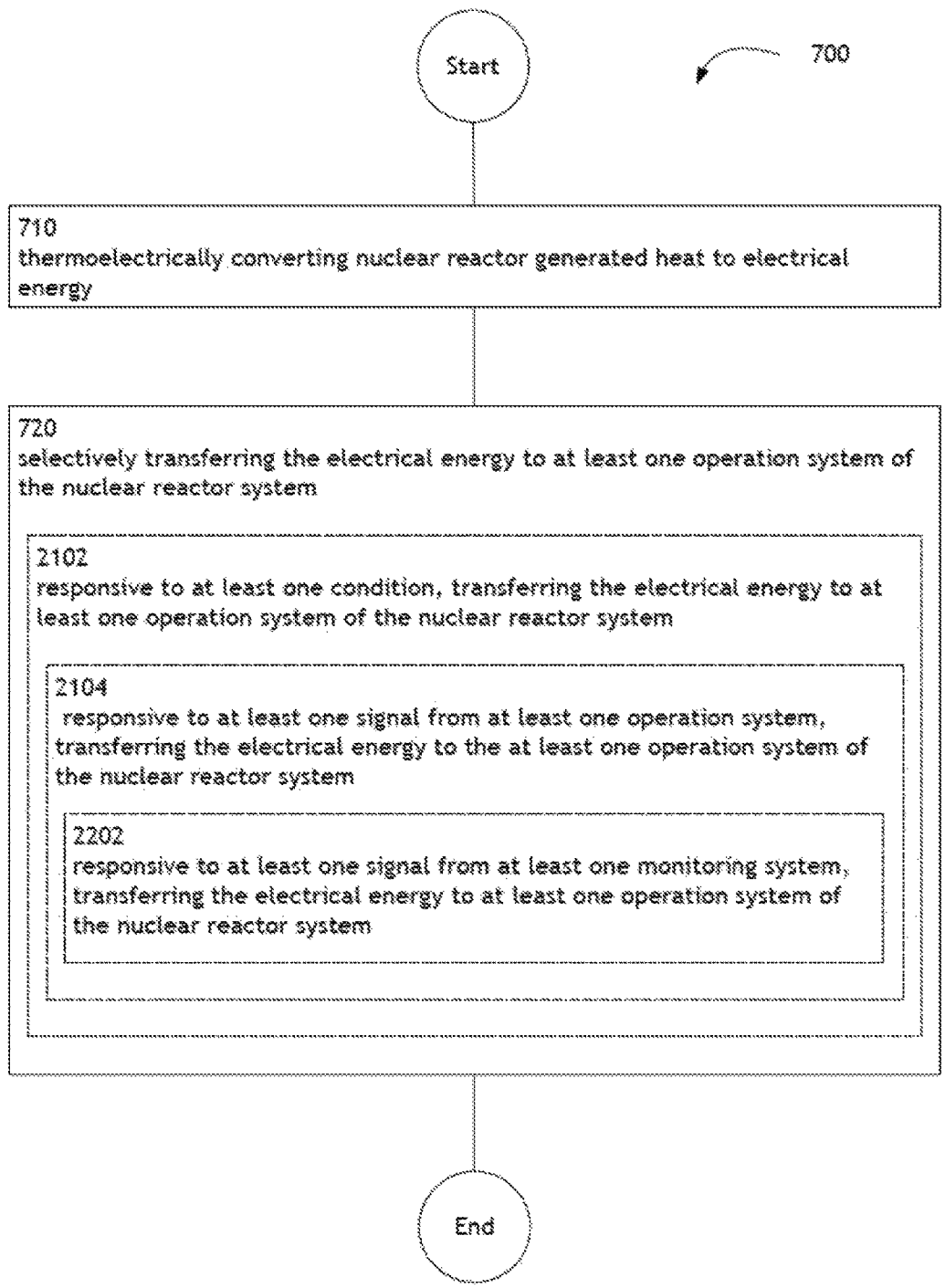

FIG. 22 illustrates alternative embodiments of the example operational flow 700 of FIG. 7. FIG. 22 illustrates example embodiments where the transfer operation 720 may include at least one additional operation. Additional operations may include an operation 2202.

Further, operation 2202 illustrates, responsive to at least one signal from at least one monitoring system, transferring the electrical energy to at least one operation system of the nuclear reactor system. For example, as shown in FIGS. 1A through 1C, in response to a signal from a monitoring system 180 (e.g., signal from thermal monitoring system) of the nuclear reactor system 100, the activation circuitry 106 may initiate the transfer of the electrical energy from the electrical output 108 of a thermoelectric device 104 to an operation system 110 (e.g., coolant system 140) of the nuclear reactor system 100.

Figure 23:
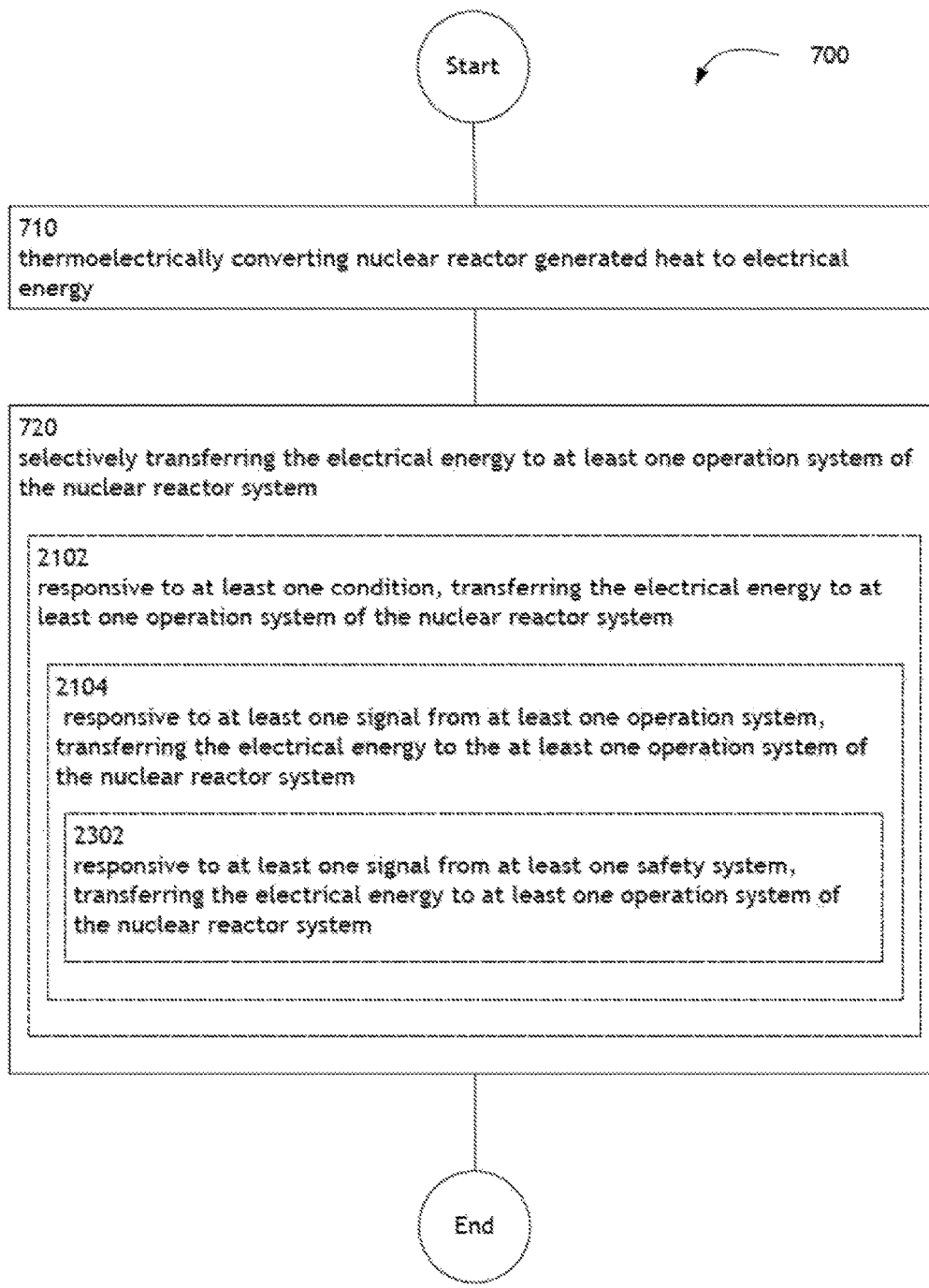

FIG. 23 illustrates alternative embodiments of the example operational flow 700 of FIG. 7. FIG. 23 illustrates example embodiments where the transfer operation 720 may include at least one additional operation. Additional operations may include an operation 2302.

Further, operation 2302 illustrates, responsive to at least one signal from at least one safety system, transferring the electrical energy to at least one operation system of the nuclear reactor system. For example, as shown in FIGS. 1A through 1C, in response to a signal from a safety system 181 of the nuclear reactor system 100, the activation circuitry 106 may initiate the transfer of the electrical energy from the electrical output 108 of a thermoelectric device 104 to an operation system 110 of the nuclear reactor system 100.

Figure 24:
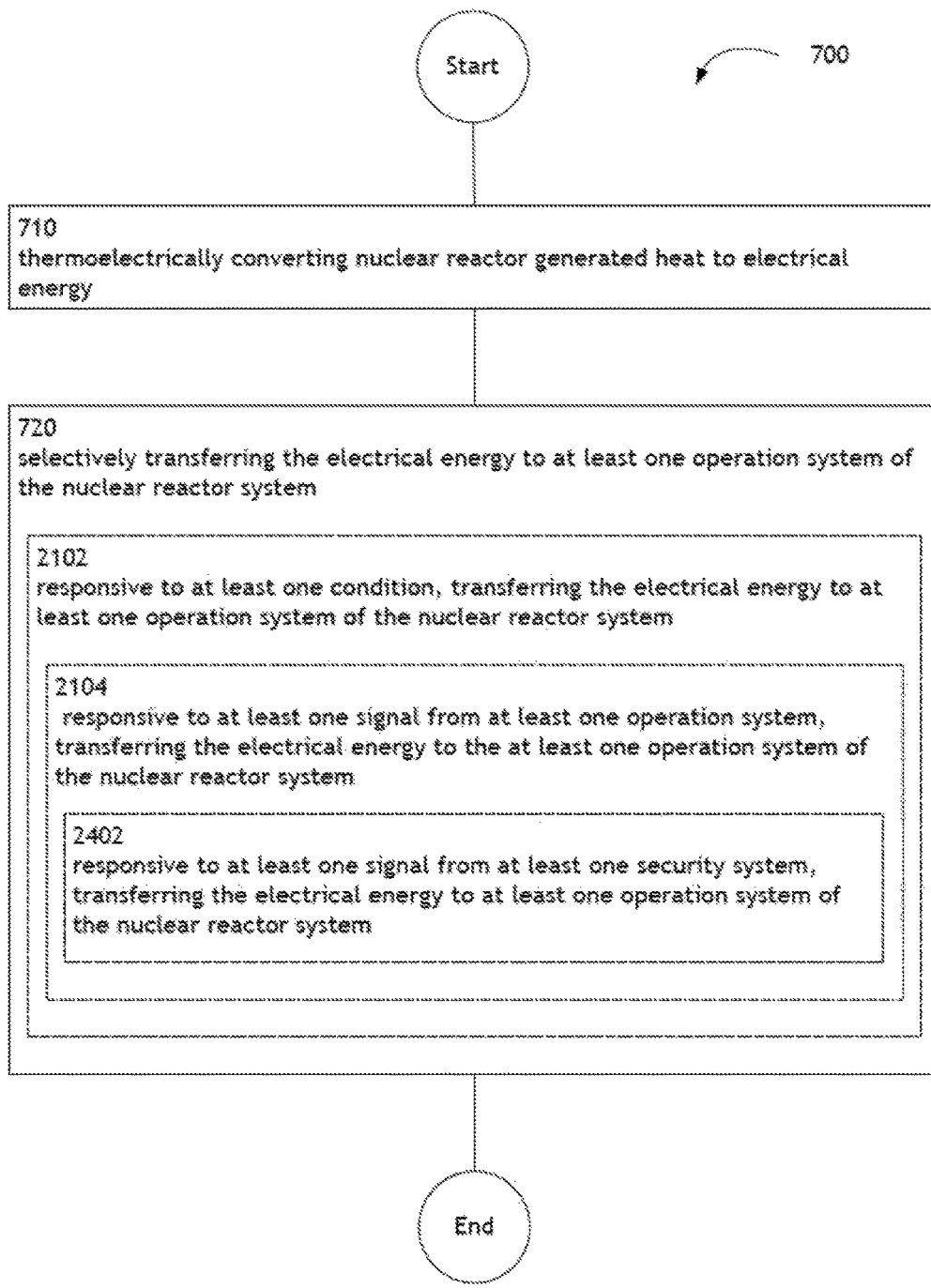

FIG. 24 illustrates alternative embodiments of the example operational flow 700 of FIG. 7. FIG. 24 illustrates example embodiments where the transfer operation 720 may include at least one additional operation. Additional operations may include an operation 2402.

Further, operation 2402 illustrates, responsive to at least one signal from at least one security system, transferring the electrical energy to at least one operation system of the nuclear reactor system. For example, as shown in FIGS. 1A through 1C, in response to a signal from a security system 182 of the nuclear reactor system 100, the activation circuitry 106 may initiate the transfer of the electrical energy from the electrical output 108 of a thermoelectric device 104 to an operation system 110 of the nuclear reactor system 100.

Figure 25:
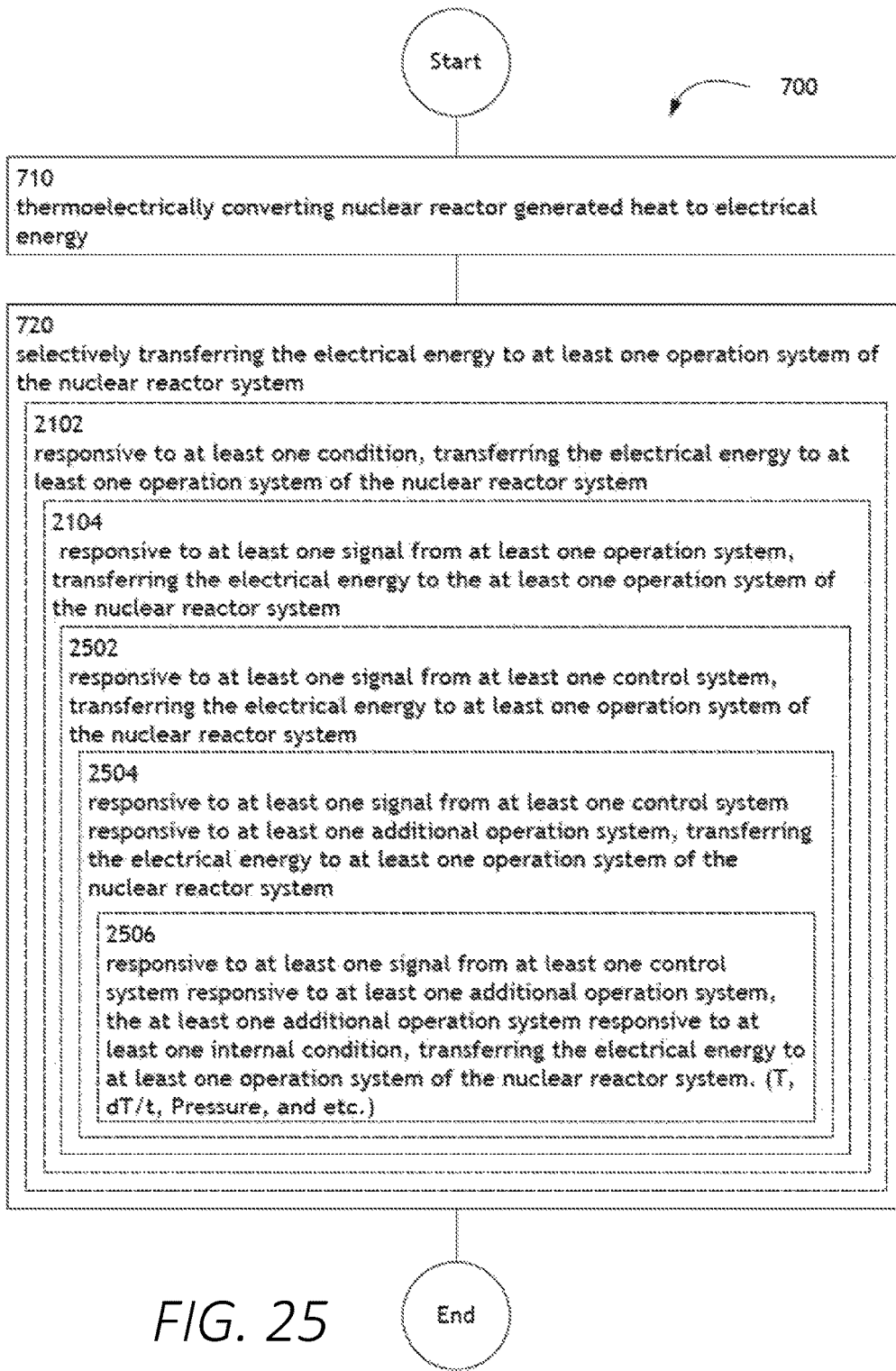

FIG. 25 illustrates alternative embodiments of the example operational flow 700 of FIG. 7. FIG. 25 illustrates example embodiments where the operation 720 may include at least one additional operation. Additional operations may include an operation 2502, an operation 2504, and/or an operation 2506.

Further, the operation 2502 illustrates, responsive to at least one signal from at least one control system, transferring the electrical energy to at least one operation system of the nuclear reactor system. For example, as shown in FIGS. 1A through 1C, in response to a signal from a control system 183 of the nuclear reactor system 100, the activation circuitry 106 may initiate the transfer of the electrical energy from the electrical output 108 of a thermoelectric device 104 to an operation system 110 of the nuclear reactor system 100.

Further, the operation 2504 illustrates, responsive to at least one signal from at least one control system responsive to at least one additional operation system, transferring the electrical energy to at least one operation system of the nuclear reactor system. For example, as shown in FIGS. 1A through 1C, in response to a signal from a control system responsive to an additional operation system 184 of the nuclear reactor system 100, the activation circuitry 106 may initiate the transfer of the electrical energy from the electrical output 108 of a thermoelectric device 104 to an operation system 110 of the nuclear reactor system 100.

Further, the operation 2506 illustrates responsive to at least one signal from at least one control system responsive to at least one additional operation system, the at least one additional operation system responsive to at least one internal condition, transferring the electrical energy to at least one operation system of the nuclear reactor system. For example, as shown in FIGS. 1A through 1C, in response to a signal from a control system responsive to an additional operation system, the operation system responsive to an internal condition 185 (e.g., temperature, rate of temperature change or pressure) of the nuclear reactor system 100, the activation circuitry 106 may initiate the transfer of the electrical energy from the electrical output 108 of a thermoelectric device 104 to an operation system 110 of the nuclear reactor system 100.

Figure 26:
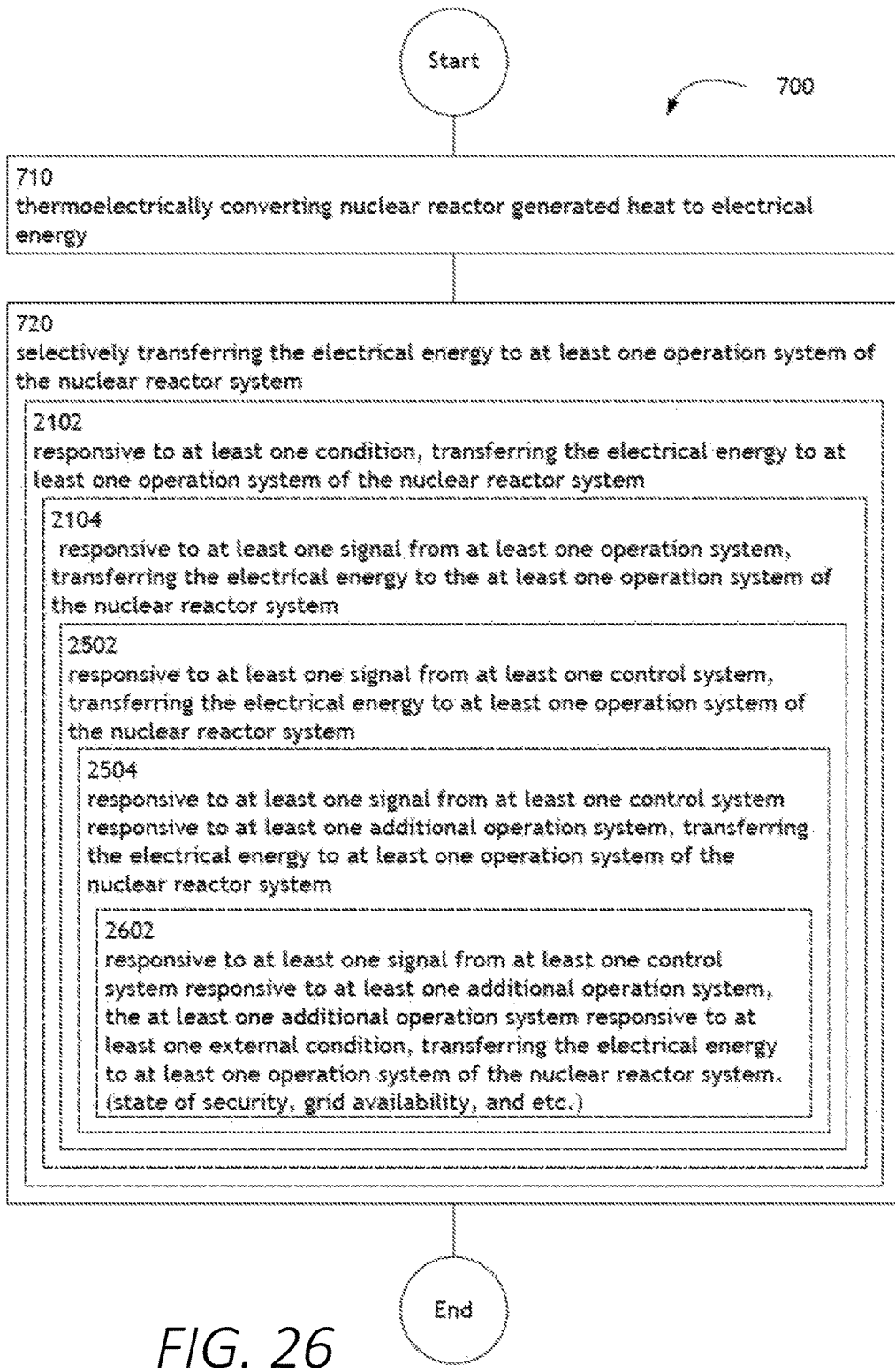

FIG. 26 illustrates alternative embodiments of the example operational flow 700 of FIG. 7. FIG. 26 illustrates example embodiments where the operation 720 may include at least one additional operation. Additional operations may include an operation 2602.

Further, the operation 2602 illustrates, responsive to at least one signal from at least one control system responsive to at least one additional operation system, the at least one additional operation system responsive to at least one external condition, transferring the electrical energy to at least one operation system of the nuclear reactor system. For example, as shown in FIGS. 1A through 1C, in response to a signal from a control system responsive to an additional operation system, the operation system responsive to an external condition 186 (e.g., state of security or grid availability) of the nuclear reactor system 100, the activation circuitry 106 may initiate the transfer of the electrical energy from the electrical output 108 of a thermoelectric device 104 to an operation system 110 of the nuclear reactor system 100.

Figure 27:
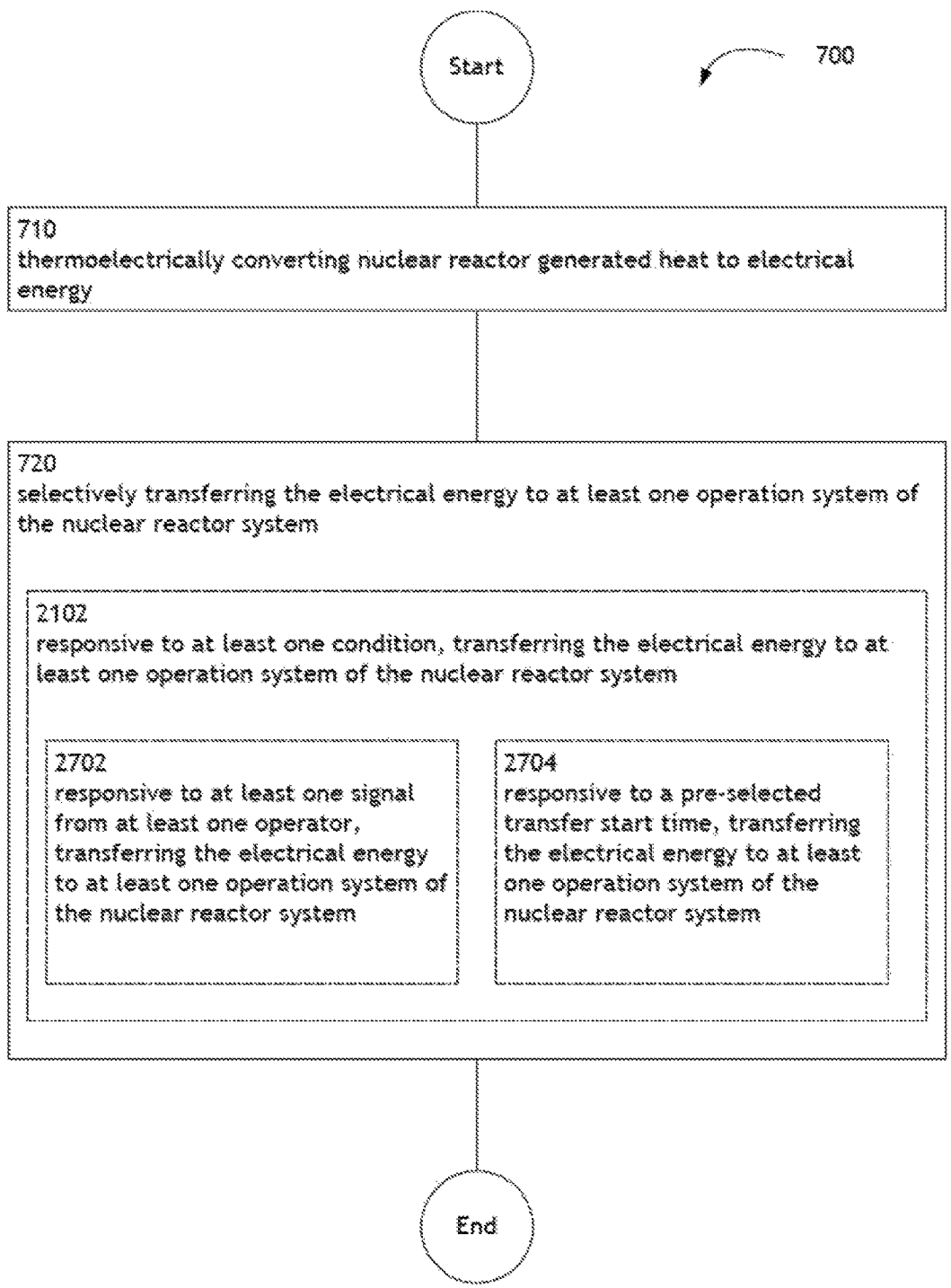

FIG. 27 illustrates alternative embodiments of the example operational flow 700 of FIG. 7. FIG. 27 illustrates example embodiments where the operation 720 may include at least one additional operation. Additional operations may include an operation 2702, and/or an operation 2704.

Further, the operation 2702 illustrates, responsive to at least one signal from at least one operator, transferring the electrical energy to at least one operation system of the nuclear reactor system. For example, as shown in FIGS. 1A through 1C, in response to a signal from an operator 188 of the nuclear reactor system 100, the activation circuitry 106 may initiate the transfer of the electrical energy from the electrical output 108 of a thermoelectric device 104 to an operation system 110 of the nuclear reactor system 100.

Further, the operation 2704 illustrates, responsive to a pre-selected transfer start time, transferring the electrical energy to at least one operation system of the nuclear reactor system. For example, as shown in FIGS. 1A through 1C, in response to the elapsing of a pre-selected transfer start time 192, the activation circuitry 106 may initiate the transfer of the electrical energy from the electrical output 108 of a thermoelectric device 104 to an operation system 110 of the nuclear reactor system 100.

Figure 28:
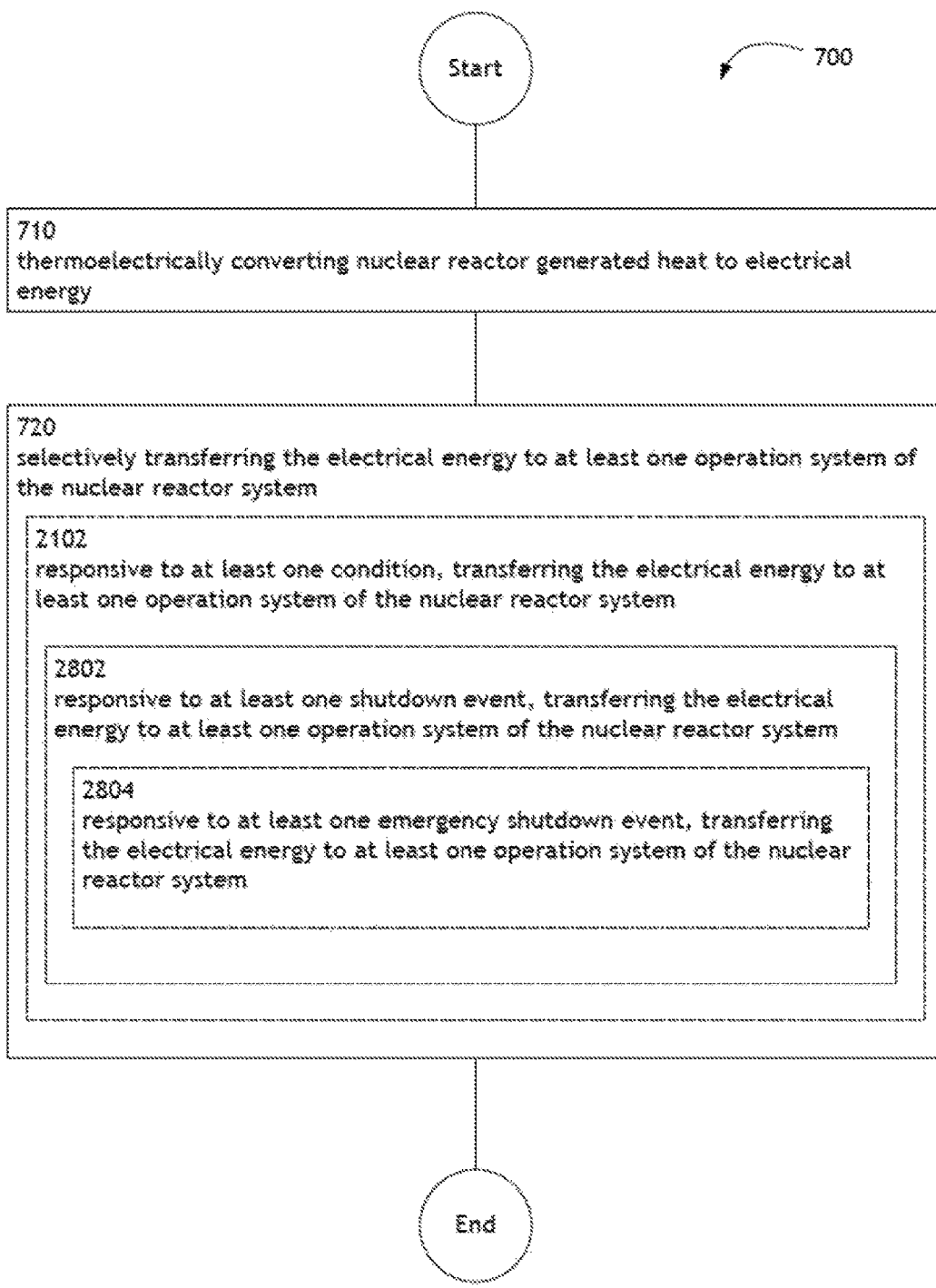

FIG. 28 illustrates alternative embodiments of the example operational flow 700 of FIG. 7. FIG. 28 illustrates example embodiments where the operation 720 may include at least one additional operation. Additional operations may include an operation 2802, and/or an operation 2804.

Further, the operation 2802 illustrates, responsive to at least one shutdown event, transferring the electrical energy to at least one operation system of the nuclear reactor system. For example, as shown in FIGS. 1A through 1C, in response to a shutdown event 189 of the nuclear reactor system 100, the activation circuitry 106 may initiate the transfer of the electrical energy from the electrical output 108 of a thermoelectric device 104 to an operation system 110 of the nuclear reactor system 100.

Further, the operation 2804 illustrates, responsive to at least one emergency shutdown event, transferring the electrical energy to at least one operation system of the nuclear reactor system. For example, as shown in FIGS. 1A through 1C, in response to an emergency shutdown event 190 (e.g., SCRAM) of the nuclear reactor system 100, the activation circuitry 106 may initiate the transfer of the electrical energy from the electrical output 108 of a thermoelectric device 104 to an operation system 110 of the nuclear reactor system 100.

Figure 29:
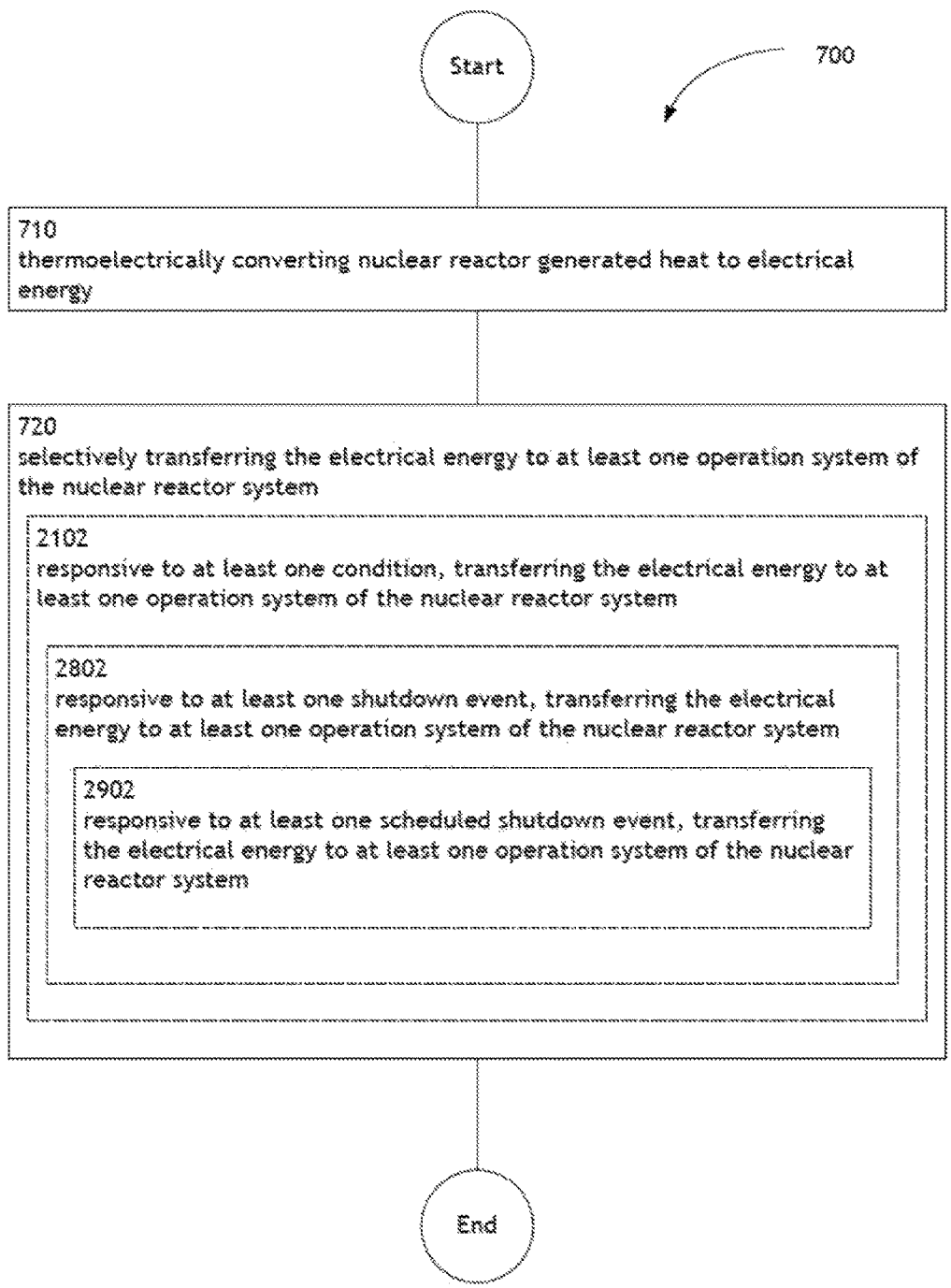

FIG. 29 illustrates alternative embodiments of the example operational flow 700 of FIG. 7. FIG. 29 illustrates example embodiments where the operation 720 may include at least one additional operation. Additional operations may include an operation 2902.

Further, the operation 2902 illustrates, responsive to at least one scheduled shutdown event, transferring the electrical energy to at least one operation system of the nuclear reactor system. For example, as shown in FIGS. 1A through 1C, in response to a scheduled shutdown event 191 (e.g., scheduled maintenance shutdown) of the nuclear reactor system 100, the activation circuitry 106 may initiate the transfer of the electrical energy from the electrical output 108 of a thermoelectric device 104 to an operation system 110 of the nuclear reactor system 100.

Figure 30:
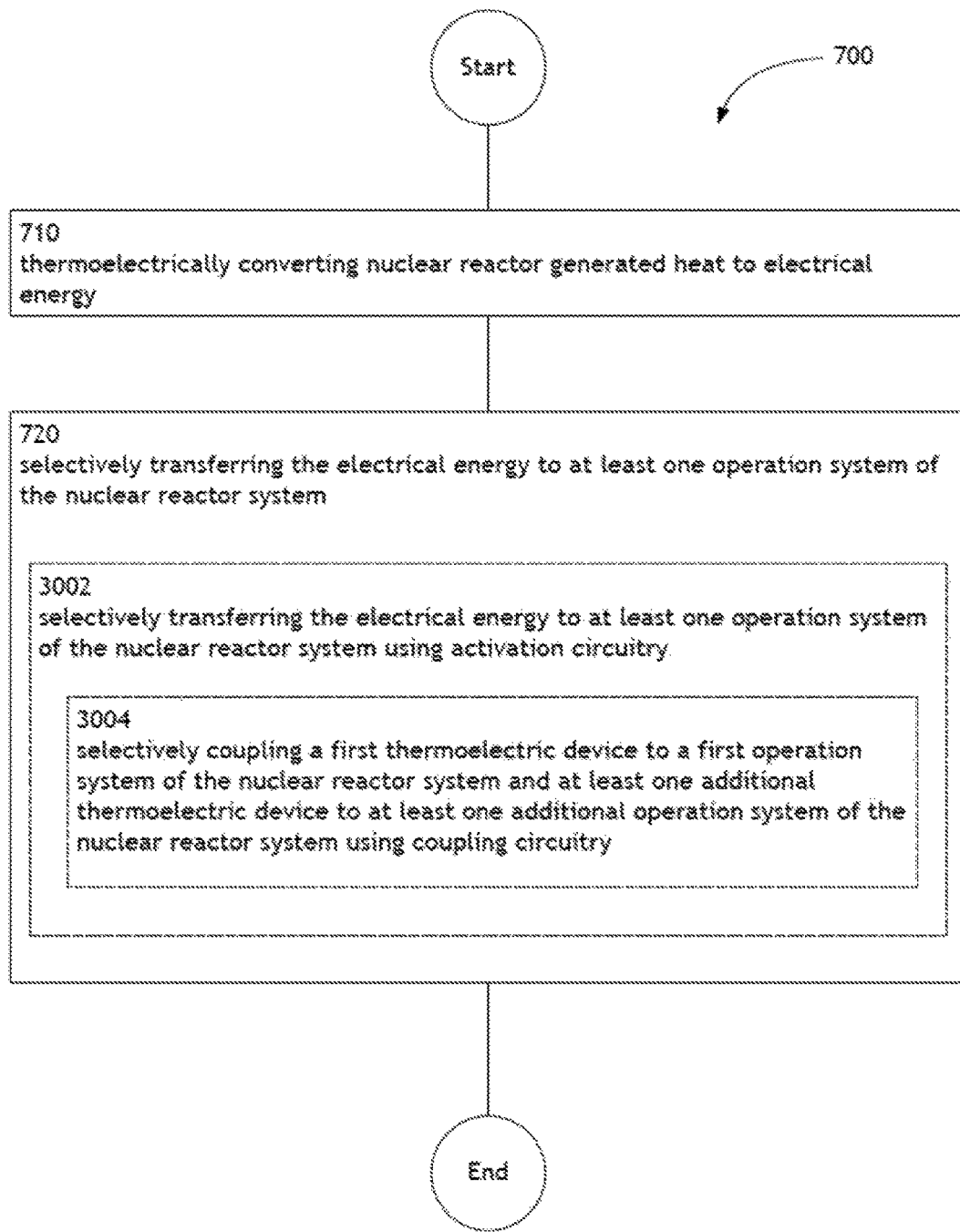

FIG. 30 illustrates alternative embodiments of the example operational flow 700 of FIG. 7. FIG. 30 illustrates example embodiments where the operation 720 may include at least one additional operation. Additional operations may include an operation 3002, and/or an operation 3004.

The operation 3002 illustrates selectively transferring the electrical energy to at least one operation system of the nuclear reactor system using activation circuitry. For example, as shown in FIGS. 1A through C, activation circuitry 106 may selectively transfer the electrical energy from the electrical output 108 of a thermoelectric device 104 to an operation system 110 of the nuclear reactor system 100.

Further, the operation 3004 illustrates selectively coupling a first thermoelectric device to a first operation system of the nuclear reactor system and at least one additional thermoelectric device to at least one additional operation system of the nuclear reactor system using coupling circuitry. For example, as shown in FIGS. 1A through C, coupling circuitry suitable for coupling multiple thermoelectric device outputs to multiple operations systems 166 may selectively electrically couple an electrical output 108 of a first thermoelectric device 104 to a first operation system 110 of the nuclear reactor system 100 and an electrical output 108 of a second thermoelectric device 104 to a second operation system 110 of the nuclear reactor system 100.

Figure 31:
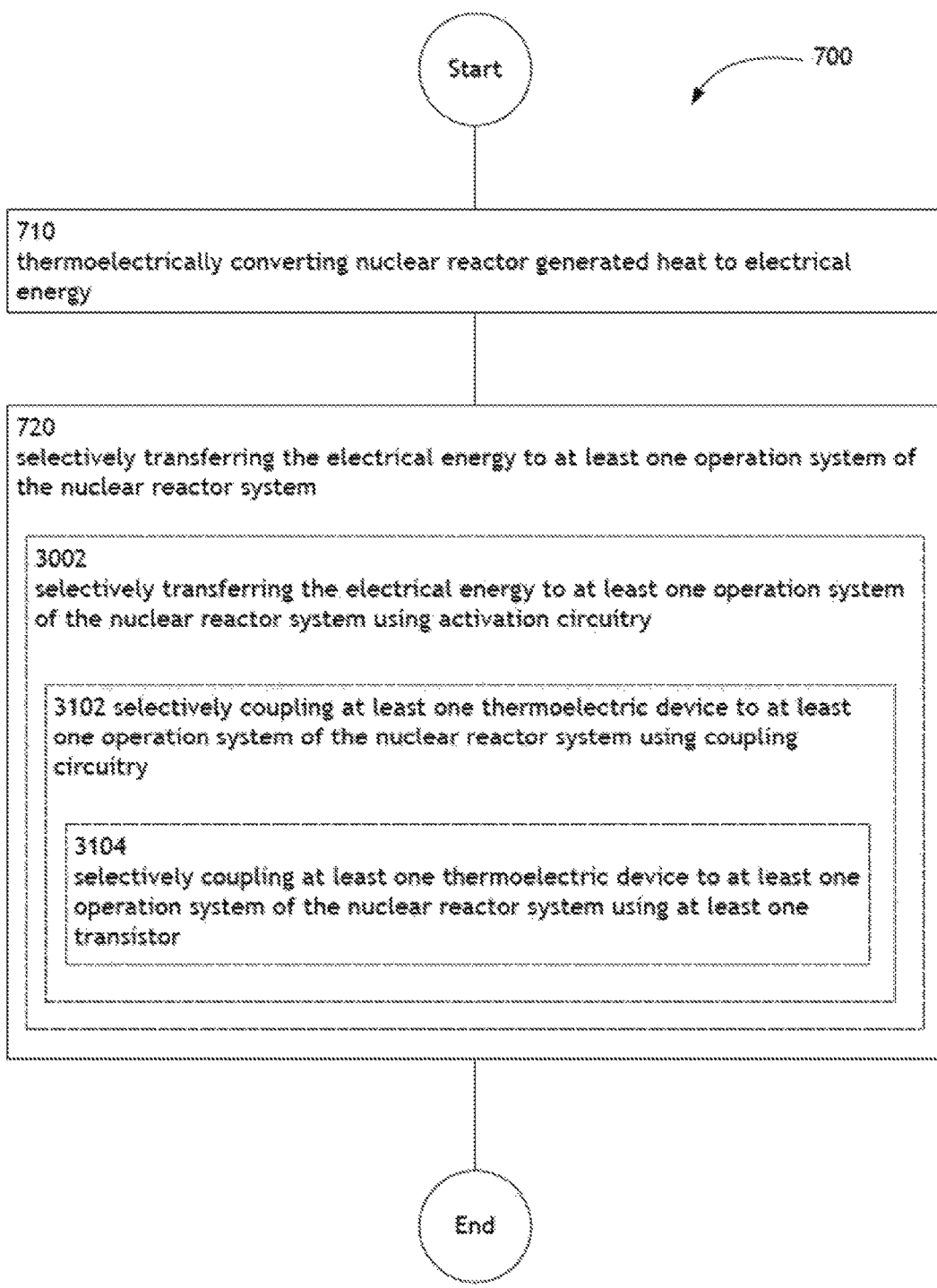

FIG. 31 illustrates alternative embodiments of the example operational flow 700 of FIG. 7. FIG. 31 illustrates example embodiments where the operation 720 may include at least one additional operation. Additional operations may include an operation 3102, and/or an operation 3104.

Further, the operation 3102 illustrates selectively coupling at least one thermoelectric device to at least one operation system of the nuclear reactor system using coupling circuitry. For example, as shown in FIGS. 1A through C, coupling circuitry 165 may selectively electrically couple an electrical output 108 of a thermoelectric device 104 to an operation system 110 of the nuclear reactor system 100.

Further, the operation 3104 illustrates selectively coupling at least one thermoelectric device to at least one operation system of the nuclear reactor system using at least one transistor. For example, as shown in FIGS. 1A through C, one or more transistors 167 may selectively electrically couple an electrical output 108 of a thermoelectric device 104 to an operation system 110 of the nuclear reactor system 100.

Figure 32:
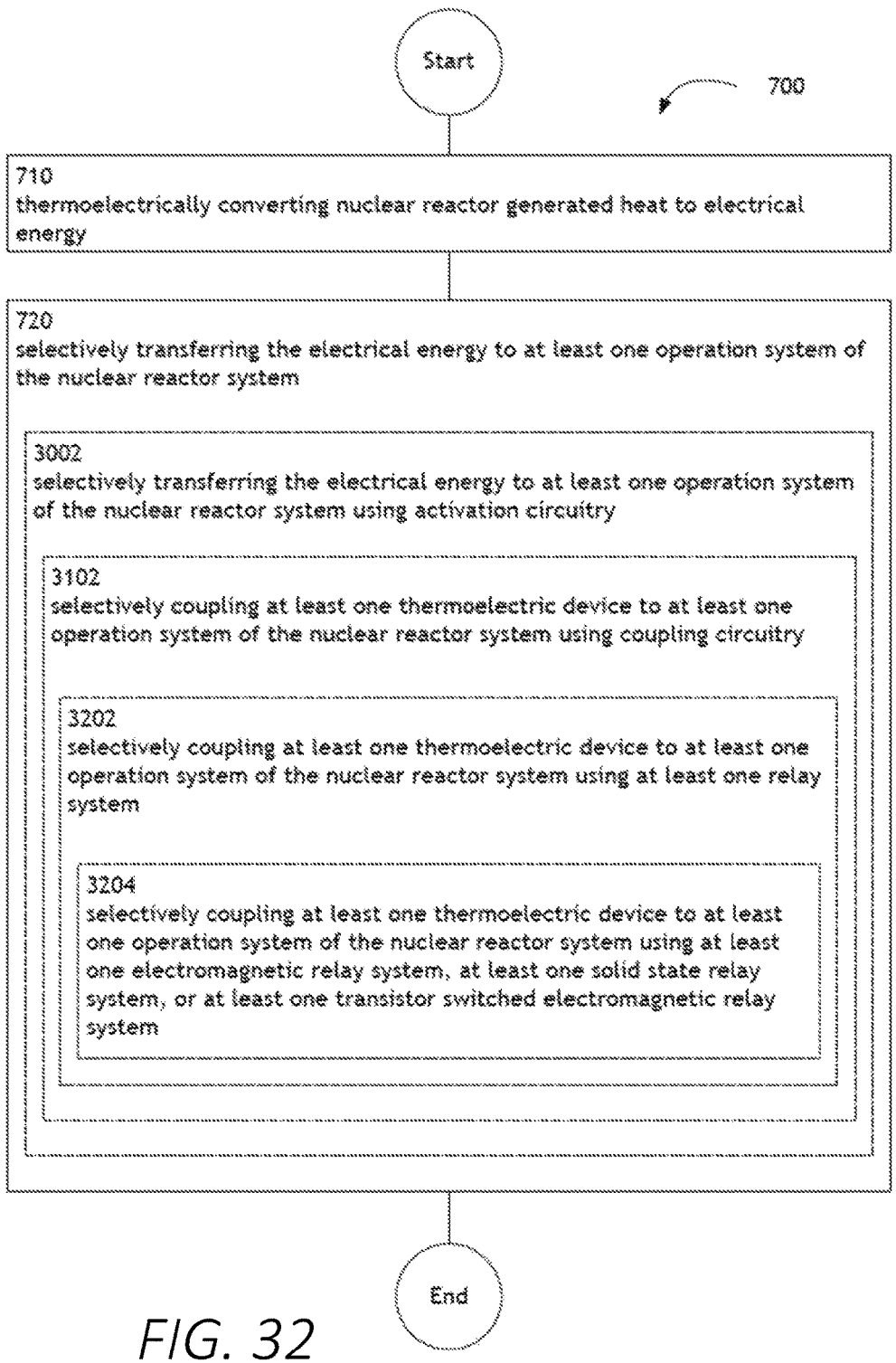

FIG. 32 illustrates alternative embodiments of the example operational flow 700 of FIG. 7. FIG. 32 illustrates example embodiments where the operation 720 may include at least one additional operation. Additional operations may include an operation 3202, and/or an operation 3204.

Further, the operation 3202 illustrates selectively coupling at least one thermoelectric device to at least one operation system of the nuclear reactor system using at least one relay system. For example, as shown in FIGS. 1A through C, one or more relay systems 168 may selectively electrically couple an electrical output 108 of a thermoelectric device 104 to an operation system 110 of the nuclear reactor system 100.

Further, the operation 3204 illustrates selectively coupling at least one thermoelectric device to at least one operation system of the nuclear reactor system using at least one electromagnetic relay system, at least one solid state relay system, or at least one transistor switched electromagnetic relay system. For example, as shown in FIGS. 1A through C, an electromagnetic relay system 170, a solid state relay system 171, or a transistor switched electromagnetic relay system 172 may selectively electrically couple an electrical output 108 of a thermoelectric device 104 to an operation system 110 of the nuclear reactor system 100.

Figure 33:
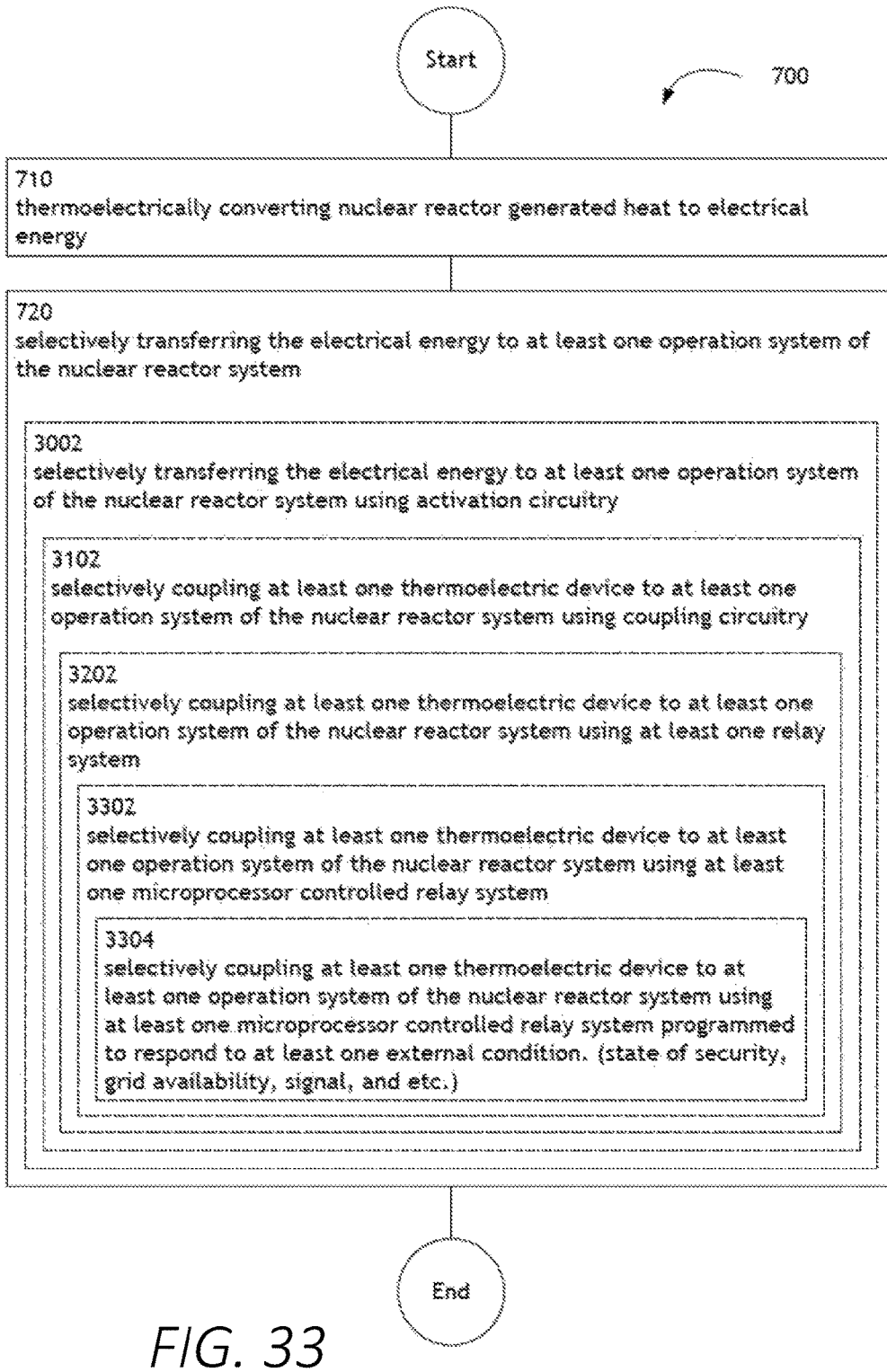

FIG. 33 illustrates alternative embodiments of the example operational flow 700 of FIG. 7. FIG. 33 illustrates example embodiments where the operation 720 may include at least one additional operation. Additional operations may include an operation 3302, and/or an operation 3304.

Further, the operation 3302 illustrates selectively coupling at least one thermoelectric device to at least one operation system of the nuclear reactor system using at least one microprocessor controlled relay system. For example, as shown in FIGS. 1A through C, a microprocessor controlled relay system 173 may selectively electrically couple an electrical output 108 of a thermoelectric device 104 to an operation system 110 of the nuclear reactor system 100.

Further, the operation 3304 illustrates selectively coupling at least one thermoelectric device to at least one operation system of the nuclear reactor system using at least one microprocessor controlled relay system programmed to respond to at least one external condition. For example, as shown in FIGS. 1A through C, a microprocessor controlled relay system programmed to respond to an external condition 174 (e.g., state of security, grid availability, or signal from outside controller) may selectively electrically couple an electrical output 108 of a thermoelectric device 104 to an operation system 110 of the nuclear reactor system 100.

Figure 34:
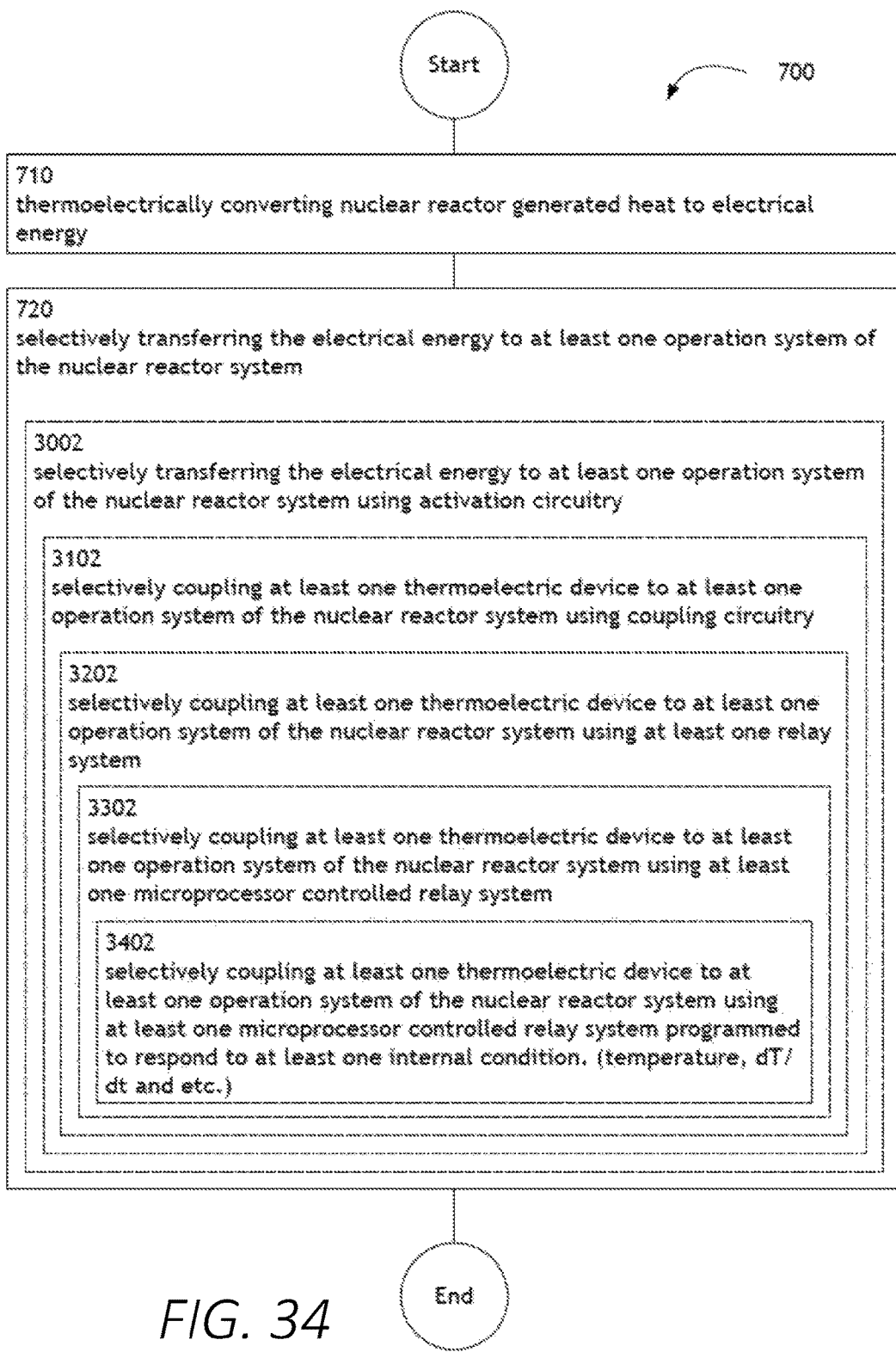

FIG. 34 illustrates alternative embodiments of the example operational flow 700 of FIG. 7. FIG. 34 illustrates example embodiments where the operation 720 may include at least one additional operation. Additional operations may include an operation 3402.

Further, the operation 3402 illustrates selectively coupling at least one thermoelectric device to at least one operation system of the nuclear reactor system using at least one microprocessor controlled relay system programmed to respond to at least one internal condition. For example, as shown in FIGS. 1A through C, a microprocessor controlled relay system programmed to respond to an internal condition 175 (e.g., temperature or rate of temperature change) may selectively electrically couple an electrical output 108 of a thermoelectric device 104 to an operation system 110 of the nuclear reactor system 100.

Figure 35:
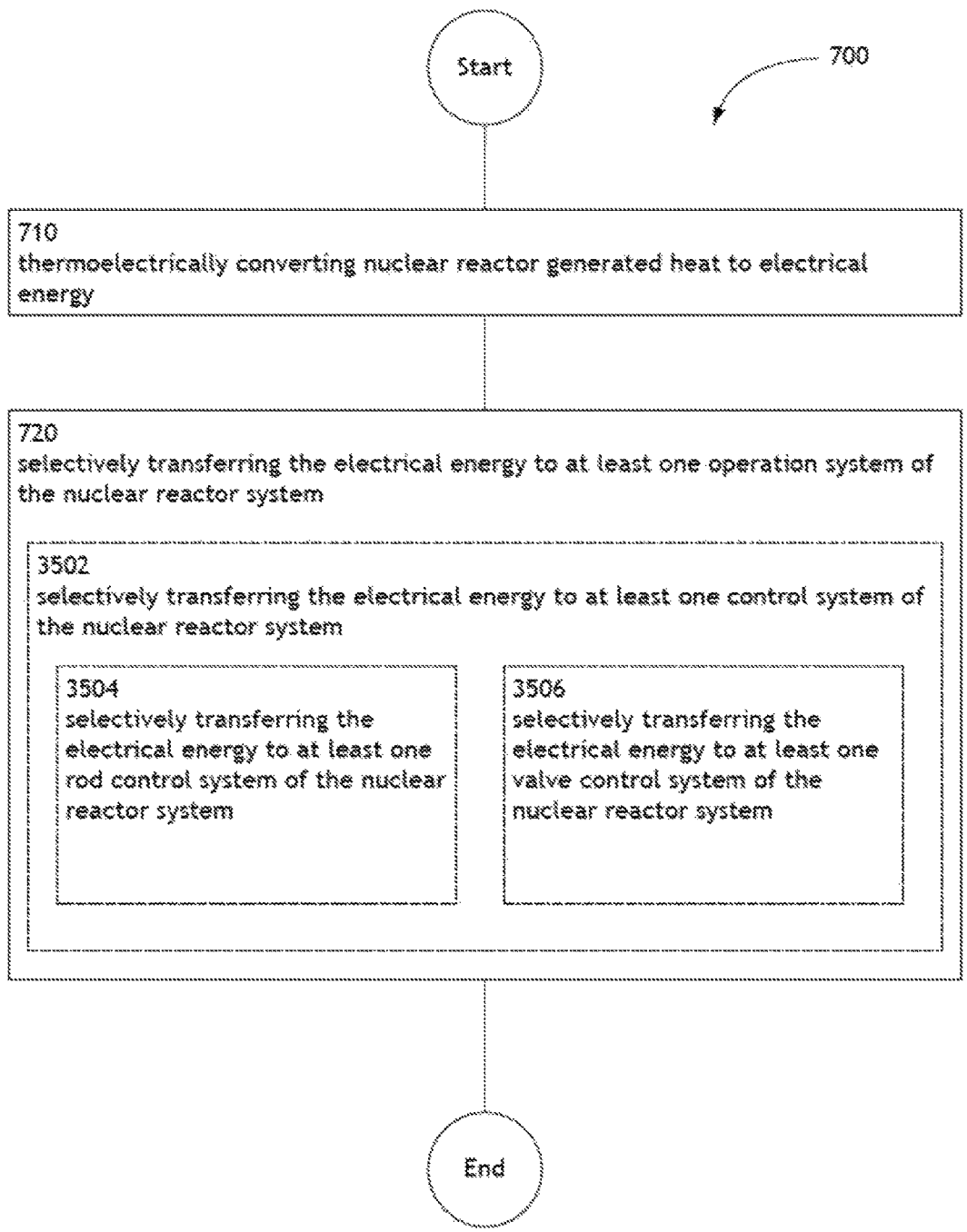

FIG. 35 illustrates alternative embodiments of the example operational flow 700 of FIG. 7. FIG. 35 illustrates example embodiments where the transfer operation 720 may include at least one additional operation. Additional operations may include an operation 3502, an operation 3504, and/or an operation 3506.

The operation 3502 illustrates selectively transferring the electrical energy to at least one control system of the nuclear reactor system. For example, as shown in FIG. 1A, the activation circuitry 106 may be used to selectively transfer the electrical energy from the electrical output 108 of a thermoelectric device 104 to a control system 128 of the nuclear reactor system 100.

Further, the operation 3504 illustrates selectively transferring the electrical energy to at least one rod control system of the nuclear reactor system. For example, as shown in FIG. 1A, the activation circuitry 106 may be used to selectively transfer the electrical energy from the electrical output 108 of a thermoelectric device 104 to a rod control system 130 of the nuclear reactor system 100.

Further, the operation 3506 illustrates selectively transferring the electrical energy to at least one valve control system of the nuclear reactor system. For example, as shown in FIG. 1A, the activation circuitry 106 may be used to selectively transfer the electrical energy from the electrical output 108 of a thermoelectric device 104 to a valve control system 132 of the nuclear reactor system 100.

Figure 36:
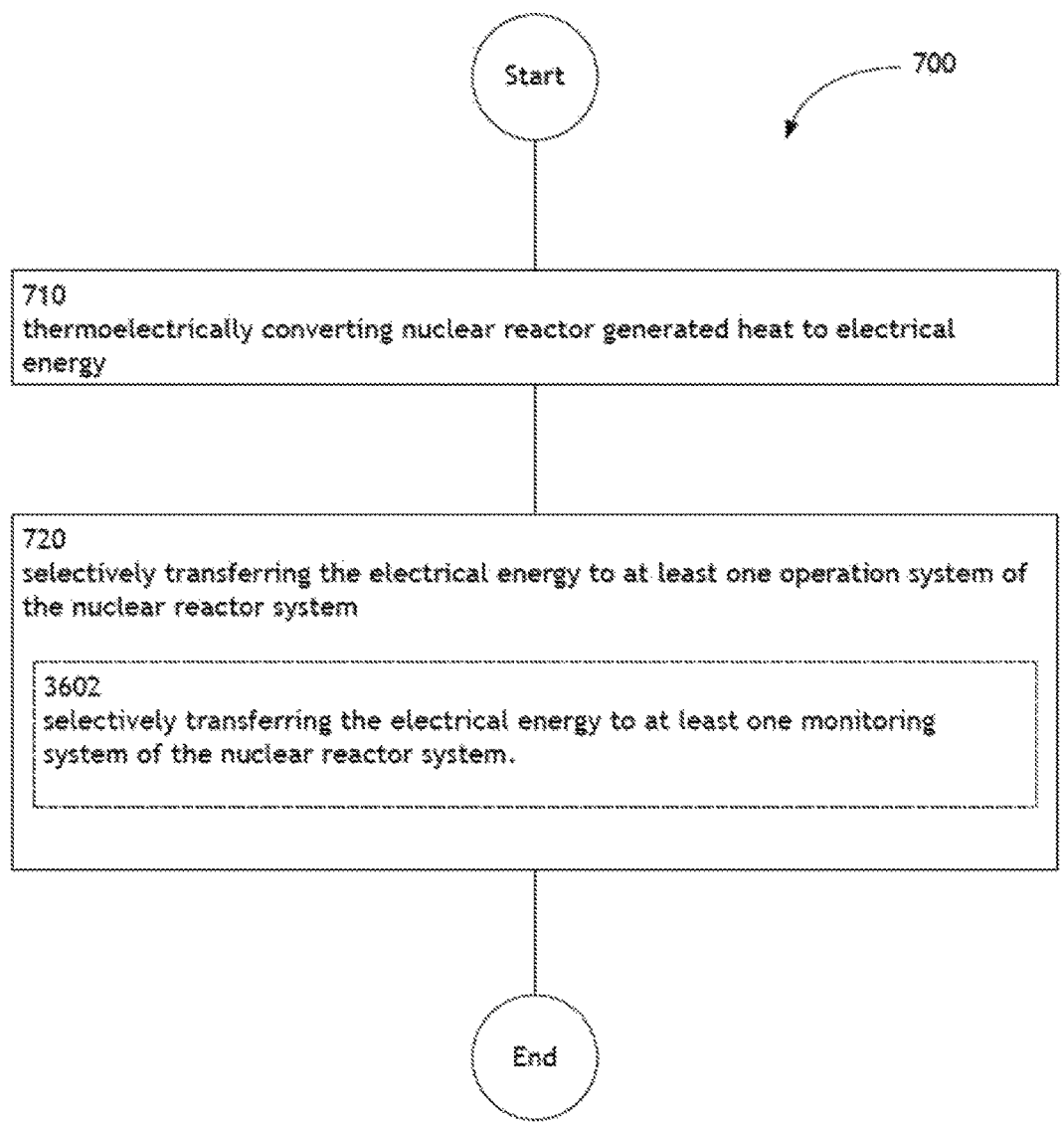

FIG. 36 illustrates alternative embodiments of the example operational flow 700 of FIG. 7. FIG. 36 illustrates example embodiments where the transfer operation 720 may include at least one additional operation. Additional operations may include an operation 3602.

Operation 3602 illustrates selectively transferring the electrical energy to at least one monitoring system of the nuclear reactor system. For example, as shown in FIG. 1A, the activation circuitry 106 may be used to selectively transfer the electrical energy from the electrical output 108 of a thermoelectric device 104 to a monitoring system 134 (e.g., thermal monitoring system, pressure monitoring system or radiation monitoring system) of the nuclear reactor system 100.

Figure 37:
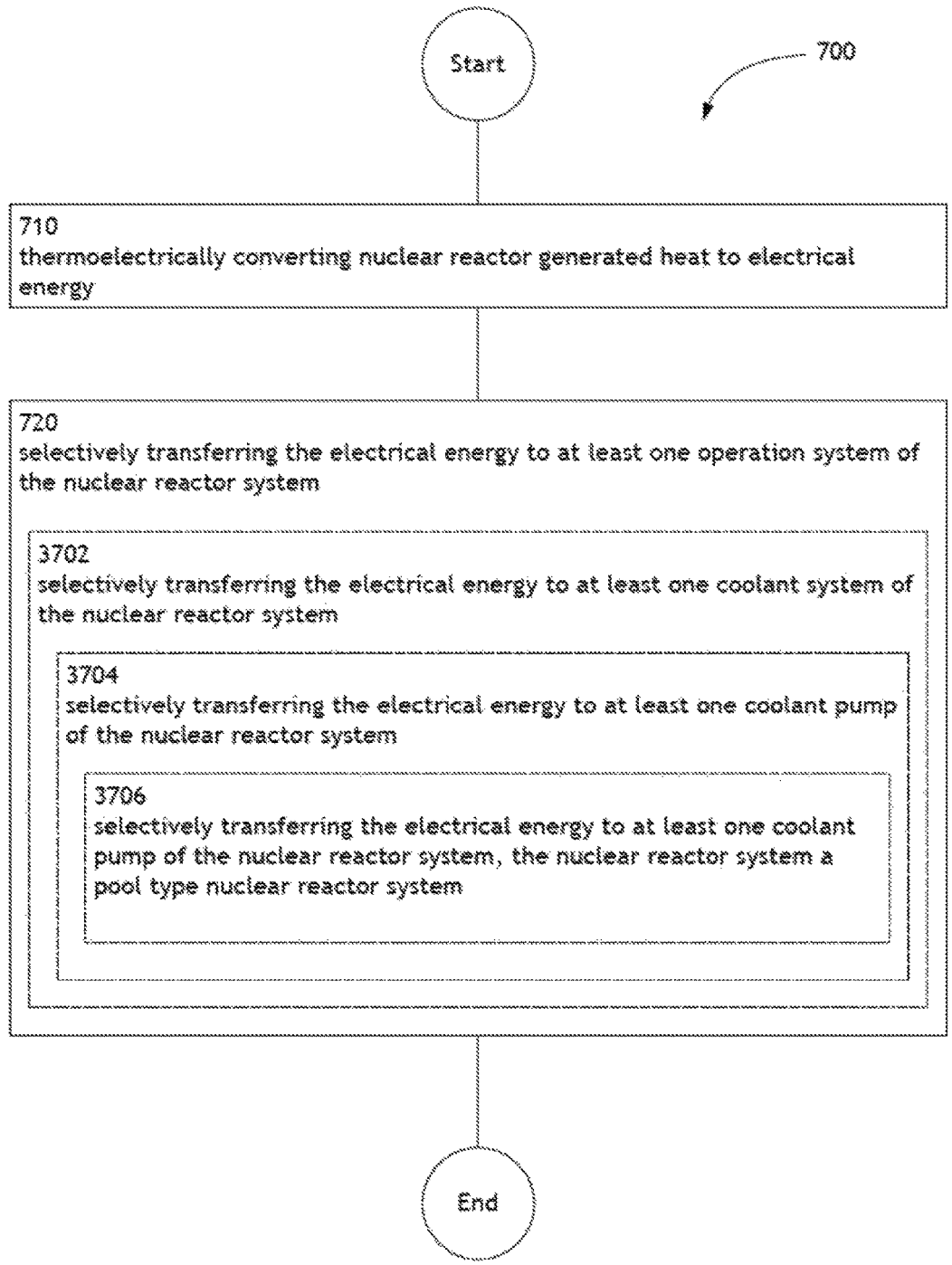

FIG. 37 illustrates alternative embodiments of the example operational flow 700 of FIG. 7. FIG. 37 illustrates example embodiments where the transfer operation 720 may include at least one additional operation. Additional operations may include an operation 3702, an operation 3704, and/or an operation 3706.

Operation 3702 illustrates selectively transferring the electrical energy to at least one coolant system of the nuclear reactor system. For example, as shown in FIG. 1A, the activation circuitry 106 may be used to selectively transfer the electrical energy from the electrical output 108 of a thermoelectric device 104 to a coolant system 140 (e.g., primary coolant system, secondary coolant system or intermediate coolant system) of the nuclear reactor system 100.

Further, operation 3704 illustrates selectively transferring the electrical energy to at least one coolant pump of the nuclear reactor system. For example, as shown in FIG. 1A, the activation circuitry 106 may be used to selectively transfer the electrical energy from the electrical output 108 of a thermoelectric device 104 to a coolant pump 142 (e.g., mechanical coolant pump or magnetohydrodynamic coolant pump) of the nuclear reactor system 100.

Further, operation 3706 illustrates selectively transferring the electrical energy to at least one coolant pump coupled to a coolant pool of the nuclear reactor system. For example, as shown in FIG. 1A, the activation circuitry 106 may be used to selectively transfer the electrical energy from the electrical output 108 of a thermoelectric device 104 to a coolant pump circulating liquid coolant in a coolant pool of a nuclear reactor system 144.

Figure 38:
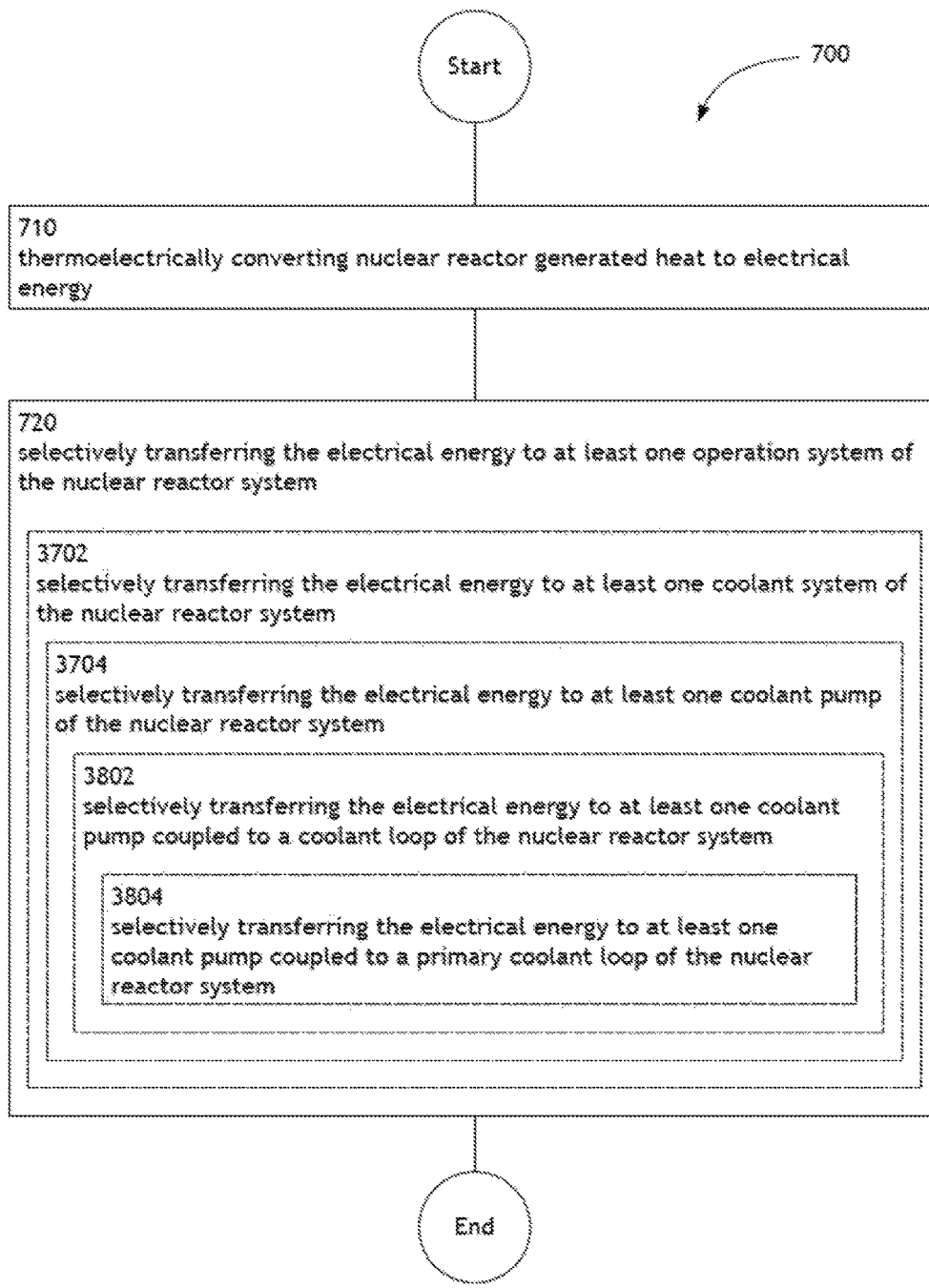

FIG. 38 illustrates alternative embodiments of the example operational flow 700 of FIG. 7. FIG. 38 illustrates example embodiments where the transfer operation 720 may include at least one additional operation. Additional operations may include an operation 3802, and/or an operation 3804.

Further, operation 3802 illustrates selectively transferring the electrical energy to at least one coolant pump coupled to a coolant loop of the nuclear reactor system. For example, as shown in FIG. 1A, the activation circuitry 106 may be used to selectively transfer the electrical energy from the electrical output 108 of a thermoelectric device 104 to a coolant pump coupled to a coolant loop 146 of the nuclear reactor system 100.

Further, operation 3804 illustrates selectively transferring the electrical energy to at least one coolant pump coupled to a primary coolant loop of the nuclear reactor system. For example, as shown in FIG. 1A, the activation circuitry 106 may be used to selectively transfer the electrical energy from the electrical output 108 of a thermoelectric device 104 to a coolant pump coupled to a primary coolant loop 148 of the nuclear reactor system 100.

Figure 39:
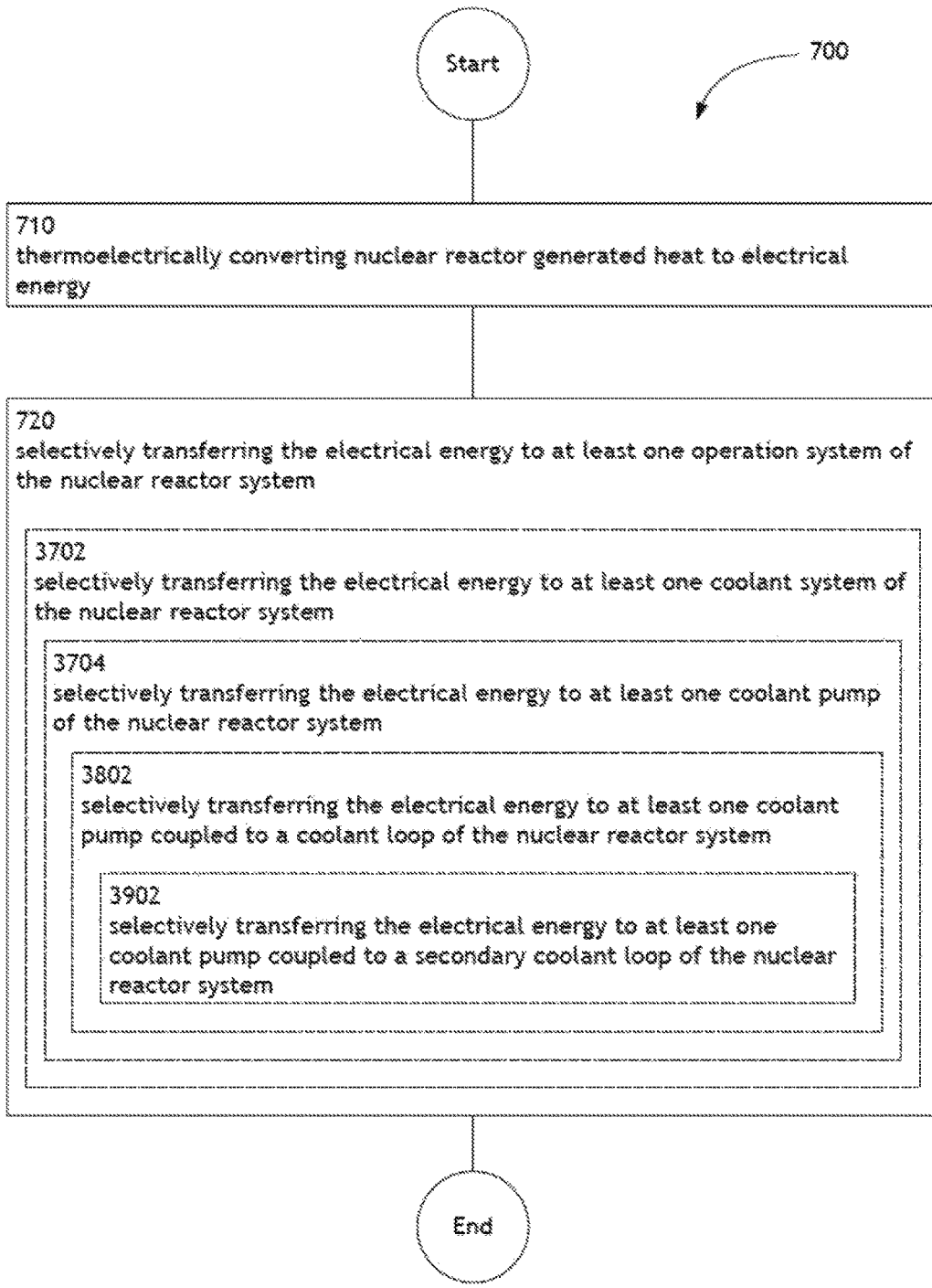

FIG. 39 illustrates alternative embodiments of the example operational flow 700 of FIG. 7. FIG. 39 illustrates example embodiments where the transfer operation 720 may include at least one additional operation. Additional operations may include an operation 3902.

Further, operation 3902 illustrates selectively transferring the electrical energy to at least one coolant pump coupled to a secondary coolant loop of the nuclear reactor system. For example, as shown in FIG. 1A, the activation circuitry 106 may be used to selectively transfer the electrical energy from the electrical output 108 of a thermoelectric device 104 to a coolant pump coupled to a secondary coolant loop 150 of the nuclear reactor system 100.

Figure 40:
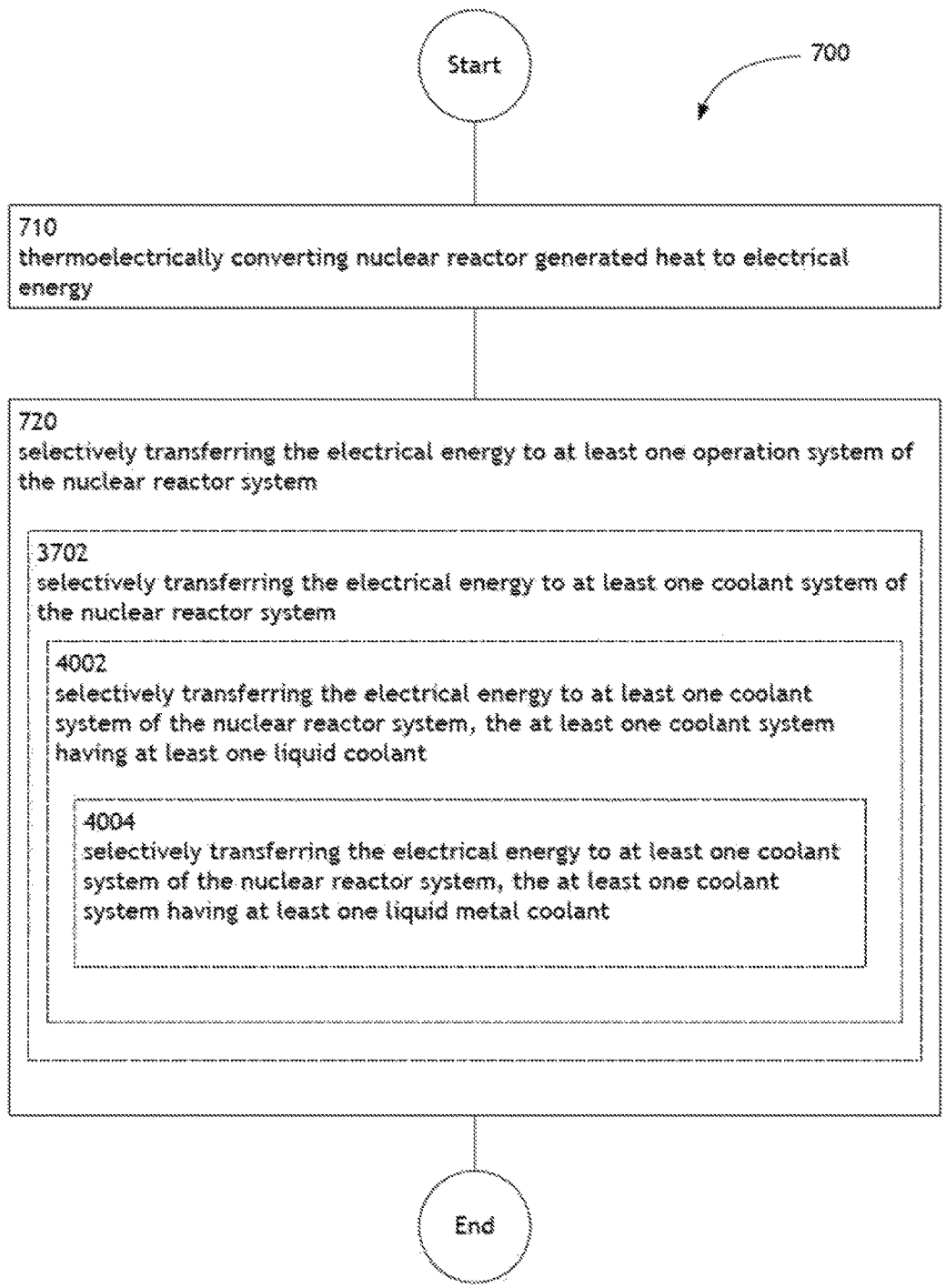

FIG. 40 illustrates alternative embodiments of the example operational flow 700 of FIG. 7. FIG. 40 illustrates example embodiments where the transfer operation 720 may include at least one additional operation. Additional operations may include an operation 4002, and/or an operation 4004.

Further, operation 4002 illustrates selectively transferring the electrical energy to at least one coolant system of the nuclear reactor system, the at least one coolant system having at least one liquid coolant. For example, as shown in FIG. 1A, the activation circuitry 106 may be used to selectively transfer the electrical energy from the electrical output 108 of a thermoelectric device 104 to a coolant system 140 having a liquid coolant 152 (e.g., liquid organic material).

Further, operation 4004 illustrates selectively transferring the electrical energy to at least one coolant system of the nuclear reactor system, the at least one coolant system having at least one liquid metal coolant. For example, as shown in FIG. 1A, the activation circuitry 106 may be used to selectively transfer the electrical energy from the electrical output 108 of a thermoelectric device 104 to a coolant system 140 having a liquid metal coolant 154 (e.g., liquid sodium or liquid lead).

Figure 41:
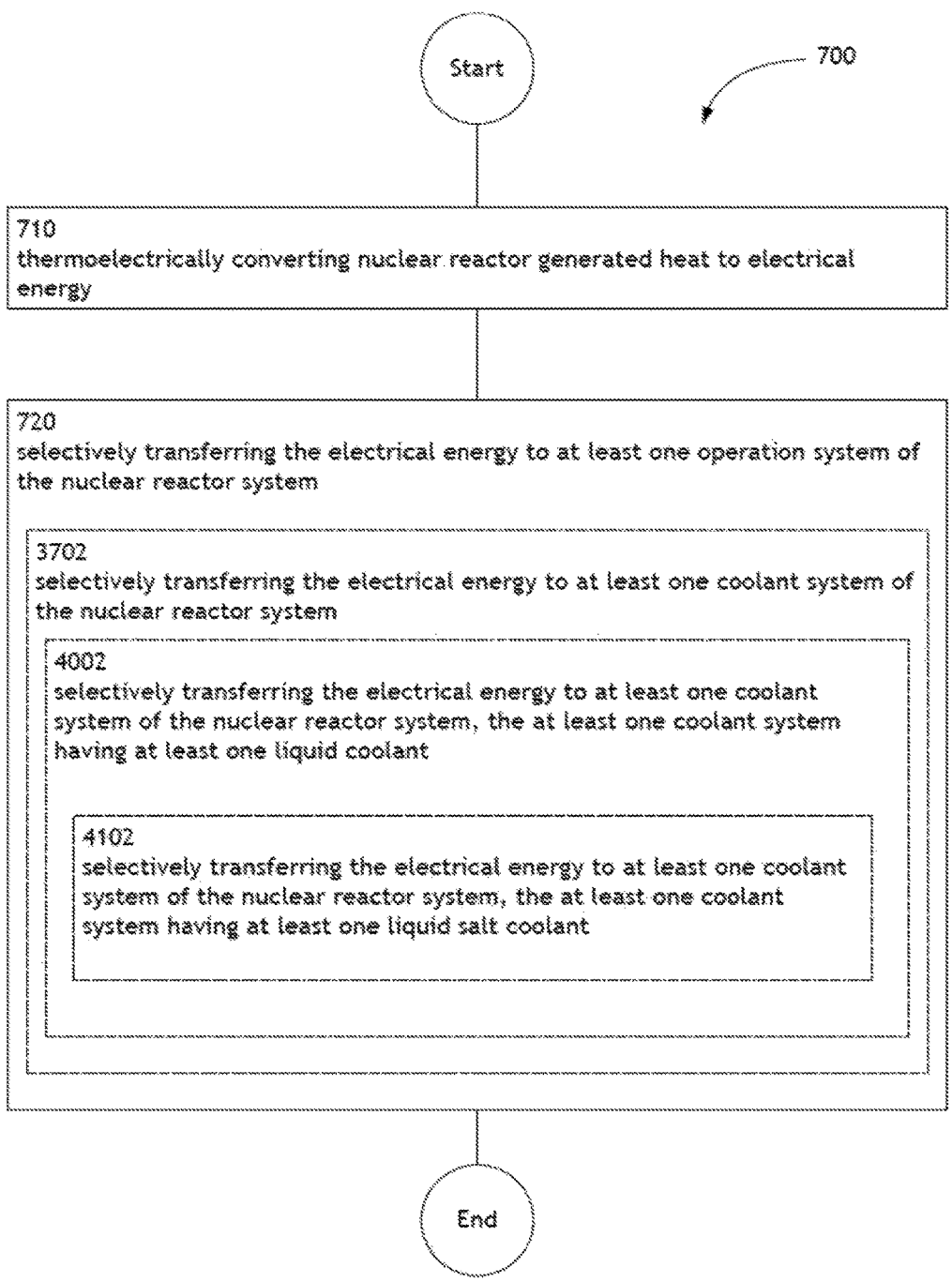

FIG. 41 illustrates alternative embodiments of the example operational flow 700 of FIG. 7. FIG. 41 illustrates example embodiments where the transfer operation 720 may include at least one additional operation. Additional operations may include an operation 4102.

Further, operation 4102 illustrates selectively transferring the electrical energy to at least one coolant system of the nuclear reactor system, the at least one coolant system having at least one liquid salt coolant. For example, as shown in FIG. 1A, the activation circuitry 106 may be used to selectively transfer the electrical energy from the electrical output 108 of a thermoelectric device 104 to a coolant system 140 having a liquid salt coolant 156 (e.g., lithium fluoride or other liquid fluoride salts).

Figure 42:
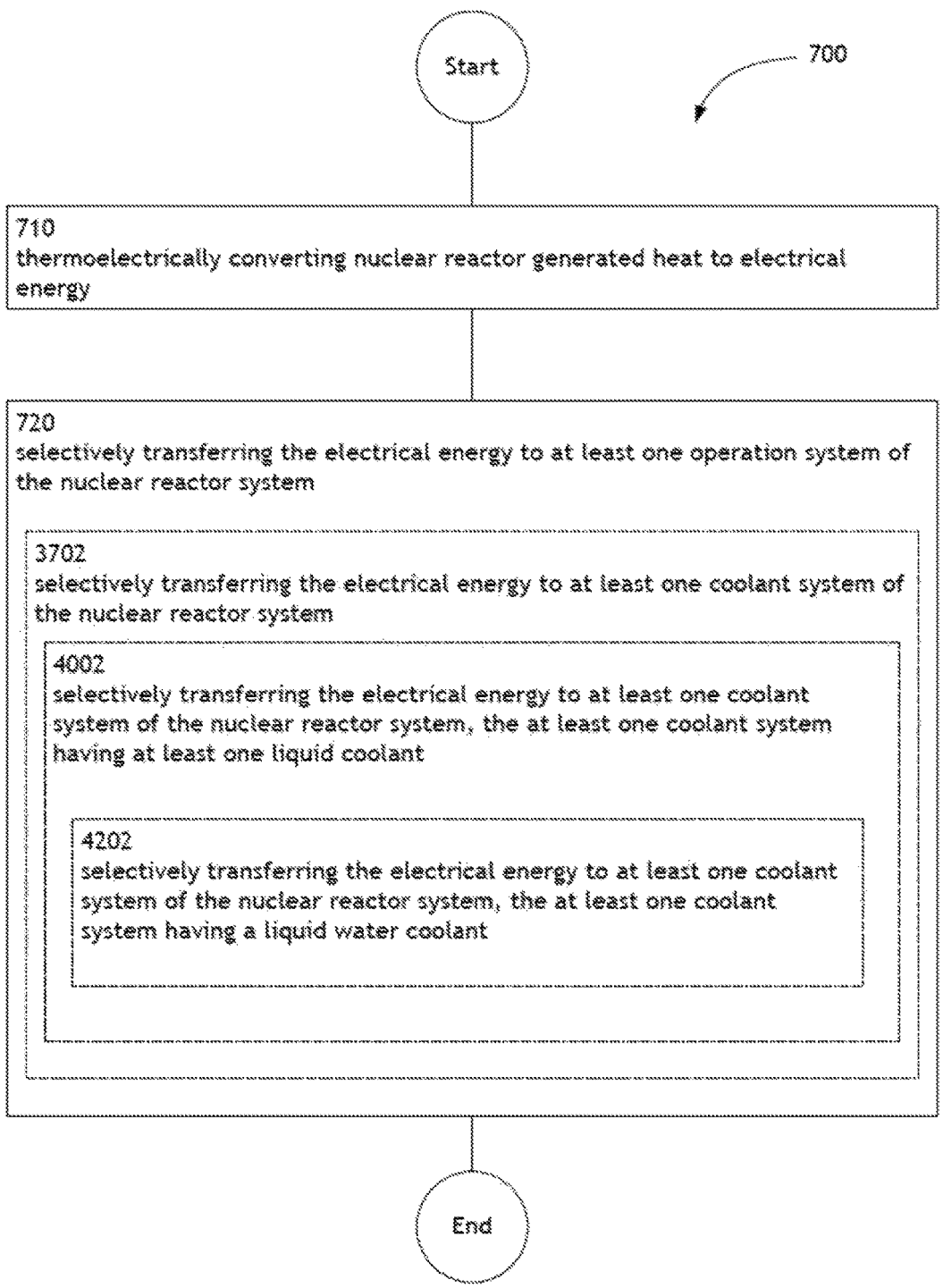

FIG. 42 illustrates alternative embodiments of the example operational flow 700 of FIG. 7. FIG. 42 illustrates example embodiments where the transfer operation 720 may include at least one additional operation. Additional operations may include an operation 4202.

Further, operation 4202 illustrates selectively transferring the electrical energy to at least one coolant system of the nuclear reactor system, the at least one coolant system having a liquid water coolant. For example, as shown in FIG. 1A, the activation circuitry 106 may be used to selectively transfer the electrical energy from the electrical output 108 of a thermoelectric device 104 to a coolant system 140 having a liquid water coolant 158.

Figure 43:
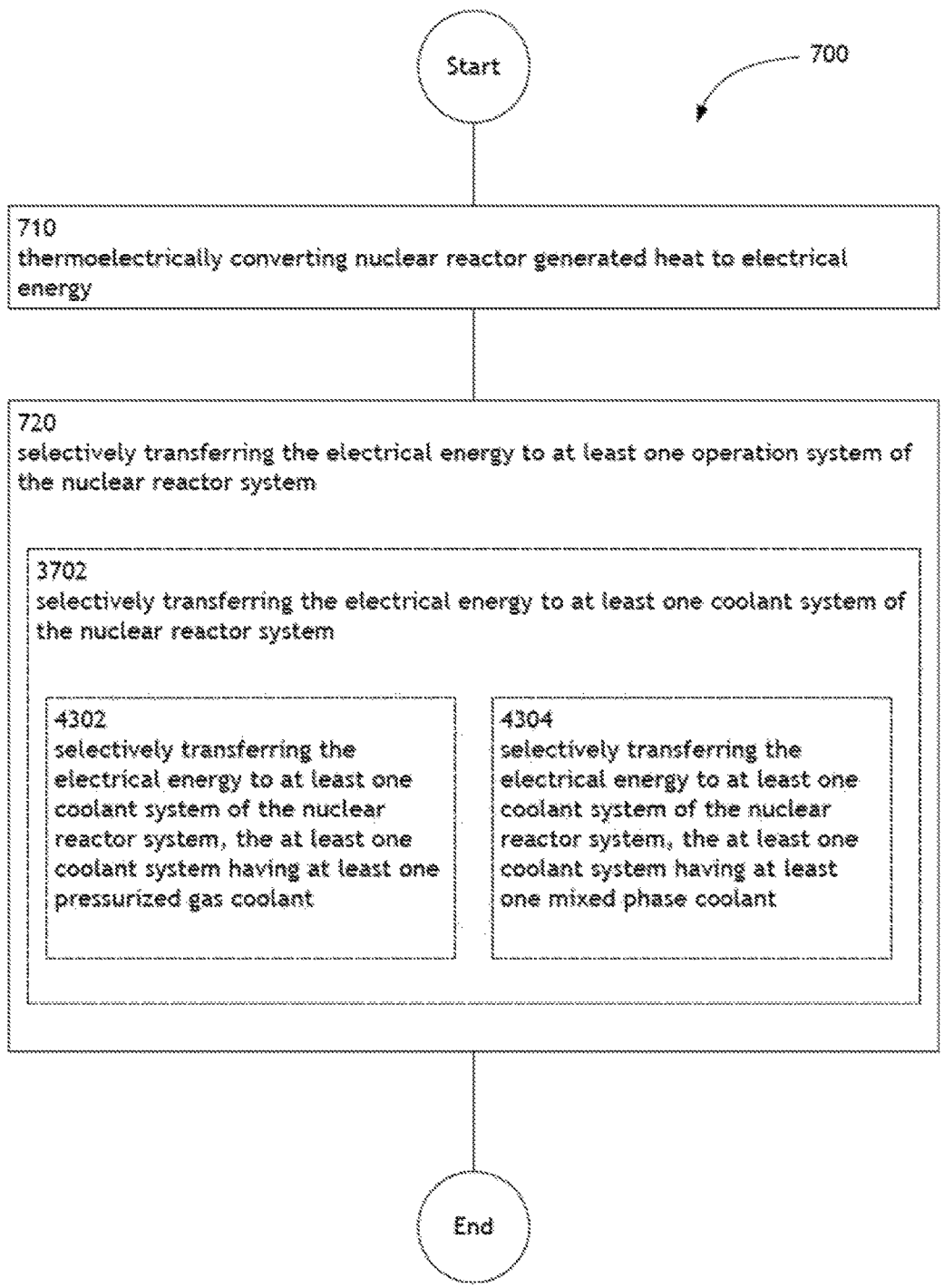

FIG. 43 illustrates alternative embodiments of the example operational flow 700 of FIG. 7. FIG. 43 illustrates example embodiments where the transfer operation 720 may include at least one additional operation. Additional operations may include an operation 4302, and/or an operation 4304.

Further, operation 4302 illustrates selectively transferring the electrical energy to at least one coolant system of the nuclear reactor system, the at least one coolant system having at least one pressurized gas coolant. For example, as shown in FIG. 1A, the activation circuitry 106 may be used to selectively transfer the electrical energy from the electrical output 108 of a thermoelectric device 104 to a coolant system 140 having a pressurized gas coolant 160 (e.g., pressurized helium gas, pressurized nitrogen gas, or pressurized carbon dioxide gas).

Further, operation 4304 illustrates selectively transferring the electrical energy to at least one coolant system of the nuclear reactor system, the at least one coolant system having at least one mixed phase coolant. For example, as shown in FIG. 1A, the activation circuitry 106 may be used to selectively transfer the electrical energy from the electrical output 108 of a thermoelectric device 104 to a coolant system 140 having a mixed phase coolant 162, such as a mixed liquid-gas coolant (e.g., liquid water-steam).

Figure 44:
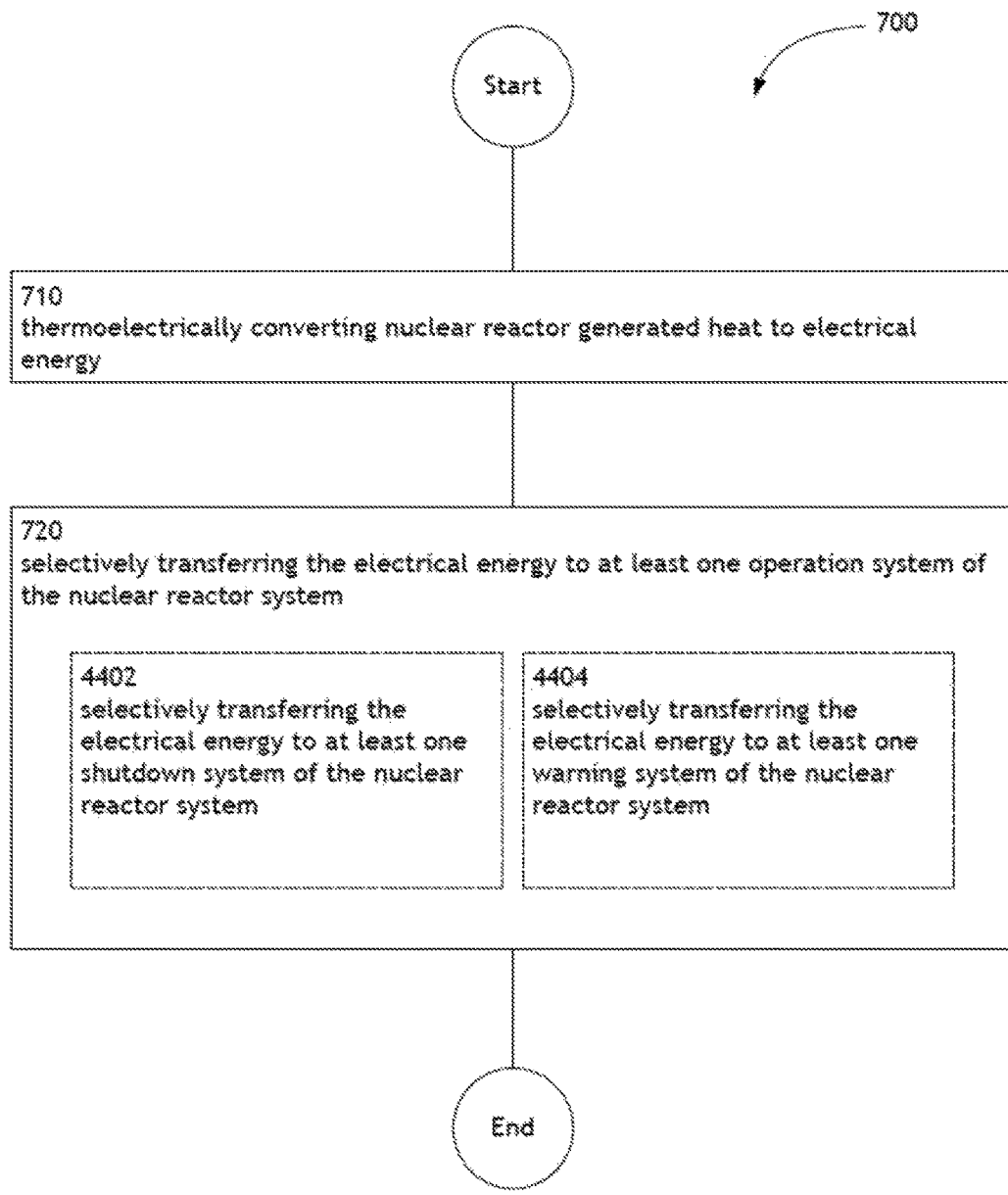

FIG. 44 illustrates alternative embodiments of the example operational flow 700 of FIG. 7. FIG. 44 illustrates example embodiments where the transfer operation 720 may include at least one additional operation. Additional operations may include an operation 4402, and/or an operation 4404.

Operation 4402 illustrates selectively transferring the electrical energy to at least one shutdown system of the nuclear reactor system. For example, as shown in FIG. 1A, the activation circuitry 106 may be used to selectively transfer the electrical energy from the electrical output 108 of a thermoelectric device 104 to a shutdown system 138 (e.g., emergency shutdown system or a scheduled shutdown system) of the nuclear reactor system 100.

Operation 4404 illustrates selectively transferring the electrical energy to at least one warning system of the nuclear reactor system. For example, as shown in FIG. 1A, the activation circuitry 106 may be used to selectively transfer the electrical energy from the electrical output 108 of a thermoelectric device 104 to a warning system (e.g., audio warning system or visual warning system) of the nuclear reactor system 100.

Figure 45:
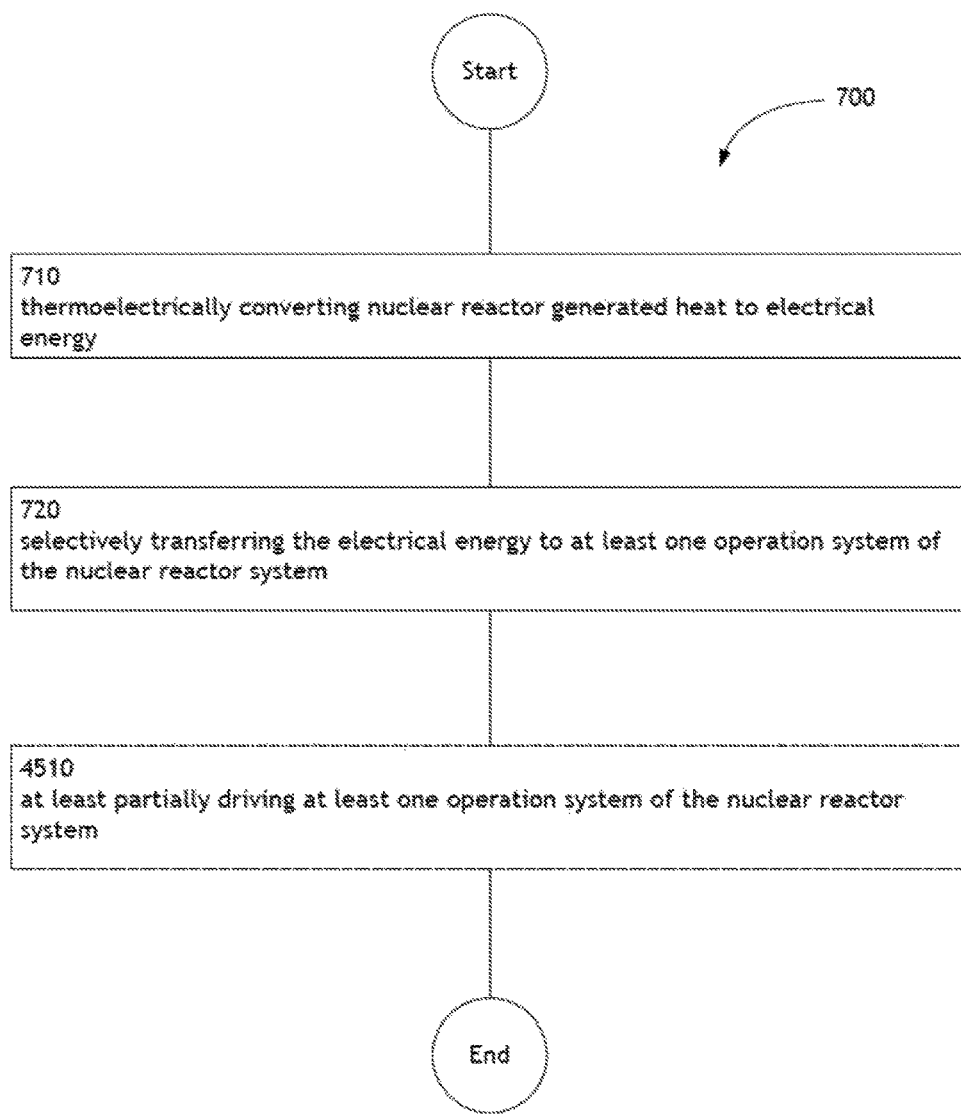

FIG. 45 illustrates an operational flow 4500 representing example operations related to the selective transfer of thermoelectrically generated electrical energy to operation systems of a nuclear reactor system. FIG. 45 illustrates an example embodiment where the example operational flow 700 of FIG. 7 may include at least one additional operation. Additional operations may include an operation 4510.

After a start operation, a converting operation 710, and a transfer operation 720, the operational flow 4500 moves to a driving operation 4510. Operation 4510 illustrates at least partially driving at least one operation system of the nuclear reactor system. For example, as shown in FIG. 1A, the electrical energy selectively transferred from the electrical output 108 of the thermoelectric device 104 to an operation system 110 of the nuclear reactor system 100 may be used to drive or partially drive the operation system 110 (e.g. control system 128, monitoring system 134, coolant system 1140, shutdown system 138, or warning system 136). For instance, the electrical energy selectively transferred from the electrical output 108 of the thermoelectric device 104 to the rod control system 130 of the nuclear reactor system 100 may be used to drive or partially drive the rod control system 130. By way of further example, electrical energy selectively transferred from the electrical output 108 of the thermoelectric device 104 to a coolant pump 142 of a coolant system 140 of a nuclear reactor system 100 may be used to drive or partially drive the coolant pump 142.

Figure 46:
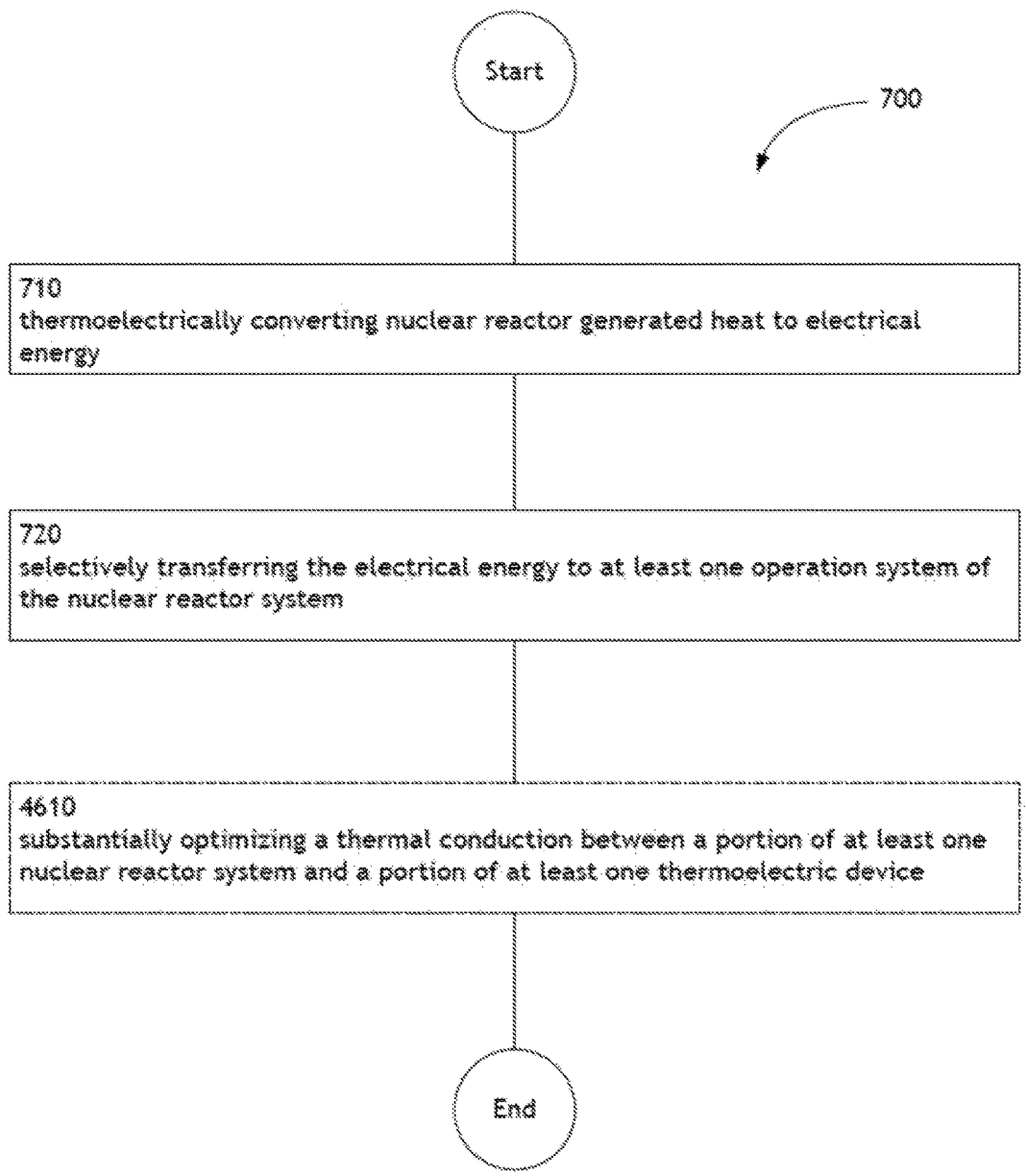

FIG. 46 illustrates an operational flow 4600 representing example operations related to the selective transfer of thermoelectrically generated electrical energy to operation systems of a nuclear reactor system. FIG. 46 illustrates an example embodiment where the example operational flow 700 of FIG. 7 may include at least one additional operation. Additional operations may include an operation 4610.

After a start operation, a converting operation 710, and a transfer operation 720, the operational flow 4600 moves to an optimizing operation 4610. Operation 4610 illustrates substantially optimizing a thermal conduction between a portion of at least one nuclear reactor system and a portion of at least one thermoelectric device. For example, as shown in FIG. 2, the thermal conduction between a first portion 202 of the thermoelectric device 104 and a first portion 204 of the nuclear reactor system 100 may be optimized by connecting the first portion 202 of the thermoelectric device to the first portion 204 of the nuclear reactor system 100 with thermal cement or a similar substance (e.g., thermal glue or thermal paste) suitable for optimizing a thermal conduction path. Further, the second portion 206 of the thermoelectric device 104 may be contacted to the second portion 208 of the nuclear reactor system 100 using thermal cement or a similar substance suitable for optimizing a thermal conduction path.

Figure 47:
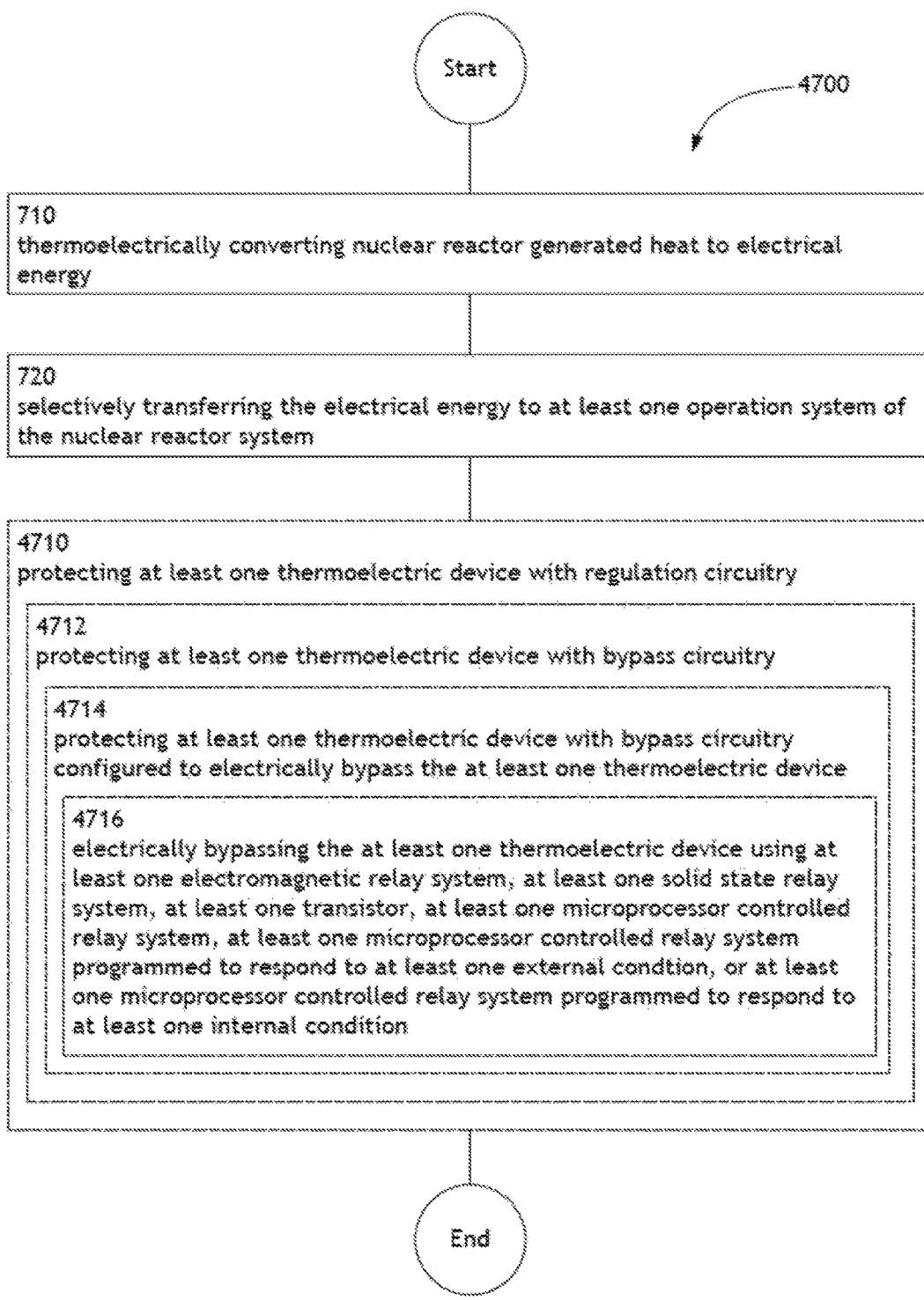

FIG. 47 illustrates an operational flow 4700 representing example operations related to the selective transfer of thermoelectrically generated electrical energy to operation systems of a nuclear reactor system. FIG. 47 illustrates an example embodiment where the example operational flow 700 of FIG. 7 may include at least one additional operation. Additional operations may include an operation 4710, an operation 4712, an operation 4714, and/or an operation 4716.

After a start operation, a converting operation 710, and a transfer operation 720, the operational flow 4700 moves to a protecting operation 4710. Operation 4710 illustrates protecting at least one thermoelectric device with regulation circuitry. For example, as shown in FIG. 6, one or more than one thermoelectric device 104 may be protected using regulation circuitry 602, such as voltage regulation circuitry (e.g., voltage regulator) or current limiting circuitry (e.g., blocking diode or fuse).

Operation 4712 illustrates protecting at least one thermoelectric device with bypass circuitry. For example, as shown in FIG. 6, one or more than one thermoelectric device 104 may be protected using bypass circuitry 604, such as a bypass diode.

Further, operation 4714 illustrates protecting at least one thermoelectric device with bypass circuitry configured to electrically bypass the at least one thermoelectric device. For example, as shown in FIG. 6, one or more than one thermoelectric device 104 may be protected using bypass circuitry configured to electrically bypass 606 one or more than one thermoelectric device 104.

Further, the operation 4716 illustrates electrically bypassing the at least one thermoelectric device using at least one electromagnetic relay system, at least one solid state relay system, at least one transistor, at least one microprocessor controlled relay system, at least one microprocessor controlled relay system programmed to respond to at least one external condition, or at least one microprocessor controlled relay system programmed to respond to at least one internal condition. For example, as shown in FIG. 6, one or more than one thermoelectric device 104 may be electrically bypassed using an electromagnetic relay system 608, a solid state relay system 610, a transistor 612, a microprocessor controlled relay system 614, a microprocessor controlled relay system programmed to respond to one or more than one external conditions 616 (e.g., availability of external electric power), or a microprocessor controlled relay system programmed to respond to one or more than one internal conditions 618 (e.g., temperature or pressure).

Figure 48:
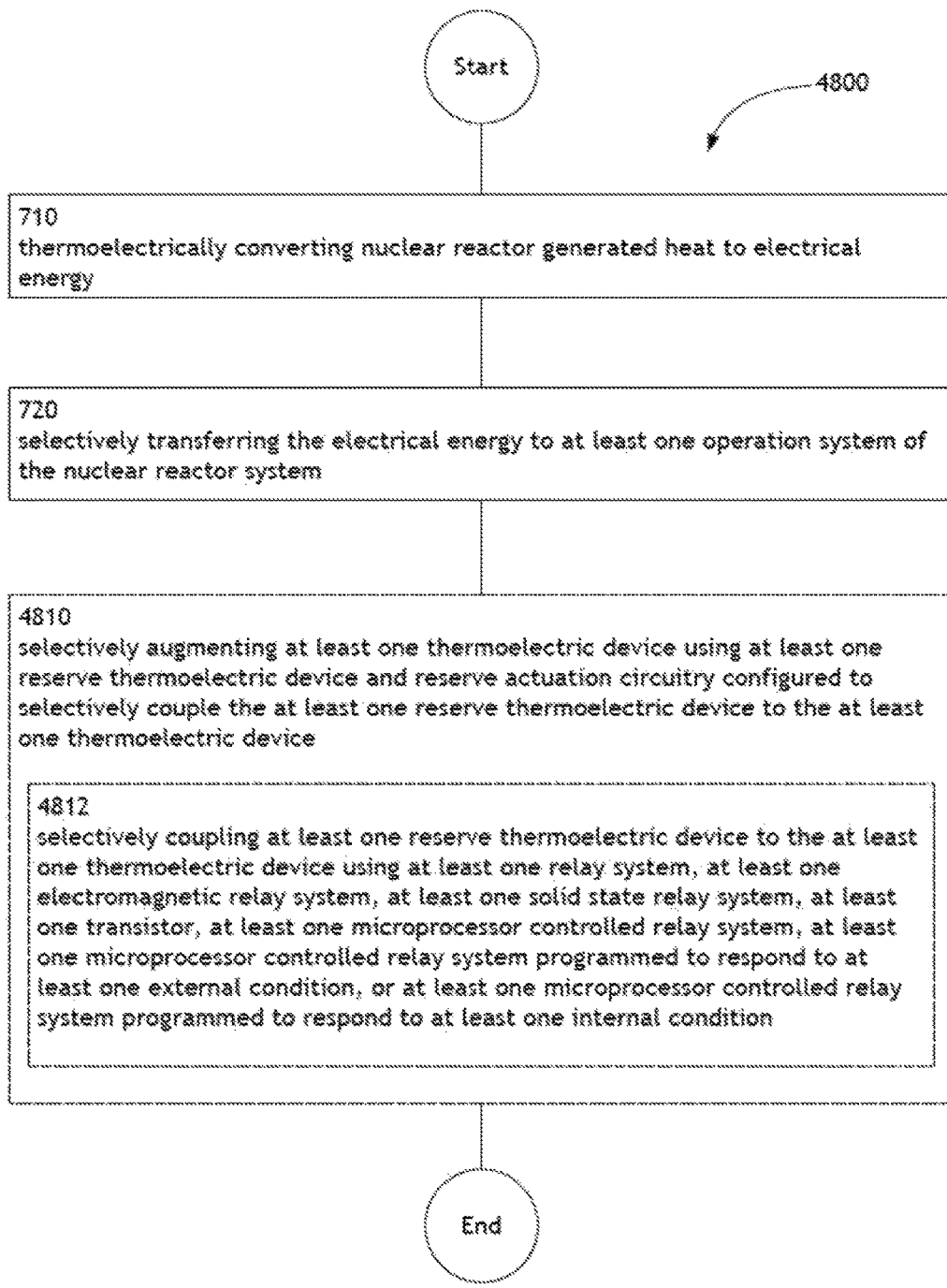

FIG. 48 illustrates an operational flow 4800 representing example operations related to the selective transfer of thermoelectrically generated electrical energy to operation systems of a nuclear reactor system. FIG. 48 illustrates an example embodiment where the example operational flow 700 of FIG. 7 may include at least one additional operation. Additional operations may include an operation 4810, and/or an operation 4812.

After a start operation, a converting operation 710, and a transfer operation 720, the operational flow 4800 moves to an augmenting operation 4810. Operation 4810 illustrates selectively augmenting at least one thermoelectric device using at least one reserve thermoelectric device and reserve actuation circuitry configured to selectively couple the at least one reserve thermoelectric device to the at least one thermoelectric device. For example, as shown in FIG. 6, the electrical output 108 from one or more than one thermoelectric device 104 may be augmented using one or more than one reserve thermoelectric device 620, wherein the one or more than one reserve thermoelectric device 620 may be selectively coupled to the thermoelectric device 104 using reserve actuation circuitry 622.

Operation 4812 illustrates selectively coupling at least one reserve thermoelectric device to the at least one thermoelectric device using at least one relay system, at least one electromagnetic relay system, at least one solid state relay system, at least one transistor, at least one microprocessor controlled relay system, at least one microprocessor controlled relay system programmed to respond to at least one external condition, or at least one microprocessor controlled relay system programmed to respond to at least one internal condition. For example, as shown in FIG. 6, the electrical output 108 from one or more than one thermoelectric device 104 may be augmented using one or more than one reserve thermoelectric device 620, wherein the one or more than one reserve thermoelectric device 620 may be selectively coupled to the thermoelectric device 104 using a relay system 624. For instance, the relay system may comprise, but is not limited to, an electromagnetic relay system 626, a solid state relay system 628, a transistor 630, a microprocessor controlled relay system 632, a microprocessor controlled relay system programmed to respond to at least one external condition 634, or a microprocessor controlled relay system programmed to respond to at least one internal condition 636.

Figure 49:
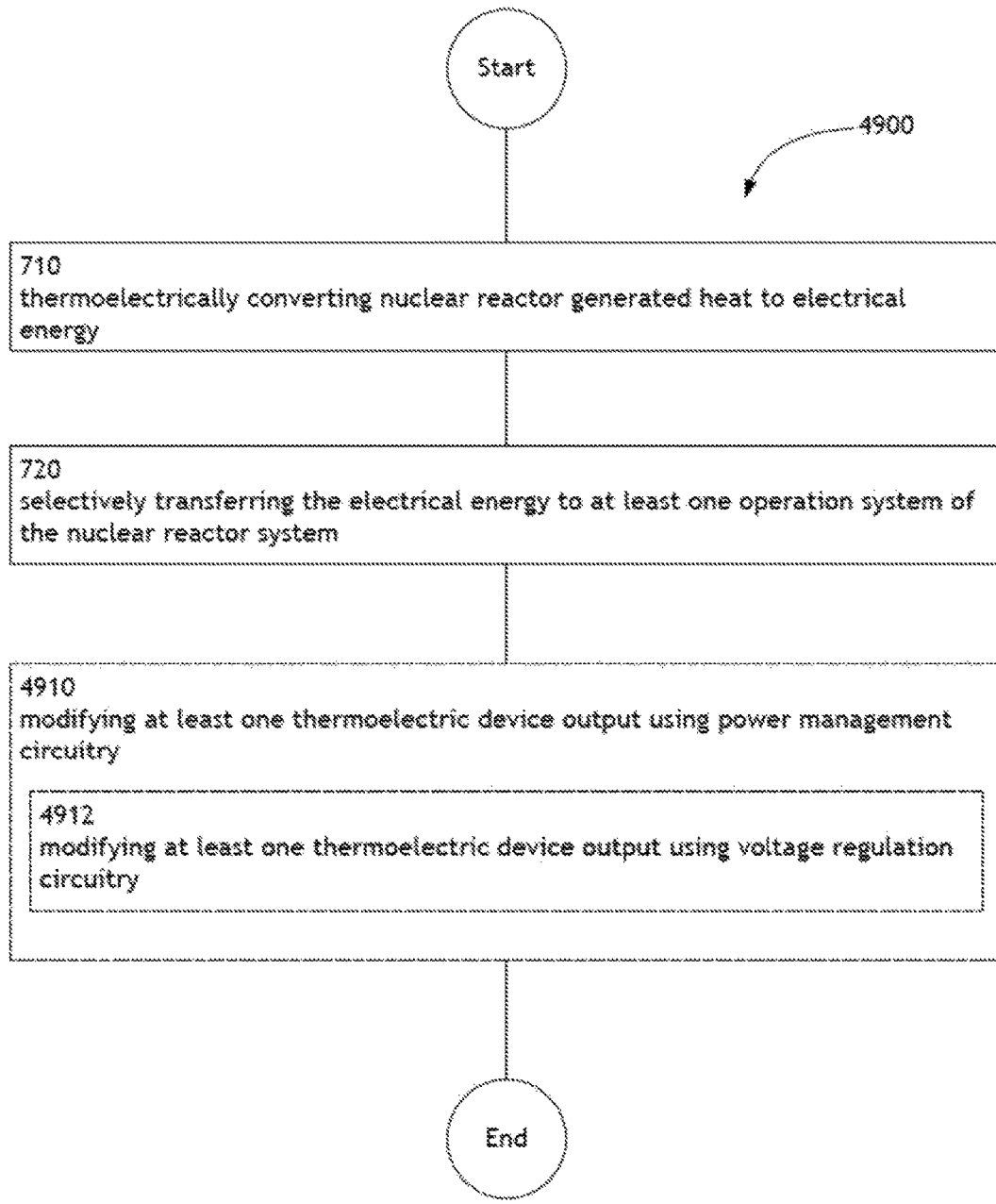

FIG. 49 illustrates an operational flow 4900 representing example operations related to the selective transfer of thermoelectrically generated electrical energy to operation systems of a nuclear reactor system. FIG. 49 illustrates an example embodiment where the example operational flow 700 of FIG. 7 may include at least one additional operation. Additional operations may include an operation 4910, and/or an operation 4912.

After a start operation, a converting operation 710, and a transfer operation 720, the operational flow 4900 moves to a modifying operation 4910. Operation 4910 illustrates modifying at least one thermoelectric device output using power management circuitry. For example, as shown in FIG. 6, the electrical output 108 of a thermoelectric device 104 may be modified using power management circuitry 638. For instance, the power management circuitry may comprise, but is not limited to, a voltage converter (e.g., DC-DC converter or DC-AC inverter).

Operation 4912 illustrates modifying at least one thermoelectric device output using voltage regulation circuitry. For example, as shown in FIG. 6, the electrical output 108 of a thermoelectric device 104 may be modified using voltage regulation circuitry 640. For instance, the voltage regulation circuitry 640 may comprise, but is not limited to, a voltage regulator (e.g., Zener diode, an adjustable voltage regulator or a fixed voltage regulator).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
   means for thermoelectrically converting heat generated with a nuclear reactor to electrical energy; and
   means for selectively transferring the electrical energy to at least one first operation system of the nuclear reactor in response to a signal from a second operation system of the nuclear reactor to supply power to the at least one first operation system using the transferred electrical energy, the at least one first operation system affecting the nuclear reactor responsive to the power supplied, wherein the signal from the second operation system is responsive to at least one third operation system.

2. The system of claim 1, wherein the signal is from at least one control system.

3. The system of claim 2, wherein the signal from the at least one control system is responsive to the at least one third operation system, the at least one third operation system responsive to at least one internal condition.

4. The system of claim 2, wherein the signal from the at least one control system is responsive to the at least one third operation system, the at least one third operation system responsive to at least one external condition.

5. The system of claim 1, wherein the signal is in response to at least one shutdown event.

6. The system of claim 1, wherein the means for selectively transferring the electrical energy to the at least one first operation system of the nuclear reactor comprises:
   activation circuitry for selectively transferring the electrical energy to the at least one first operation system of the nuclear reactor.

7. The system of claim 6, wherein the activation circuitry for selectively transferring the electrical energy to the at least one first operation system of the nuclear reactor comprises:
   coupling circuitry for selectively coupling at least one thermoelectric device to the at least one first operation system of the nuclear reactor.

8. The system of claim 1, wherein the means for thermoelectrically converting heat generated with a nuclear reactor to electrical energy comprises:
    at least one thermoelectric device for thermoelectrically converting heat generated with a nuclear reactor to electrical energy.

9. The system of claim 1, wherein the means for selectively transferring the electrical energy to the at least one first operation system of the nuclear reactor comprises:
    means for selectively transferring the electrical energy to at least one control system of the nuclear reactor.

10. The system of claim 1, wherein the means for selectively transferring the electrical energy to the at least one first operation system of the nuclear reactor comprises:
    means for selectively transferring the electrical energy to at least one monitoring system of the nuclear reactor.

11. The system of claim 1, wherein the means for selectively transferring the electrical energy to the at least one first operation system of the nuclear reactor comprises:
    means for selectively transferring the electrical energy to at least one coolant system of the nuclear reactor.

12. The system of claim 11, wherein the means for selectively transferring the electrical energy to at least one coolant system of the nuclear reactor comprises:
    means for selectively transferring the electrical energy to at least one coolant pump of the nuclear reactor.

13. The system of claim 1, wherein the means for selectively transferring the electrical energy to the at least one first operation system of the nuclear reactor comprises:
    means for selectively transferring the electrical energy to at least one shutdown system of the nuclear reactor.

14. The system of claim 1, wherein the means for selectively transferring the electrical energy to the at least one first operation system of the nuclear reactor comprises:
    means for selectively transferring the electrical energy to at least one warning system of the nuclear reactor.

15. The system of claim 1, further comprising:
    means for protecting the means for thermoelectrically converting heat generated with a nuclear reactor to electrical energy.

16. The system of claim 1, further comprising:
    means for selectively augmenting the means for thermoelectrically converting heat generated with a nuclear reactor to electrical energy.

17. The system of claim 16, wherein the means for selectively augmenting the means for thermoelectrically converting heat generated with a nuclear reactor to electrical energy comprises:
    at least one reserve thermoelectric device and reserve actuation circuitry for selectively augmenting the at least one thermoelectric device, the reserve actuation circuitry configured to selectively couple the at least one reserve thermoelectric device to the at least one thermoelectric device.

18. The system of claim 1, further comprising:
    means for modifying the electrical energy.

19. An apparatus, comprising:
    at least one thermoelectric device for thermoelectrically converting heat generated with a nuclear reactor to electrical energy;
    at least one first operation system, at least one second operation system, and at least one third operation system; and
    activation circuitry for, responsive to at least one signal from the at least one second system responsive to the at least one third operation system, selectively transferring the electrical energy from at least one electrical output of the at least one thermoelectric device to the at least one first operation system of the nuclear reactor to supply power to the at least one first operation system, the at least one first operation system affecting the nuclear reactor responsive to the power supplied.

20. The apparatus of claim 19, wherein the activation circuitry for selectively transferring the electrical energy from at least one electrical output of the at least one thermoelectric device to at least one first operation system of the nuclear reactor comprises:
    activation circuitry for, responsive to at least one condition, transferring the electrical energy to the at least one first operation system of the nuclear reactor.

21. The apparatus of claim 20, wherein the activation circuitry for, responsive to at least one condition, transferring the electrical energy to the at least one first operation system of the nuclear reactor comprises:
    activation circuitry for, responsive to at least one signal from the at least one second operation system, transferring the electrical energy to the at least one first operation system of the nuclear reactor.

22. The apparatus of claim 21, wherein the at least one second operation system is different than the at least one first operation system of the nuclear reactor.

23. The apparatus of claim 21, wherein the activation circuitry for, responsive to at least one signal from at least one second operation system, transferring the electrical energy to the at least one first operation system of the nuclear reactor comprises:
    activation circuitry for, responsive to at least one signal from at least one monitoring system, transferring the electrical energy to the at least one first operation system of the nuclear reactor.

24. The apparatus of claim 21, wherein the activation circuitry for, responsive to at least one signal from at least one second operation system, transferring the electrical energy to the at least one first operation system of the nuclear reactor comprises:
    activation circuitry for, responsive to at least one signal from at least one safety system, transferring the electrical energy to the at least one first operation system of the nuclear reactor.

25. The apparatus of claim 21, wherein the activation circuitry for, responsive to at least one signal from at least one second operation system, transferring the electrical energy to the at least one first operation system of the nuclear reactor comprises:
    activation circuitry for, responsive to at least one signal from at least one security system, transferring the electrical energy to the at least one first operation system of the nuclear reactor.

26. The apparatus of claim 21, wherein the activation circuitry for, responsive to at least one signal from at least one second operation system, transferring the electrical energy to the at least one first operation system of the nuclear reactor comprises:
    activation circuitry for, responsive to at least one signal from at least one control system, transferring the electrical energy to the at least one first operation system of the nuclear reactor.

27. The apparatus of claim 21, wherein the activation circuitry for, responsive to at least one signal from at least one control system responsive to at least one third operation system, transferring the electrical energy to the at least one first operation system of the nuclear reactor comprises:
    activation circuitry for, responsive to at least one signal from at least one control system responsive to at least one third operation system, the at least one third operation system responsive to at least one internal condition, transferring the electrical energy to the at least one first operation system of the nuclear reactor.

28. The apparatus of claim 21, wherein the activation circuitry for, responsive to at least one signal from at least one control system responsive to at least one third operation system, transferring the electrical energy to the at least one first operation system of the nuclear reactor comprises:
activation circuitry for, responsive to at least one signal from at least one control system responsive to at least one third operation system, the at least one third operation system responsive to at least one external condition, transferring the electrical energy to the at least one first operation system of the nuclear reactor.

29. The apparatus of claim 20, wherein the activation circuitry for, responsive to at least one condition, transferring the electrical energy to at least one first operation system of the nuclear reactor comprises:
activation circuitry for, responsive to at least one shutdown event, transferring the electrical energy to the at least one first operation system of the nuclear reactor.

30. The apparatus of claim 19, wherein the at least one thermoelectric device for thermoelectrically converting nuclear reactor generated heat to electrical energy comprises:
at least one thermoelectric device optimized for a specified range of operating characteristics for thermoelectrically converting nuclear reactor generated heat to electrical energy.

31. The apparatus of claim 19, wherein the at least one thermoelectric device for thermoelectrically converting nuclear reactor generated heat to electrical energy comprises:
a first thermoelectric device optimized for a first range of operating characteristics and at least one additional thermoelectric device optimized for a second range of operating characteristics, the second range of operating characteristics different from the first range of operating characteristics, for thermoelectrically converting nuclear reactor generated heat to electrical energy.

32. The apparatus of claim 19, wherein the at least one thermoelectric device for thermoelectrically converting nuclear reactor generated heat to electrical energy comprises:
at least one thermoelectric device sized to meet at least one selected operational requirement of the nuclear reactor for thermoelectrically converting nuclear reactor generated heat to electrical energy.

33. The apparatus of claim 32, wherein the at least one thermoelectric device sized to meet at least one selected operational requirement of the nuclear reactor for thermoelectrically converting nuclear reactor generated heat to electrical energy comprises:
at least one thermoelectric device for thermoelectrically converting nuclear reactor generated heat to electrical energy, the at least one thermoelectric device sized to at least partially match the heat rejection of the at least one thermoelectric device with at least a portion of the heat produced by the nuclear reactor.

34. The apparatus of claim 19, wherein the at least one thermoelectric device for thermoelectrically converting nuclear reactor generated heat to electrical energy comprises:
at least two series coupled thermoelectric devices for thermoelectrically converting nuclear reactor generated heat to electrical energy.

35. The apparatus of claim 19, wherein the at least one thermoelectric device for thermoelectrically converting nuclear reactor generated heat to electrical energy comprises:
at least two parallel coupled thermoelectric devices for thermoelectrically converting nuclear reactor generated heat to electrical energy.

36. The apparatus of claim 19, wherein the at least one operation system of the nuclear reactor comprises:
at least one control system of the nuclear reactor.

37. The apparatus of claim 19, wherein the at least one operation system of the nuclear reactor comprises:
at least one monitoring system of the nuclear reactor.

38. The apparatus of claim 19, wherein the at least one operation system of the nuclear reactor comprises:
at least one coolant system of the nuclear reactor.

39. The apparatus of claim 38, wherein the at least one coolant system of the nuclear reactor comprises:
at least one coolant pump of the nuclear reactor.

40. The apparatus of claim 19, wherein the at least one operation system of the nuclear reactor comprises:
at least one shutdown system of the nuclear reactor.

41. The apparatus of claim 19, wherein the at least one operation system of the nuclear reactor comprises:
at least one warning system of the nuclear reactor.

42. The apparatus of claim 19, further comprising:
regulation circuitry for protecting the at least one thermoelectric device.

43. The apparatus of claim 19, further comprising:
at least one reserve thermoelectric device and reserve actuation circuitry for selectively augmenting the at least one thermoelectric device, the reserve actuation circuitry configured to selectively couple the at least one reserve thermoelectric device to the at least one thermoelectric device.

44. The apparatus of claim 43, wherein the at least one reserve thermoelectric device and reserve actuation circuitry for selectively augmenting the at least one thermoelectric device, the reserve actuation circuitry configured to selectively couple the at least one reserve thermoelectric device to the at least one thermoelectric device, comprises:
at least one relay system, at least one electromagnetic relay system, at least one solid state relay system, at least one transistor, at least one microprocessor controlled relay system, at least one microprocessor controlled relay system programmed to respond to at least one external condition, or at least one microprocessor controlled relay system programmed to respond to at least one internal condition for selectively coupling at least one reserve thermoelectric device to the at least one thermoelectric device.

* * * * *